(12) United States Patent
Destagnol et al.

(10) Patent No.: US 10,044,773 B2
(45) Date of Patent: *Aug. 7, 2018

(54) SYSTEM AND METHOD OF A MULTI-FUNCTIONAL MANAGING USER INTERFACE FOR ACCESSING A CLOUD-BASED PLATFORM VIA MOBILE DEVICES

(71) Applicant: Box, Inc., Los Altos, CA (US)

(72) Inventors: Martin Destagnol, Los Altos, CA (US); Michael Smith, Palo Alto, CA (US)

(73) Assignee: Box, Inc., Los Altos, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 14/166,414

(22) Filed: Jan. 28, 2014

(65) Prior Publication Data
US 2015/0082198 A1 Mar. 19, 2015

Related U.S. Application Data

(63) Continuation of application No. 14/026,837, filed on Sep. 13, 2013, now Pat. No. 8,892,679.

(51) Int. Cl.
*G06F 15/167* (2006.01)
*H04L 29/06* (2006.01)
(Continued)

(52) U.S. Cl.
CPC .............. *H04L 65/403* (2013.01); *G06F 3/01* (2013.01); *G06F 3/0484* (2013.01); *G06Q 10/10* (2013.01);
(Continued)

(58) Field of Classification Search
USPC ........ 709/203, 205, 212, 213, 217, 248, 204
See application file for complete search history.

(56) References Cited

U.S. PATENT DOCUMENTS

| 5,301,348 A | 4/1994 | Jaaskelainen |
| 5,576,946 A | 11/1996 | Bender et al. |

(Continued)

FOREIGN PATENT DOCUMENTS

| CA | 2724521 | 11/2009 |
| CN | 101997924 A | 3/2011 |

(Continued)

OTHER PUBLICATIONS

Exam Report for GB1410569.6 Applicant: Box, Inc. dated Jul. 11, 2014, 9 pages.

(Continued)

*Primary Examiner* — Michael Y Won
(74) *Attorney, Agent, or Firm* — Sheridan Ross P.C.

(57) ABSTRACT

Techniques are disclosed for implementing an intuitive interface which can facilitate collaboration among the multiple users and collaborators as well as enable utilization of content in a shared space among multiple users in a more effective way. In one embodiment, a method comprises receiving updates regarding activities performed by a user and one or more collaborators on contents in a workspace. The method further comprises displaying, on an interactive user interface, lists of information based on the updates to facilitate interaction from the user with respect to the updates. An example of the lists of information can include an activity and, if one or more files are associated with the activity, thumbnails that represent previews of the one or more files. In some embodiments, the thumbnails can enable the user to interact with the files and/or the collaborators.

27 Claims, 45 Drawing Sheets

(51) Int. Cl.
*G06Q 10/10* (2012.01)
*G06F 3/01* (2006.01)
*G06F 3/0484* (2013.01)
*H04M 1/725* (2006.01)
*H04L 29/08* (2006.01)
*G06F 15/173* (2006.01)
*H04L 12/18* (2006.01)
*H04L 12/26* (2006.01)

(52) U.S. Cl.
CPC .... *H04L 12/1859* (2013.01); *H04M 1/72519* (2013.01); *G06F 15/17325* (2013.01); *H04L 12/1831* (2013.01); *H04L 29/06414* (2013.01); *H04L 29/06537* (2013.01); *H04L 29/0854* (2013.01); *H04L 29/08675* (2013.01); *H04L 43/0817* (2013.01); *H04L 67/06* (2013.01); *H04L 67/1095* (2013.01); *H04L 67/22* (2013.01)

(56) References Cited

U.S. PATENT DOCUMENTS

| | | |
|---|---|---|
| 5,787,175 A | 7/1998 | Carter |
| 5,799,320 A | 8/1998 | Klug |
| 5,848,415 A | 12/1998 | Guck |
| 5,864,870 A | 1/1999 | Guck |
| 5,893,126 A | 4/1999 | Drews et al. |
| 5,999,908 A | 12/1999 | Abelow |
| 6,034,621 A | 3/2000 | Kaufman |
| 6,055,543 A | 4/2000 | Christensen et al. |
| 6,073,161 A | 6/2000 | DeBoskey et al. |
| 6,097,390 A | 8/2000 | Marks |
| 6,098,078 A | 8/2000 | Gehani et al. |
| 6,233,600 B1 | 5/2001 | Salas et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,789,109 B2 | 9/2004 | Samra et al. |
| 6,859,909 B1 | 2/2005 | Lerner et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,107,549 B2 | 9/2006 | Deaton et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,435 B1 | 12/2006 | Day et al. |
| 7,155,483 B1 | 12/2006 | Friend et al. |
| 7,165,107 B2 | 1/2007 | Pouyoul et al. |
| 7,213,206 B2 | 5/2007 | Fogg |
| 7,222,078 B2 | 5/2007 | Abelow |
| 7,243,299 B1 | 7/2007 | Rubin et al. |
| 7,246,118 B2 | 7/2007 | Chastain et al. |
| 7,275,244 B1 | 9/2007 | Bell et al. |
| 7,296,025 B2 | 11/2007 | Kung et al. |
| 7,305,436 B2 | 12/2007 | Willis |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,401,117 B2 | 7/2008 | Dan et al. |
| 7,437,421 B2 | 10/2008 | Bhogal et al. |
| 7,467,415 B2 | 12/2008 | Carter |
| 7,496,830 B2 | 2/2009 | Rubin et al. |
| 7,496,841 B2 | 2/2009 | Hadfield et al. |
| 7,543,000 B2 | 6/2009 | Castro et al. |
| 7,581,221 B2 | 8/2009 | Lai et al. |
| 7,620,565 B2 | 11/2009 | Abelow |
| 7,627,831 B2 | 12/2009 | Chiu et al. |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,930,418 B2 | 4/2011 | Samra et al. |
| 7,937,663 B2 | 5/2011 | Parker et al. |
| 7,958,453 B1 | 6/2011 | Taing |
| 7,962,853 B2 | 6/2011 | Bedi et al. |
| 7,979,296 B2 | 7/2011 | Kruse et al. |
| 7,996,374 B1 | 8/2011 | Jones et al. |
| 8,024,661 B2 | 9/2011 | Bibliowicz et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,108,779 B1 | 1/2012 | Rein et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,214,747 B1 | 7/2012 | Yankovich et al. |
| 8,230,348 B2 | 7/2012 | Peters et al. |
| 8,347,276 B2 | 1/2013 | Schadow |
| 8,358,701 B2 | 1/2013 | Chou et al. |
| 8,374,944 B2 | 2/2013 | Robb |
| 8,429,540 B1 | 4/2013 | Yankovich et al. |
| 8,464,161 B2 | 6/2013 | Giles et al. |
| 8,527,549 B2 | 9/2013 | Cidon |
| 8,549,066 B1 | 10/2013 | Donahue et al. |
| 8,549,511 B2 | 10/2013 | Seki et al. |
| 8,607,306 B1 | 12/2013 | Bridge et al. |
| 8,682,973 B2 | 3/2014 | Kikin-Gil et al. |
| 8,706,810 B2 | 4/2014 | Vishnubhatla et al. |
| 8,756,513 B1 | 6/2014 | Schmieder et al. |
| 8,849,955 B2 | 9/2014 | Prahlad et al. |
| 8,892,679 B1 | 11/2014 | Destagnol et al. |
| 8,943,197 B1 | 1/2015 | Taylor et al. |
| 9,053,079 B2 | 6/2015 | Bailor et al. |
| 9,063,912 B2 | 6/2015 | Seibert, Jr. et al. |
| 9,069,743 B2 | 6/2015 | Kotler et al. |
| 9,223,635 B2 | 12/2015 | Huang et al. |
| 9,224,073 B2 | 12/2015 | Okajima |
| 9,224,129 B2 | 12/2015 | Sitrick et al. |
| 9,235,268 B2 | 1/2016 | Arrasvuori et al. |
| 9,252,962 B1 | 2/2016 | Valeti |
| 9,256,341 B2 | 2/2016 | Megiddo et al. |
| 9,357,076 B2 | 5/2016 | Rosenberg |
| 9,483,473 B2 | 11/2016 | Ansel et al. |
| 9,519,886 B2 | 12/2016 | Berger et al. |
| 9,704,137 B2 | 7/2017 | Berger et al. |
| 2001/0027492 A1 | 10/2001 | Gupta |
| 2002/0049786 A1 | 4/2002 | Bibliowicz et al. |
| 2002/0091738 A1 | 7/2002 | Rohrabaugh et al. |
| 2002/0099552 A1 | 7/2002 | Rubin et al. |

(56) References Cited

U.S. PATENT DOCUMENTS

| | | |
|---|---|---|
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0009459 A1 | 1/2003 | Chastain et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0172588 A1 | 9/2004 | Mattaway |
| 2004/0177138 A1 | 9/2004 | Salle et al. |
| 2004/0181579 A1 | 9/2004 | Huck et al. |
| 2004/0221239 A1 | 11/2004 | Hachigian et al. |
| 2004/0230624 A1 | 11/2004 | Frolund et al. |
| 2004/0246532 A1 | 12/2004 | Inada |
| 2004/0250201 A1 | 12/2004 | Caspi |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0018828 A1 | 1/2005 | Nierhaus et al. |
| 2005/0022229 A1 | 1/2005 | Gabriel et al. |
| 2005/0028006 A1 | 2/2005 | Leser et al. |
| 2005/0033813 A1 | 2/2005 | Bhogal et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0209808 A1 | 9/2005 | Kelbon et al. |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0080432 A1 | 4/2006 | Spataro et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0242204 A1 | 10/2006 | Karas et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0038934 A1 | 2/2007 | Fellman |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0084984 A1 | 4/2008 | Levy et al. |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0147810 A1 | 6/2008 | Kumar et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0094546 A1 | 4/2009 | Anzelde et al. |
| 2009/0106642 A1 | 4/2009 | Albornoz et al. |
| 2009/0111509 A1 | 4/2009 | Mednieks et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0158337 A1* | 6/2009 | Stiers ................ H04N 5/44591 725/44 |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |

(56) References Cited

U.S. PATENT DOCUMENTS

| | | |
|---|---|---|
| 2009/0254589 A1 | 10/2009 | Nair et al. |
| 2009/0260060 A1 | 10/2009 | Smith et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0040217 A1 | 2/2010 | Aberg et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0113320 A1 | 5/2011 | Neff et al. |
| 2011/0119313 A1 | 5/2011 | Sung et al. |
| 2011/0134204 A1 | 6/2011 | Rodriguez et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209052 A1 | 8/2011 | Parker et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0249024 A1 | 10/2011 | Arrasvuori et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0036423 A1 | 2/2012 | Haynes, II et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0192099 A1 | 7/2012 | Carbonera et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0221937 A1 | 8/2012 | Patterson et al. |
| 2012/0226767 A1 | 9/2012 | Luna et al. |
| 2012/0233155 A1 | 9/2012 | Gallmeier et al. |
| 2012/0233205 A1 | 9/2012 | McDermott |

(56) References Cited

U.S. PATENT DOCUMENTS

| | | |
|---|---|---|
| 2012/0233543 A1 | 9/2012 | Vagell et al. |
| 2012/0240061 A1 | 9/2012 | Hillenius et al. |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0013812 A1 | 1/2013 | Kessel et al. |
| 2013/0014023 A1 | 1/2013 | Lee et al. |
| 2013/0024418 A1 | 1/2013 | Sitrick et al. |
| 2013/0031208 A1* | 1/2013 | Linton .................. H04L 67/125 709/217 |
| 2013/0042106 A1 | 2/2013 | Persaud et al. |
| 2013/0047093 A1 | 2/2013 | Reuschel et al. |
| 2013/0055127 A1 | 2/2013 | Saito et al. |
| 2013/0067232 A1 | 3/2013 | Cheung et al. |
| 2013/0067594 A1 | 3/2013 | Kantor et al. |
| 2013/0073403 A1 | 3/2013 | Tuchman et al. |
| 2013/0080913 A1 | 3/2013 | Rodrig et al. |
| 2013/0080919 A1 | 3/2013 | Kiang et al. |
| 2013/0080966 A1 | 3/2013 | Kikin-Gil et al. |
| 2013/0091440 A1 | 4/2013 | Kotler et al. |
| 2013/0097481 A1 | 4/2013 | Kotler et al. |
| 2013/0117240 A1 | 5/2013 | Taylor et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0151940 A1 | 6/2013 | Bailor et al. |
| 2013/0155071 A1 | 6/2013 | Chan et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0169742 A1 | 7/2013 | Wu et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0305039 A1 | 11/2013 | Gauda |
| 2013/0311551 A1 | 11/2013 | Thibeault |
| 2013/0326344 A1 | 12/2013 | Masselle et al. |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0019882 A1 | 1/2014 | Chew et al. |
| 2014/0026025 A1 | 1/2014 | Smith |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0072945 A1* | 3/2014 | Gu .......................... G09B 5/12 434/350 |
| 2014/0156373 A1 | 6/2014 | Roberts et al. |
| 2014/0172595 A1 | 6/2014 | Beddow et al. |
| 2014/0280961 A1 | 9/2014 | Martinez et al. |
| 2014/0310345 A1 | 10/2014 | Megiddo et al. |
| 2014/0351346 A1 | 11/2014 | Barton |
| 2015/0135097 A1 | 5/2015 | Carriero et al. |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

Extended Search Report for EP131832800, Applicant: Box, Inc. dated Aug. 25, 2014, 7 pages.
Extended Search Report for EP141509422, Applicant: Box, Inc. dated Aug. 26, 2014, 12pages.
Search Report for EP 13189144.2 Applicant: Box, Inc. dated Sep. 1, 2014, 9 pages.
Exam Report for GB1312874.9 Applicant: Box, Inc. dated Sep. 26, 2014, 2 pages.
Exam Report for GB1415126.0 Applicant: Box, Inc. dated Oct. 2, 2014, 8 pages.
Exam Report for GB1415314.2 Applicant: Box, Inc. dated Oct. 7, 2014, 6 pages.
Exam Report for GB1309209.3 Applicant: Box, Inc. dated Oct. 7, 2014, 3 pages.
Exam Report for GB1315232.7 Applicant: Box, Inc. dated Oct. 9, 2014, 5 pages.
Exam Report for GB1318789.3 Applicant: Box, Inc. dated Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. dated Nov. 7, 2014, 6 pages.

(56) References Cited

OTHER PUBLICATIONS

Exam Report for GB1311417.8 Applicant: Box, Inc. dated Nov. 7, 2014, 2 pages.
Exam Report for GB1311421.0 Applicant: Box, Inc. dated Nov. 7, 2014, 4 pages.
Exam Report for GB1316682.2 Applicant: Box, Inc. dated Nov. 19, 2014, 6 pages.
Exam Report for GB1312095.1 Applicant: Box, Inc. dated Nov. 19, 2014, 5 pages.
Exam Report for GB1313559.5 Applicant: Box, Inc. dated Nov. 4, 2014, 2 pages.
User's Guide for SMART Board Software for Windows, published Dec. 2004, 90 pages.
Zambonini et al., "Automated Measuring of Interaction with User Interfaces," Published as WOWO2007113573 Oct. 2007, 19 pages.
"Average Conversion Time for a D60 RAW file?" http://www.dpreview.com, Jul. 22, 2002, 4 pages.
"Revolving sync conflicts; frequently asked questions," Microsoft Tech Support, Jul. 16, 2012, retrieved from the Internet: http://web.archive.org/web, 2 pagesp.
"Troubleshoot sync problems," Microsoft Tech Support: May 2, 2012, retrieved from the Internet, http://web. Archive.org/web, 3 pages.
"Tulsa TechFest 2012—Agenda," retrieved from the website, http://web.archive.org, Oct. 2, 2012, 2 pages.
Burns, "Developing Secure Mobile Applications for Android," Oct. 2008, Version 1.0, 1-28 pages.
Cohen, "Debating the Definition of Cloud Computing Platforms," retrieved from the internet, http://forbes.com, Feb. 3, 2014, 7 pages.
Cohen, "Debating the Definition of Cloud Computing Platforms," retrieved from the internet, http:::/forbes.com, Feb. 3, 2014, 7 pages.
Comes, "MediaXchange User's Manual," Version 1.15.15, Feb. 1, 2009, pp. 1-90.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. dated May 26, 2014, 6 pages.
Exam Report for GB1308842.2, Applicant: Box, Inc. dated Mar. 10, 2014, 4 pages.
Exam Report for GB1312264.3, Applicant: Box, Inc. dated Mar. 24, 2014, 7 pages.
Exam Report for GB1314771.5, Applicant: Box, Inc. dated Feb. 17, 2014, 7 pages.
Exam Report for GB1318792.7, Applicant: Box, Inc. dated May 22, 2014, 2 pages.
John et al., "Always Sync Support Forums—View topic—Allway sync funny behavior," Allway Sync Support Forum at http://sync-center.com, Mar. 28, 2011, XP055109680, 2 pages.
Partial Search Report for EP131832800, Applicant: Box, Inc. dated May 8, 2014, 5 pages.
Pyle et al. "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP 11729851.3, Applicant: Box, Inc. datedd Feb. 7, 2014, 9 pages.
Search Report for EP13187217.8, Applicant: Box, Inc. dated Apr. 15, 2014, 12 pages.
Search Report for EP141509422, Applicant: Box, Inc. dated May 8, 2014, 7 pages.
Search Report for EP14151588.2, Applicant: Box, Inc. dated Apr. 15, 2014, 12 pages.
Search Report for EP14153783.7, Applicant: Box, Inc. dated Mar. 24, 2014, 7 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
Exam Report for EP13158415.3, Applicant: Box, Inc. dated Jun. 4, 2013, 8 pages.
Exam Report for EP13168784.0, Applicant: Box, Inc. dated Nov. 21, 2013, 7 pages.
Exam Report for EP13185269.1, Applicant: Box, Inc. dated Jan. 28, 7 pages.
Exam Report for GB1300188.8, Applicant: Box, Inc. dated May 31, 2013, 8 pages.
Exam Report for GB1306011.6, Applicant: Box, Inc. dated Apr. 18, 2013, 8 pages.
Exam Report for GB1309209.3, Applicant: Box, Inc. dated Oct. 30, 2013, 11 pages.
Exam Report for GB1310666.1, Applicant: Box, Inc. dated Aug. 30, 2013, 10 pages.
Exam Report for GB1311417.8, Applicant: Box, Inc. dated Dec. 20, 2013, 5 pages.
Exam Report for GB1312095.1, Applicant: Box, Inc. dated Dec. 12, 2013, 7 pages.
Exam Report for GB1312874.9, Applicant: Box, Inc. dated Dec. 20, 2013, 11 pages.
Exam Report for GB1313559.5, Applicant: Box, Inc., dated Aug. 22, 2013, 19 pages.
Exam Report for GB1316532.9, Applicant: Box, Inc. dated Oct. 31, 2013, 10 pages.
Exam Report for GB1316533.7, Applicant: Box, Inc. dated Oct. 8, 2013, 9 pages.
Exam Report for GB1316971.9, Applicant: Box, Inc. dated Nov. 26, 2013, 10 pages.
Exam Report for GB1317600.3, Applicant: Box, Inc. dated Nov. 21, 2013, 8 pages.
Exam Report for GB1318373.6, Applicant: Box, Inc. dated Dec. 17, 2013, 4 pages.
Exam Report for GB1320902.8, Applicant: Box, Inc. dated Dec. 20, 2013, 4 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.

(56) References Cited

OTHER PUBLICATIONS

International Search Report and Written Opinion for PCT/US2008/012973 dated Apr. 30, 2009, pp. 1-11.
International Search Report and Written Opinion for PCT/US2011/039126 dated Oct. 6, 2011, pp. 1-13.
International Search Report and Written Opinion for PCT/US2011/041308 dated Jul. 2, 2012, pp. 1-16.
International Search Report and Written Opinion for PCT/US2011/047530, Applicant: Box, Inc., dated Mar. 22, 2013, pp. 1-10.
International Search Report and Written Opinion for PCT/US2011/056472 dated Jun. 22, 2012, pp. 1-12.
International Search Report and Written Opinion for PCT/US2011/057938, Applicant: Box, Inc., dated Mar. 29, 2013, 10 pages.
International Search Report and Written Opinion for PCT/US2011/060875 dated Oct. 30, 2012, pp. 1-10.
International Search Report and Written Opinion for PCT/US2012/056955, Applicant: Box, Inc., dated Mar. 27, 2013, pp. 1-11.
International Search Report and Written Opinion for PCT/US2012/063041, Applicant: Box, Inc., dated Mar. 29, 2013, 12 pages.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/070366, Applicant: Box, Inc., dated Apr. 24, 2013, 10 pages.
International Search Report and Written Opinion for PCT/US2013/020267, Applicant: Box, Inc., dated May 7, 2013, 10 pages.
International Search Report and Written Opinion for PCT/US2013/023889, Applicant: Box, Inc., dated Jun. 24, 2013, 13 pages.
International Search Report and Written Opinion for PCT/US2013/029520, Applicant: Box, Inc., dated Jun. 26, 2013, 10 pages.
International Search Report and Written Opinion for PCT/US2013/034662, Applicant: Box, Inc., dated May 31, 2013, 10 pages.
International Search Report and Written Opinion for PCT/US2013/034765, Applicant: Box, Inc., dated Jan. 20, 2014, 15 pages.
International Search Report and Written Opinion for PCT/US2013/035404, Applicant: Box, Inc., dated Jun. 26, 2013, 13 pages.
International Search Report and Written Opinion for PCT/US2013/039782, Applicant: Box, Inc., dated Aug. 28, 2013, 15 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1- 2.
Patent Court Document of Approved Judgment for GB0602349.3 and GB0623571.7; Mar. 3, 2009, 17 pages.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Matt V., "Comparison of Lightbox-type Modules," (http://web.archive.org/web/20130510120527/http://drupal.org/node/266126; dated May 10, 2013; last accessed Jun. 23, 2015, 15 pages.
Exam Report for GB1415314.2; Applicant: Box, Inc. dated Aug. 14, 2015, 2 pages.

* cited by examiner

SYSTEM AND METHOD OF A MULTI-FUNCTIONAL MANAGING USER INTERFACE FOR ACCESSING A CLOUD-BASED PLATFORM VIA MOBILE DEVICES

CROSS-REFERENCE TO RELATED APPLICATIONS

This application is a continuation application of U.S. patent application Ser. No. 14/026,837 titled "MOBILE DEVICE, METHODS AND USER INTERFACES THEREOF IN A MOBILE DEVICE PLATFORM FEATURING MULTIFUNCTIONAL ACCESS AND ENGAGEMENT IN A COLLABORATIVE ENVIRONMENT PROVIDED BY A CLOUD-BASED PLATFORM" filed on Sep. 13, 2013, the entire content of which is expressly incorporated by reference herein.

BACKGROUND

With the advancements in digital technologies, data proliferation and the ever increasing mobility of user platforms have created enormous amounts of information traffic over mobile and computer networks. This is particularly relevant with the increase of electronic and digital content being used in social settings or shared environments of digital content compared to traditional stand-alone personal computers and mobile devices. As a result, content is shared across multiple devices among multiple users.

However, content sharing and synchronization currently lacks an intuitive interface which facilitates collaboration among the multiple users and collaborators as well as enables utilization of content in a shared space among multiple users in a more effective way.

BRIEF DESCRIPTION OF DRAWINGS

The present embodiments are illustrated by way of example and are not intended to be limited by the figures of the accompanying drawings. In the drawings.

The same reference numbers and any acronyms identify elements or acts with the same or similar structure or functionality throughout the drawings and specification for ease of understanding and convenience.

DETAILED DESCRIPTION

Figure 1:
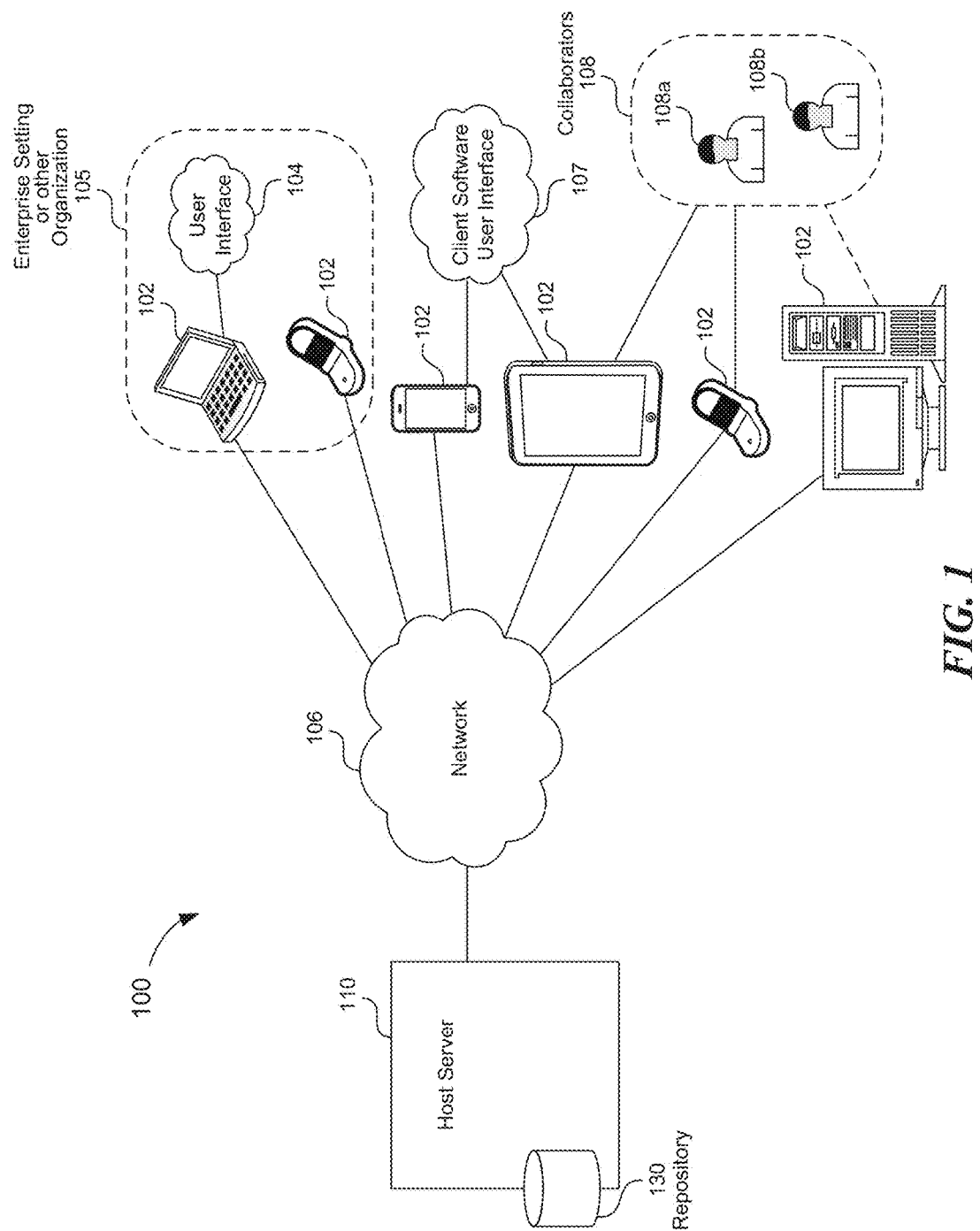
FIG. 1 depicts an example diagram of a system having a host server of a cloud service, collaboration and/or cloud storage accounts with capabilities that facilitate collaboration among users as well as enable utilization of content in the workspace in an intuitive, effective manner.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Techniques are disclosed for implementing an intuitive interface which can facilitate collaboration among the multiple users and collaborators as well as enable utilization of content in a shared space among multiple users in a more effective way. In one embodiment, a method comprises receiving updates regarding activities performed by a user and one or more collaborators on contents in a workspace. The method further comprises displaying, on an interactive user interface, lists of information based on the updates to facilitate interaction from the user with respect to the updates. An example of the lists of information can include an activity and, if one or more files are associated with the activity, thumbnails that represent previews of the one or more files. In some embodiments, the thumbnails can enable the user to interact with the files and/or the collaborators.

Among other advantages, embodiments disclosed herein provide the ability, for each person of a user and his or her collaborators, to receive real-time updates about the collaborative workspace which is shared among them in a way that provides easy-to-understand information, enables intuitive utilization of files, and promotes social interactions with respect to the real-time updates, all of which can enhance the users' collaboration experience.

FIG. 1 illustrates an example diagram of a system 100 having a host server 110 of a cloud service/platform, collaboration and/or cloud storage service with capabilities that facilitate collaboration among users as well as enable utilization of content in the workspace in an intuitive, effective manner.

The client devices 102 can be any system and/or device, and/or any combination of devices/systems that is able to establish a connection, including wired, wireless, cellular connections with another device, a server and/or other systems such as host server 110. Client devices 102 typically include a display and/or other output functionalities to present information and data exchanged between among the devices 102, and/or the host server 110.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), iOS powered watch, Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, and host server 110 are coupled via a network 106. In some embodiments, the devices 102 and host server 110 can be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through network 106, a web-based collaboration environment or online collaboration platform (e.g., hosted by the host server 110). The collaboration environment or platform can have one or more collective settings 105 for an enterprise or an organization that the users belong, and can provide an user interface 104 (e.g., via a webpage accessible by the web browsers of devices 102) for the users to access such platform under the settings 105. Additionally, a client software can be provided (e.g., through downloading from the host server 110 via the network 106) to run on the client devices 102 to provide cloud-based platform access functionalities. The users and/or collaborators can access the collaboration platform via a client software user interface 107, which can be provided by the execution of the client software on the devices 102.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user can be a creator user or administrative user, for example. The host server 110 typically is equipped with or is coupled to a repository 130 for storing the work items and/or for hosting the workspace. The repository 130 can include, for example, one or more hard drives, a centralized or distributed data cluster, or other suitable storage systems suitable for storing digital data.

In general, a workspace can be associated with a set of users or collaborators (e.g., collaborators 108) which have access to the content included therein. The levels of access (e.g., based on permissions or rules) of each user or collaborator to access the content in a given workspace can be the same or can vary among the users. Each user can have their own set of access rights to every piece of content in the workspace, or each user can be different access rights to different pieces of content. Access rights can be specified by a user associated with a workspace and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a workspace for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators in a workspace.

In general, network 106, over which the client devices 102 and the host server 110 communicate can be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 110 and can appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The embodiments disclosed herein recognize that, with the growing prevalence of the communication networks (e.g., the Internet) and smart portable devices (e.g., smart phones), there are many instances when it is desirable for a user (and the user's collaborators) to receive real-time updates about the collaborative workspace which is shared among them in a way that provides easy-to-understand information, enables intuitive utilization of files, and promotes social interactions with respect to the real-time updates. These functionalities can enhance the user's and the collaborators' collaboration experience of the cloud-based workspace.

In particular, in a large institute setting (e.g., an international corporation) where potentially a high volume of files and data are shared among users and collaborators, it is desirable to provide user-friendly interactive interface for accessing the content stored in the shared workspace in a manner that is as intuitive, straightforward, and easy as possible.

Accordingly, by taking into account many examples of visualization criteria discussed herein, the embodiments of the present disclosure can receive real-time or close-to-real-time updates about activities that took place (either by a user or the user's collaborators) in the workspace in an easy-to-understand manner. Additionally, some embodiments provide intuitive ways to allow the user to interact with the updates (including interacting with collaborators as well as utilizing the contents in the workspace) to enhance productivity.

The advantages provided by the techniques disclosed herein are particularly beneficial when a large number of collaborators are sharing the workspace, because each of a user and his or her collaborators, can receive a large number of updates, and can have a large variety of files in the shared workspace. By offering unified, multi-functional managing user interface such as the disclosed embodiments, the time to process and interact with an update information and its associated files can be reduced. Furthermore, effort to manage downloads, uploads, versions of files, and to find and learn different software for accessing different types of files, as well as the time spent on switching among software can be reduced.

In accordance with some embodiments, the devices 102 are configured to provide a multi-functional managing user interface to access the cloud-based collaboration platform. In particular, some embodiments of the devices 102 can receive updates regarding activities performed by the user and the one or more collaborators on contents in the workspace. Further, the device 102 can display, on the interactive user interface (e.g., interface 107), lists of information based on the updates to facilitate interaction from the user with respect to the updates. An example of a list of information can include an activity (e.g., upload, download, preview, comment, etc.) and, if one or more files (e.g., a JPEG photo, an AVI video, or a PDF document) are associated with the activity, thumbnails that represent previews of the one or more files. One or more embodiments provide that the thumbnails can enable the user to interact with the files, such as open, edit, play, highlight, comment, save, and so forth.

In some additional embodiments, the devices 102 are configured so that the thumbnails are to be displayed in the interactive user interface 107 based on one or more visualization criteria. For example, the client software that runs on the device 102 can detect a size of a screen on which the interactive user interface is displayed. In some embodiments, if the screen's size is what is generally regarded as a small form factor mobile device (e.g., less than or equal to 7.25 inches of screen size when measured diagonally), then a thumbnail is to occupy larger than 20% of a height of the screen. Moreover, if the screen's size is what is generally regarded as a large form factor mobile device (e.g., more than 7.25 inches of screen size when measured diagonally), then a thumbnail is to occupy larger than 10% but less than 20% of a height of the screen.

It is noted, however, that a person having ordinary skill in the art will understand that techniques disclosed herein can be selectively adopted by a client software such that the software can exclusively serve or run on a mobile device of a particular size (e.g., that belongs to a large form factor, or a small form factor).

In some embodiments, the lists of information can be sorted based on identities of who perform the activities.

Additionally or alternatively, the lists of information can be further sorted based on timestamps of the activities.

More implementation details on the multi-functional interface which can be provided on the mobile client devices 102 for accessing the workspace, the files and folders stored therein, and on the social interacting functions which can be facilitated by the interface between the user and the collaborators, are discussed in fuller detail below, and particularly with regard to FIG. 4.

Figure 2:
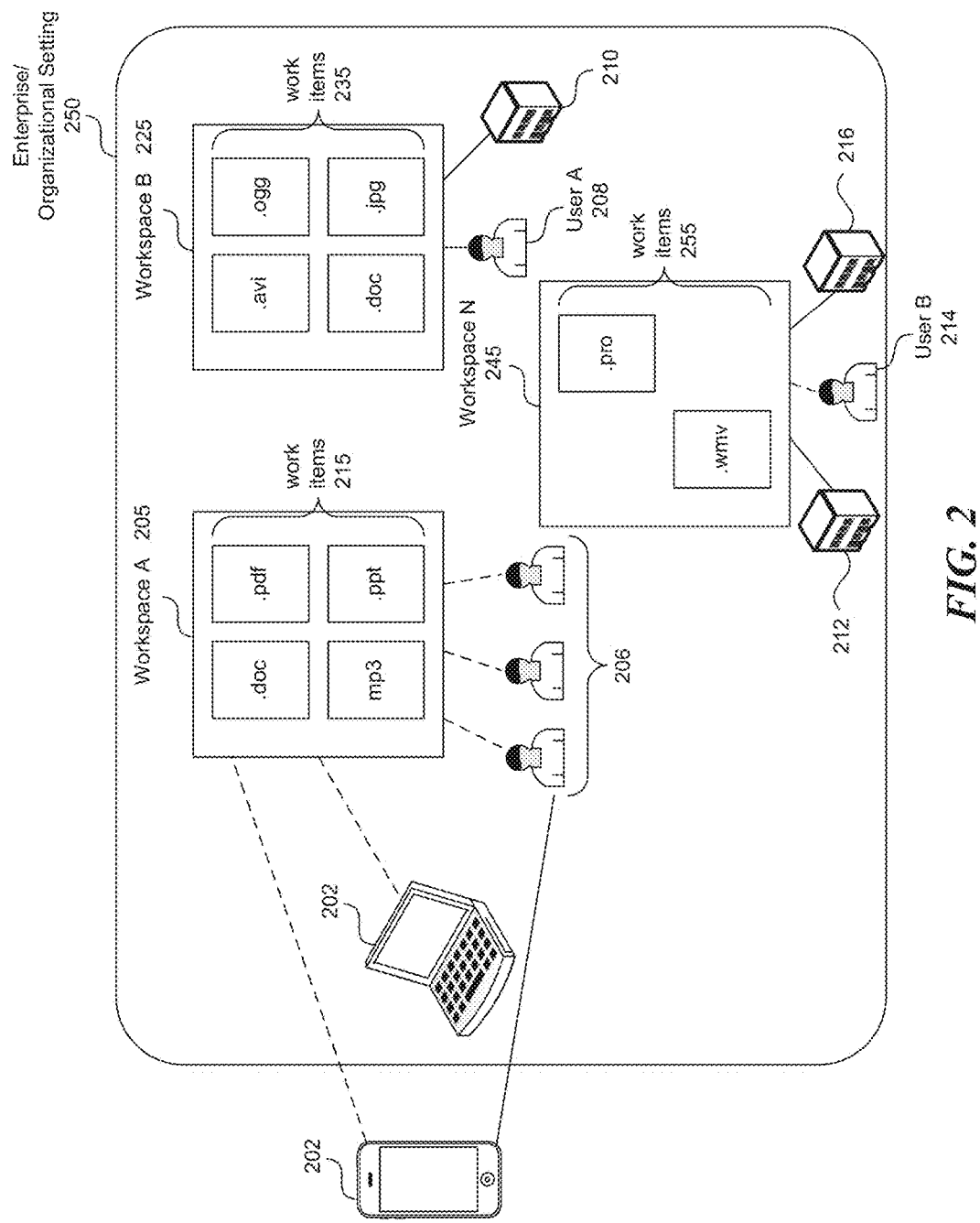
FIG. 2 depicts an example diagram of a web-based or online collaboration platform deployed in an enterprise or other organizational setting for organizing work items and workspaces.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace N can be associated with work items 255. The work items 215, 235, and 255 can be unique to each workspace but need not be. For example, a particular word document can be associated with only one workspace (e.g., workspace A 205) or it can be associated with multiple workspaces (e.g., Workspace A 205 and workspace B 225, etc.).

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208 and workspace N 245 can be associated with departments 212 and 216 and users shown as example user B 214.

Each user associated with a workspace can generally access the work items associated with the workspace. The level of access will depend on permissions associated with the specific workspace, and/or with a specific work item. Permissions can be set for the workspace or set individually on a per work item basis. For example, the creator of a workspace (e.g., one of user A 208 who creates workspace B) can set one permission setting applicable to all work items 235 for other associated users and/or users associated with the affiliate department 210, for example. Creator user A 208 can also set different permission settings for each work item, which can be the same for different users, or varying for different users.

In each workspace A, B . . . N, when an action is performed on a work item by a given user or any other activity is detected in the workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 can be in the same workspace A 205 or the user can include a newly invited collaborator. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Figure 3:
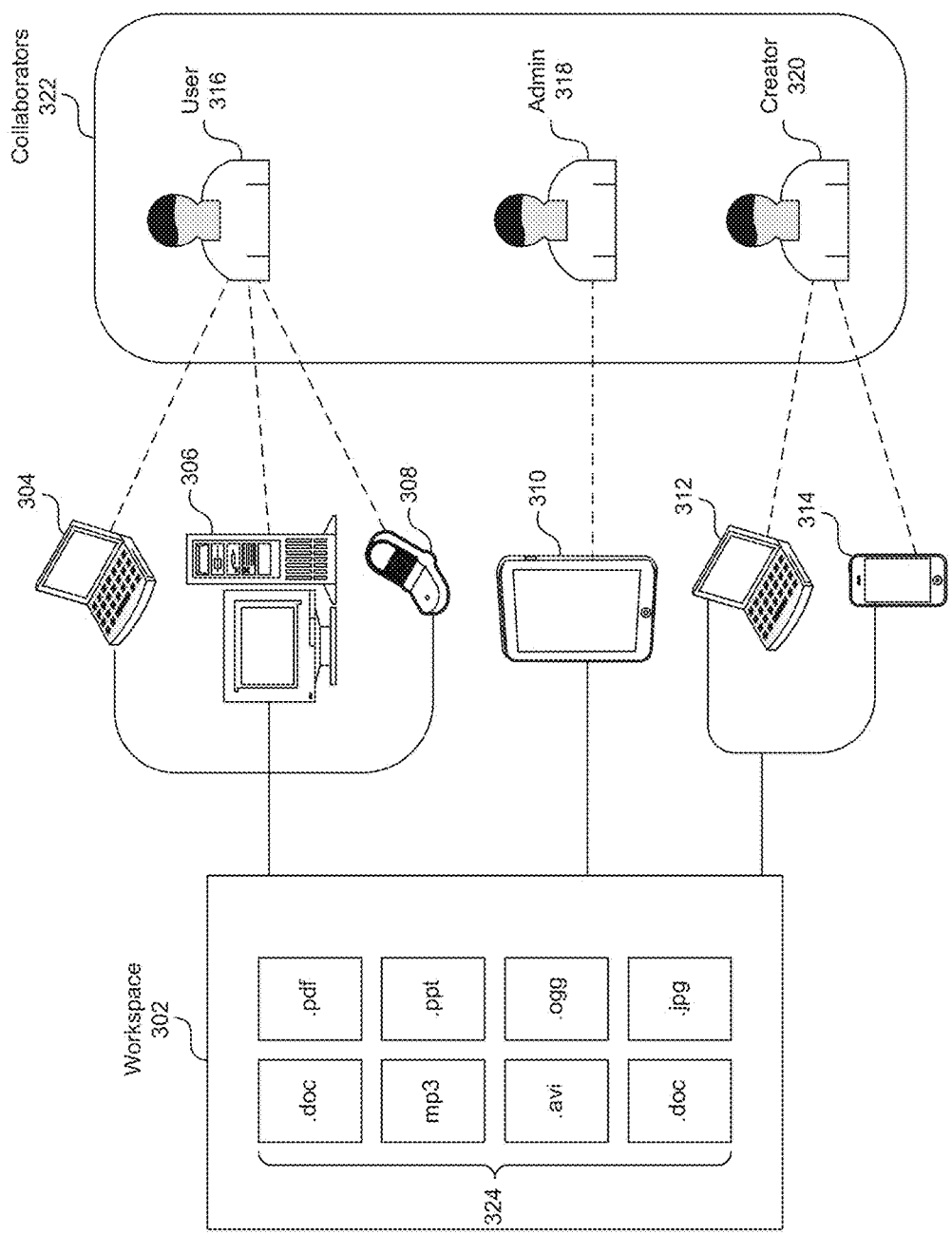
FIG. 3 depicts an example diagram of a workspace in an online or web-based collaboration environment accessible by multiple collaborators through various devices.

FIG. 3A depicts an example diagram of a workspace 302 in an online or web-based collaboration environment accessible by multiple collaborators 322 through various devices.

Each of users 316, 318, and 320 can individually use multiple different devices to access and/or manipulate work items 324 in the workspace 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302. Users can also be notified of access, edit, modification, and/or upload related-actions performed on work items 324 by other users or any other types of activities detected in the workspace 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same workspace), either in the same workspace 302 or in some other workspace. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant workspaces, in the same user interface.

Figure 4:
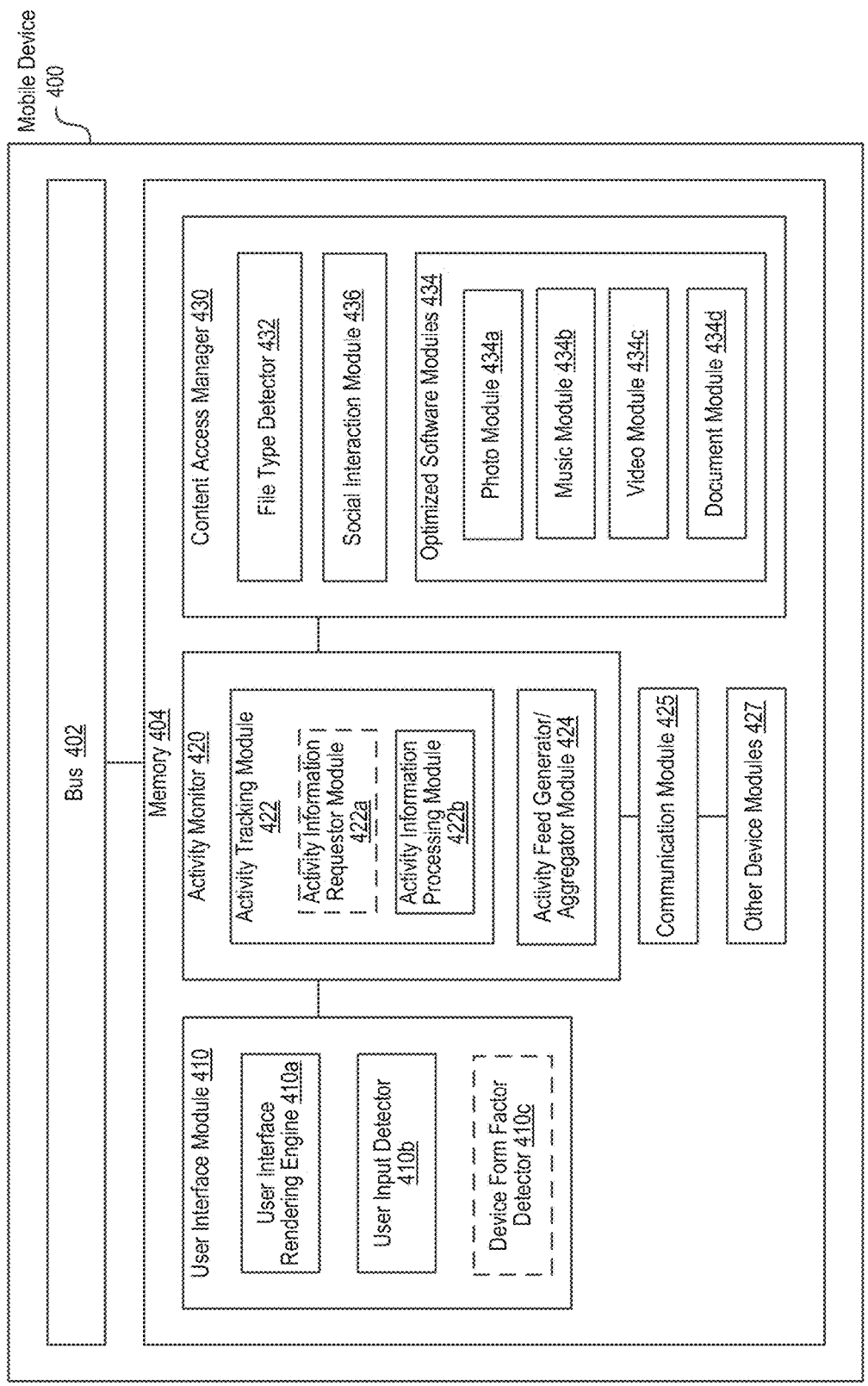
FIG. 4 depicts a block diagram illustrating an example of components in a mobile device with an interactive mobile user interface utilizing one or more techniques disclosed herein that facilitate collaboration among users as well as enable utilization of content in the workspace in an intuitive, effective manner.

FIG. 4 depicts a block diagram illustrating an example of components in a mobile device (e.g., device 102, FIG. 1; device 202, FIG. 2; devices 304-314, FIG. 3) with an interactive mobile user interface (e.g., interface 107, FIG. 1) utilizing one or more techniques disclosed herein that facilitate collaboration among users (e.g., user 208, or collaborators 206, FIG. 2; user 316 and collaborators 322, FIG. 3) as well as enable utilization of content (e.g., work items 215, 235, 255, FIG. 2; item 324, FIG. 3) in the workspace (e.g., workspace 205, 225, 245, FIG. 2; workspace 302, FIG. 3) in an intuitive, effective manner.

Figure 5A:
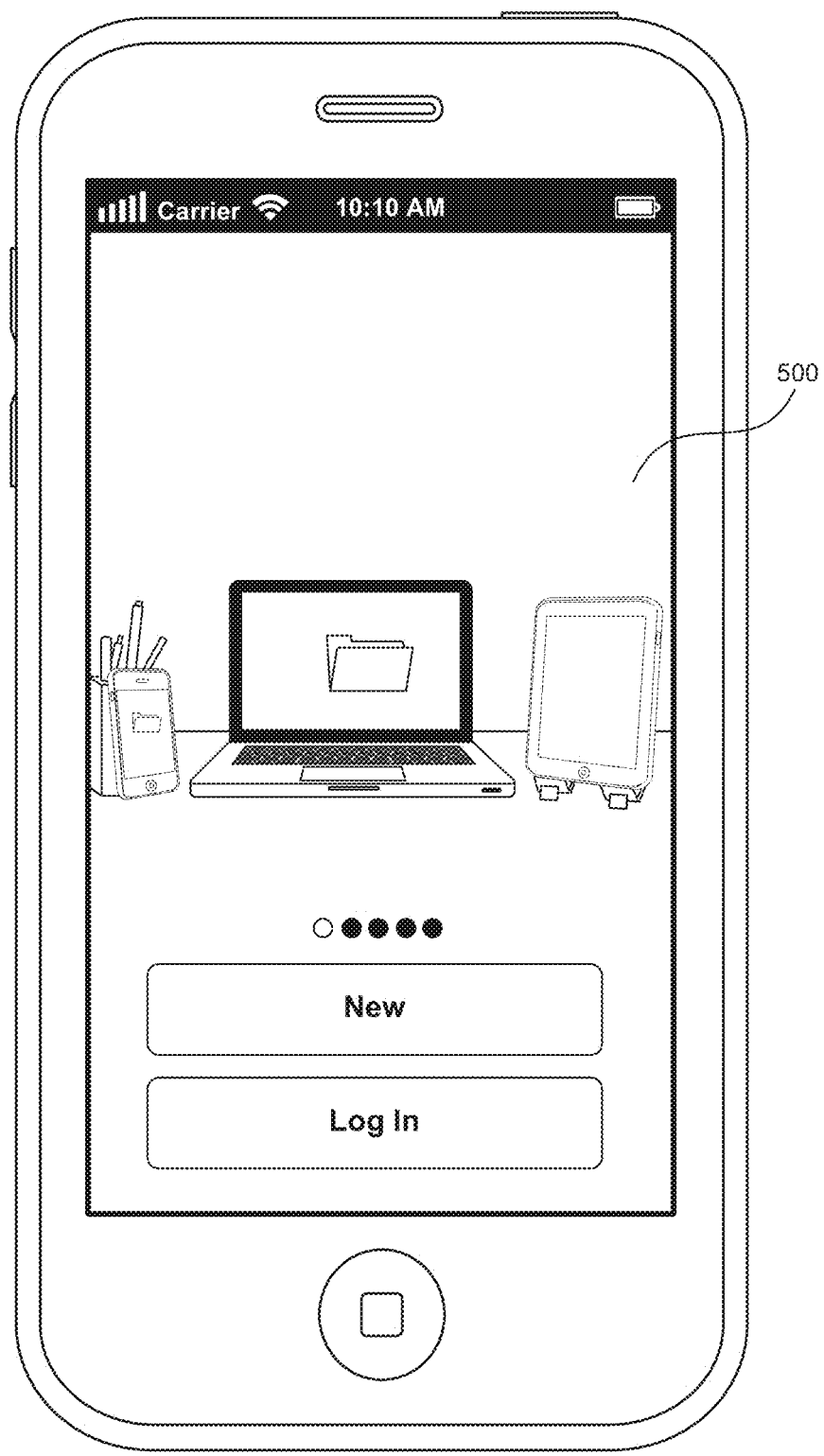
FIGS. 5A-5V respectively depict screenshots showing example user interfaces embodying one or more techniques disclosed herein for a mobile device of a small form factor.
Figure 5B:
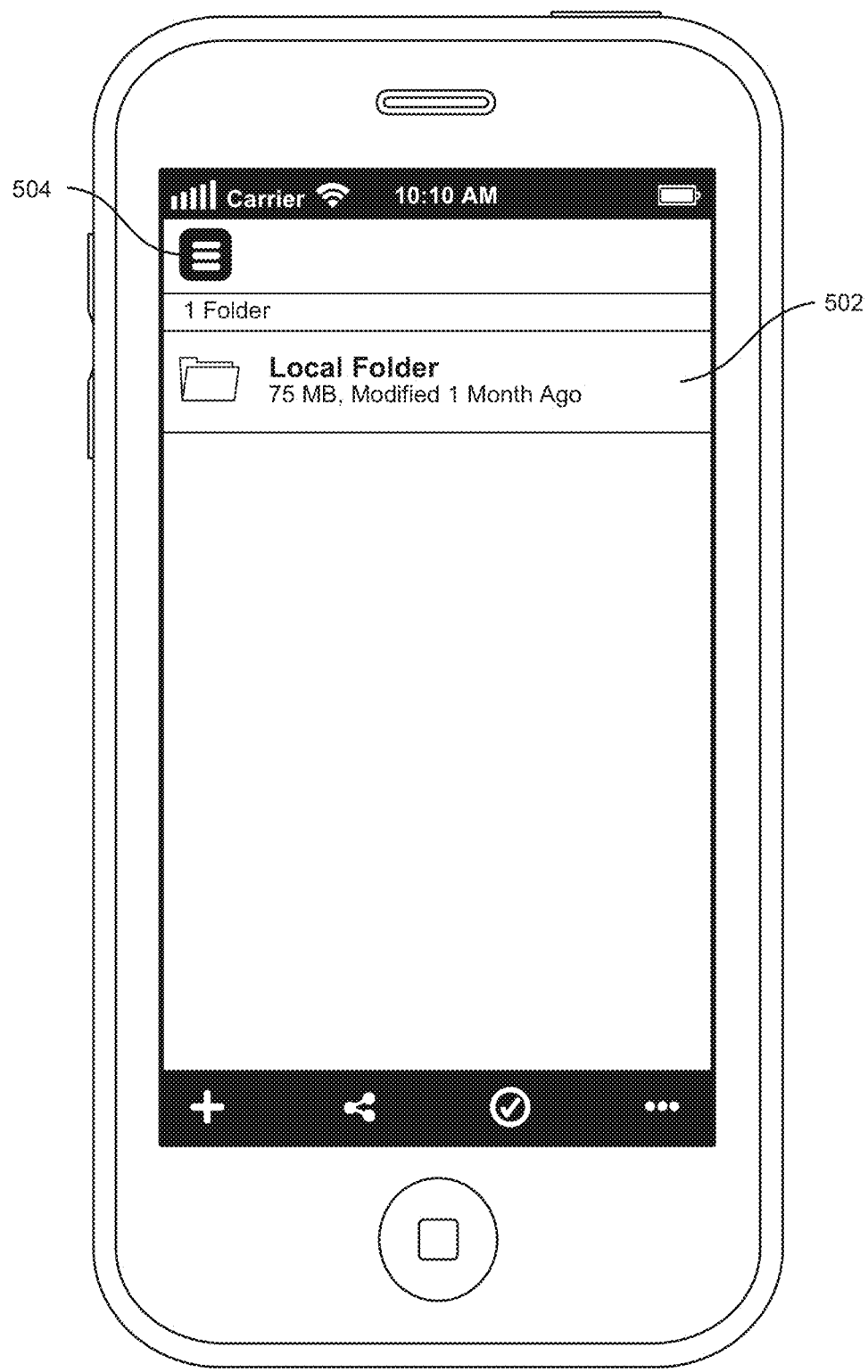
Figure 5C:
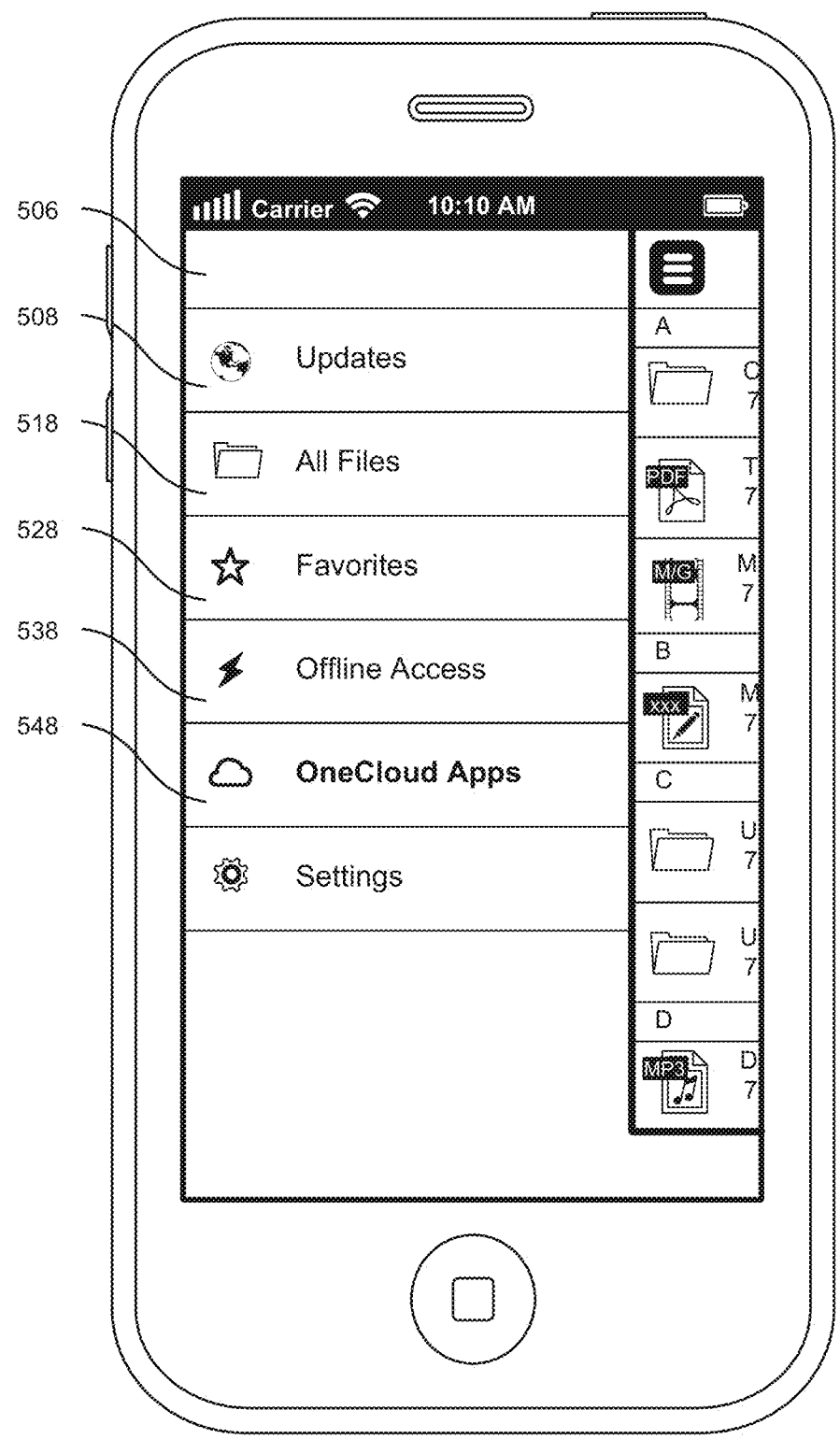
Figure 5D:
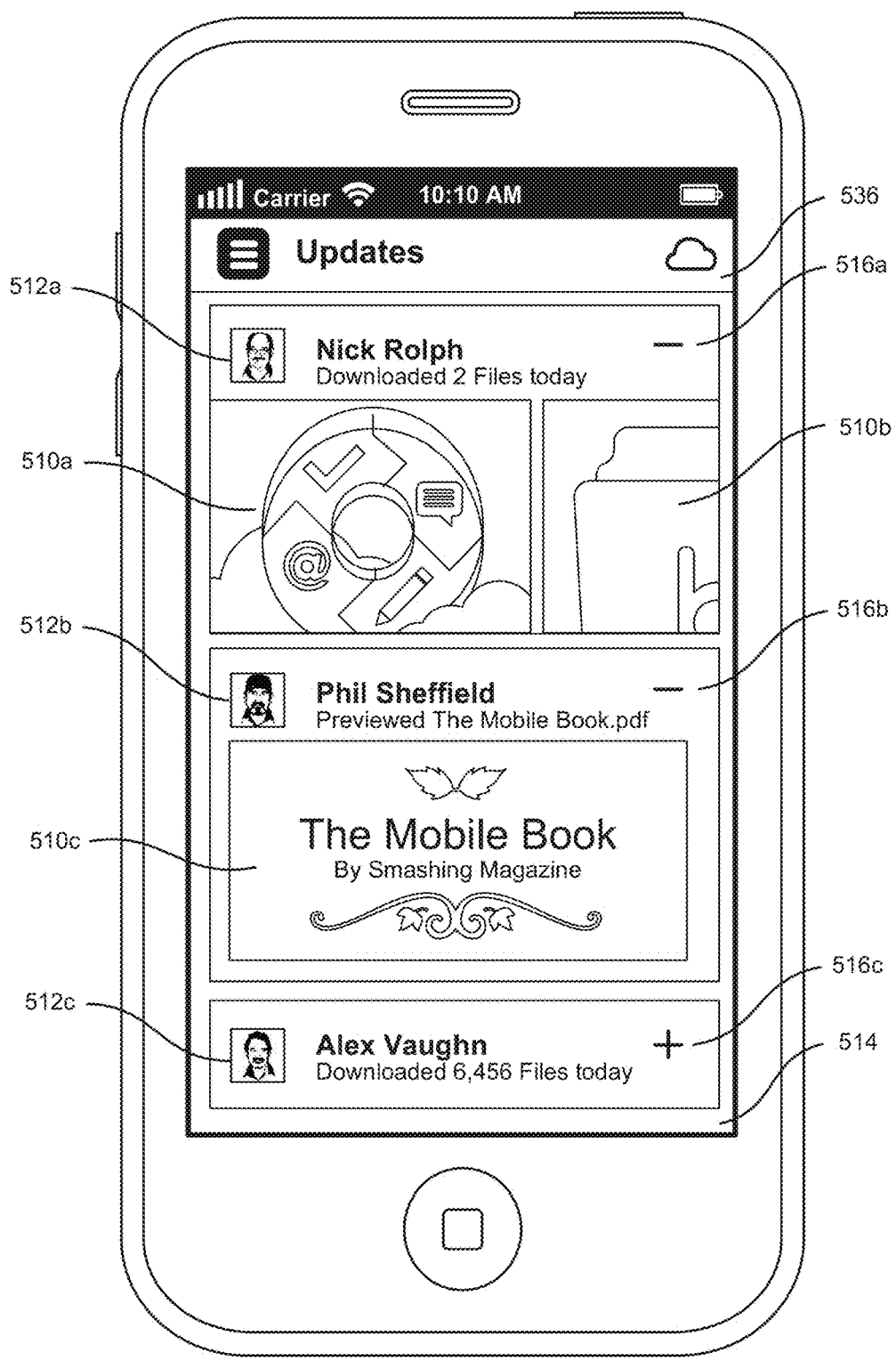
Figure 5E:
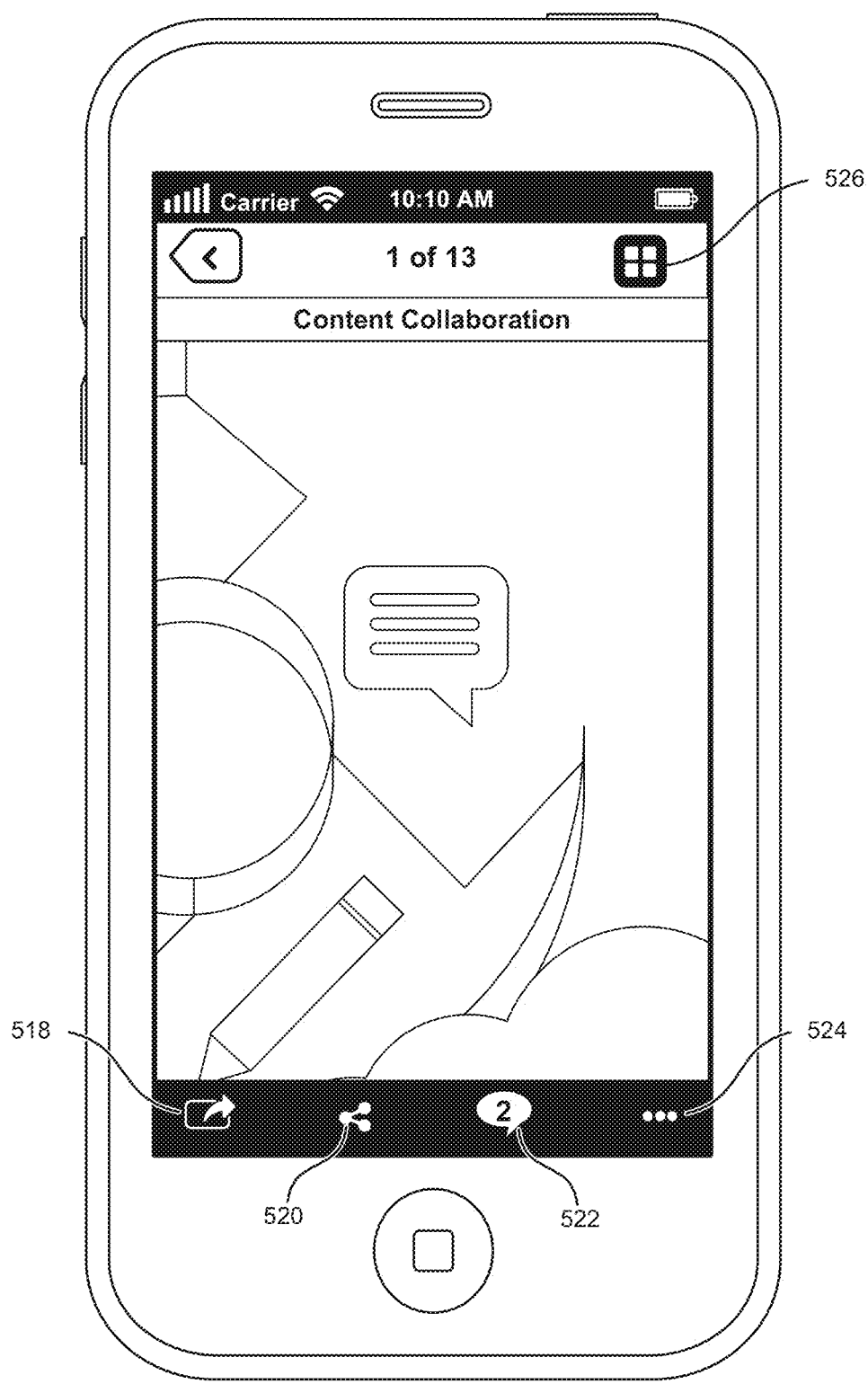
Figure 5F:
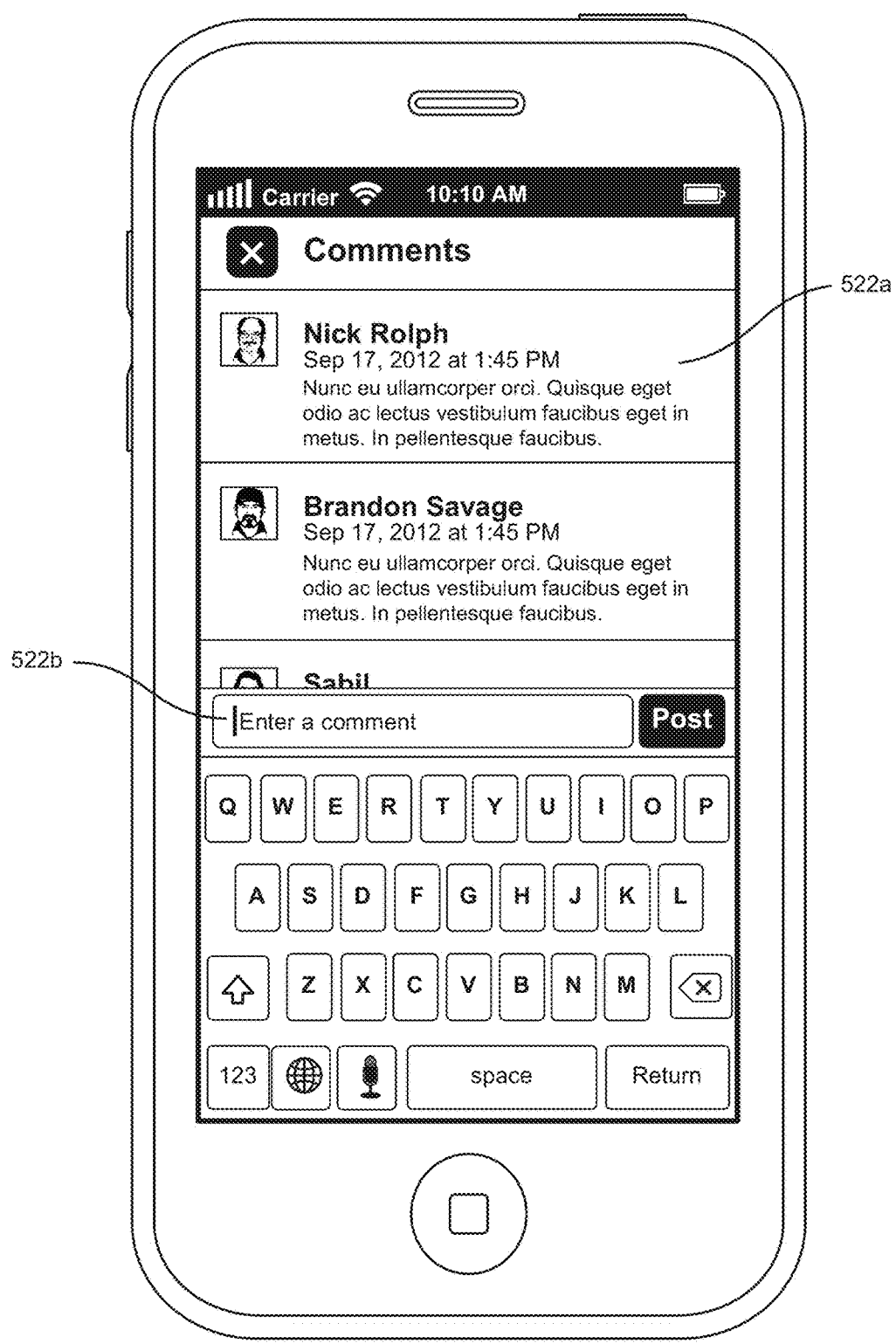
Figure 5G:
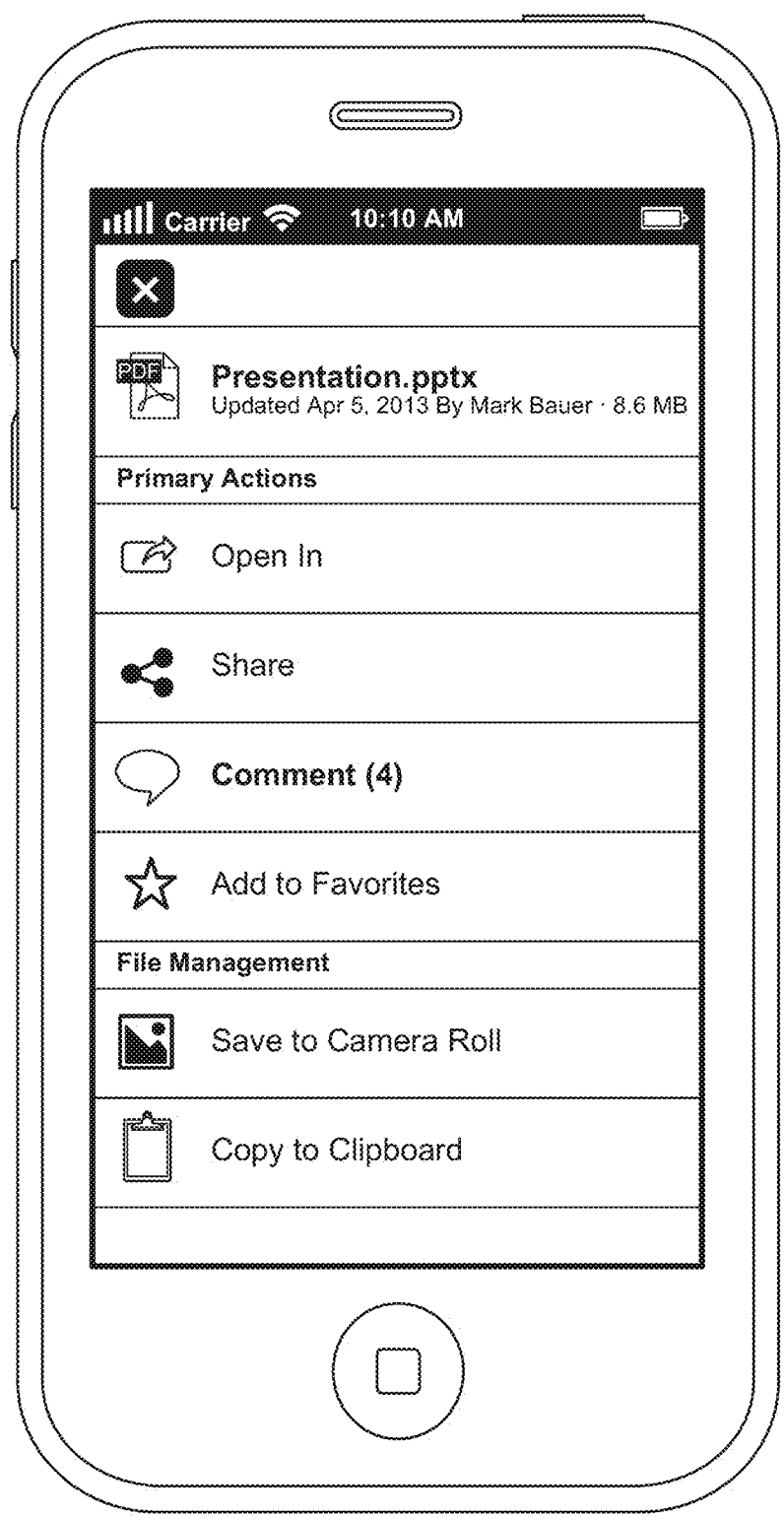
Figure 5H:
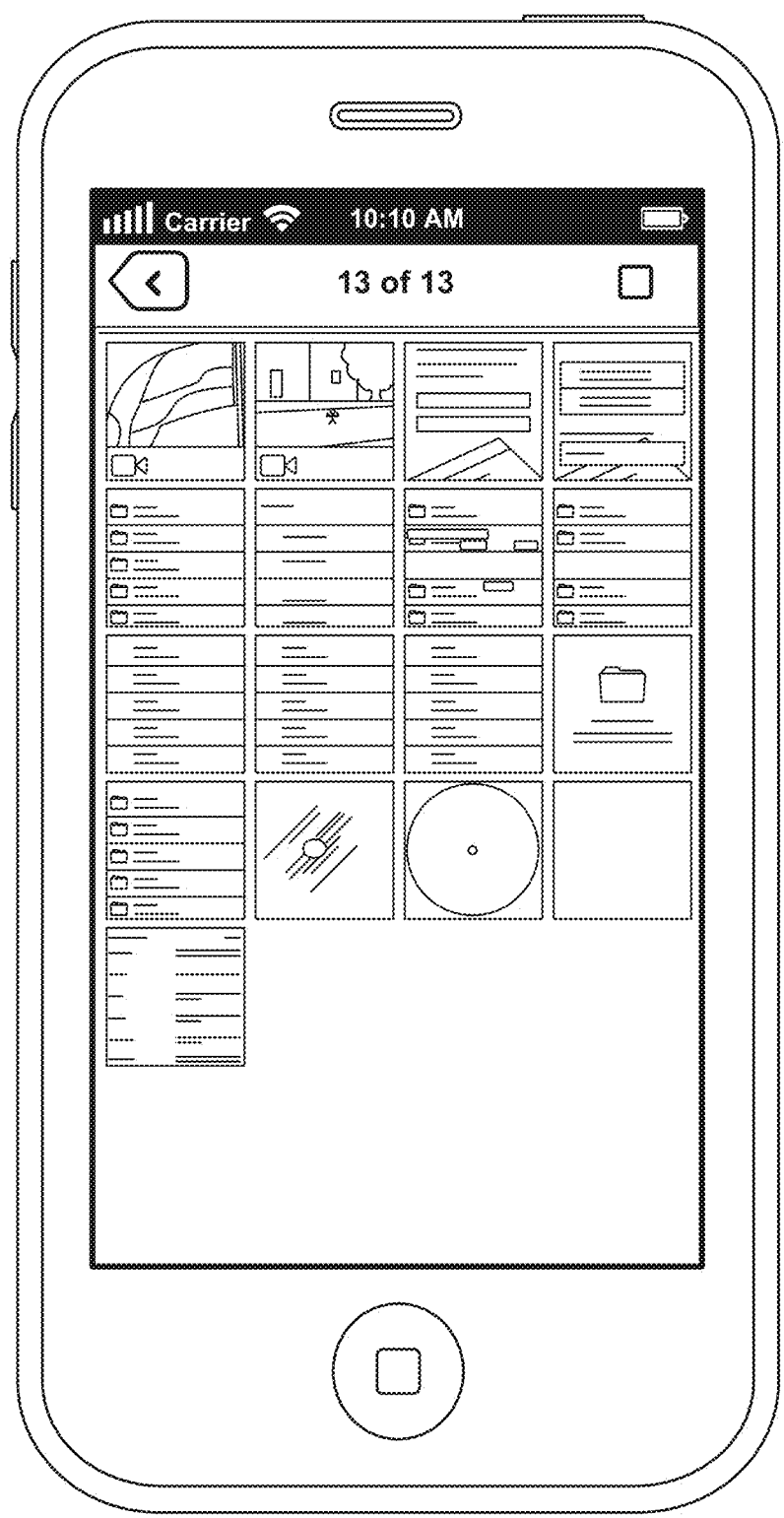
Figure 5I:
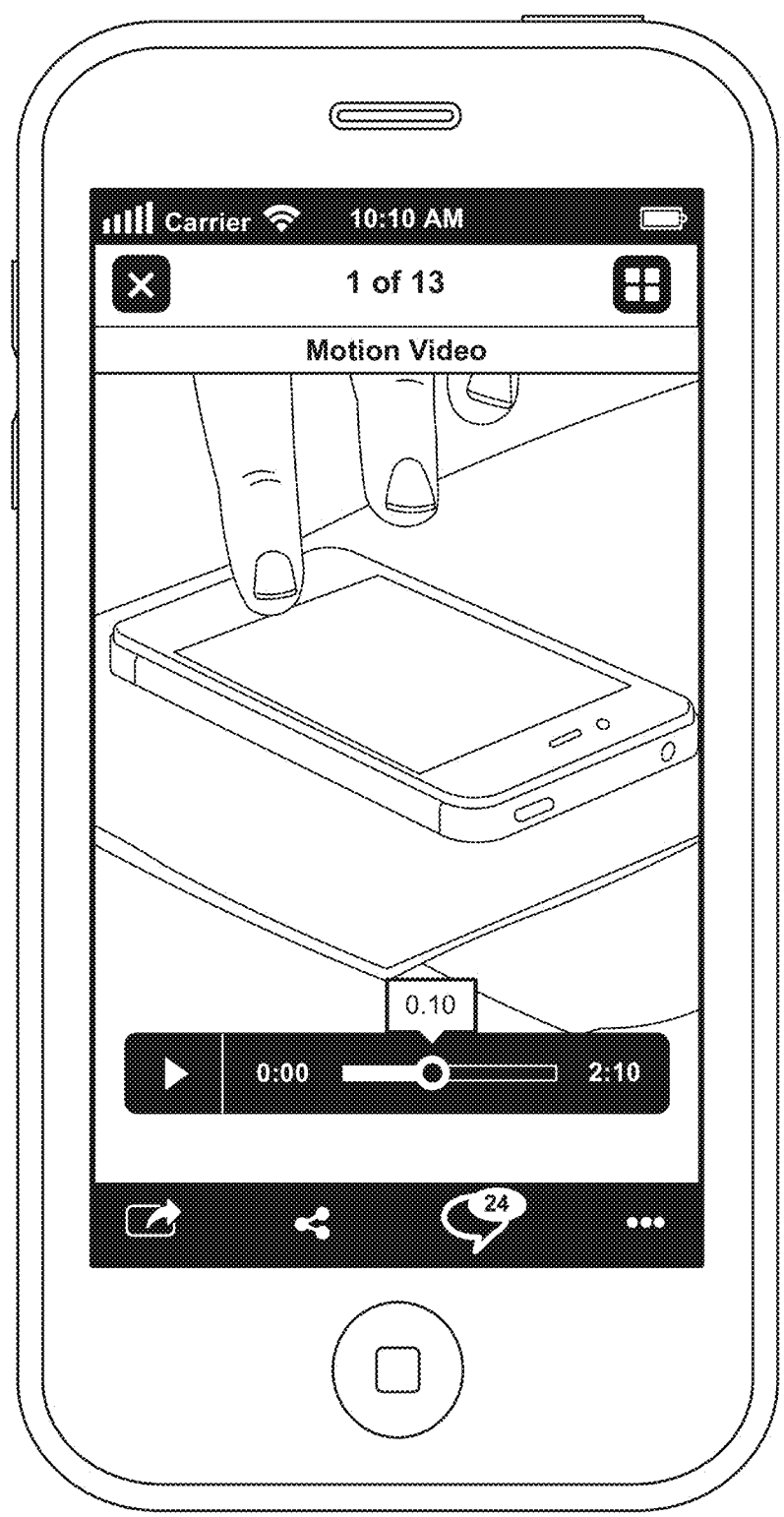
Figure 5J:
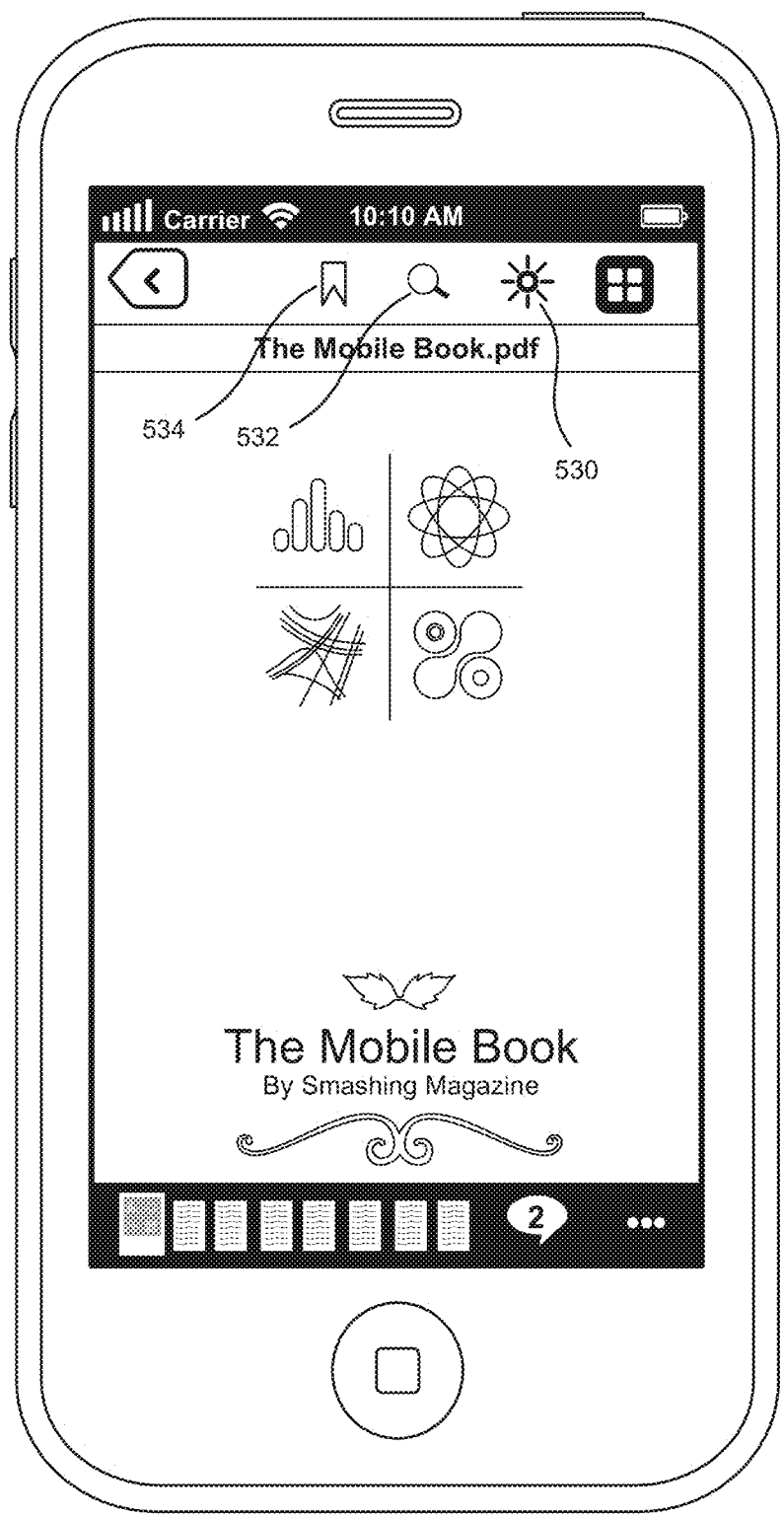
Figure 5K:
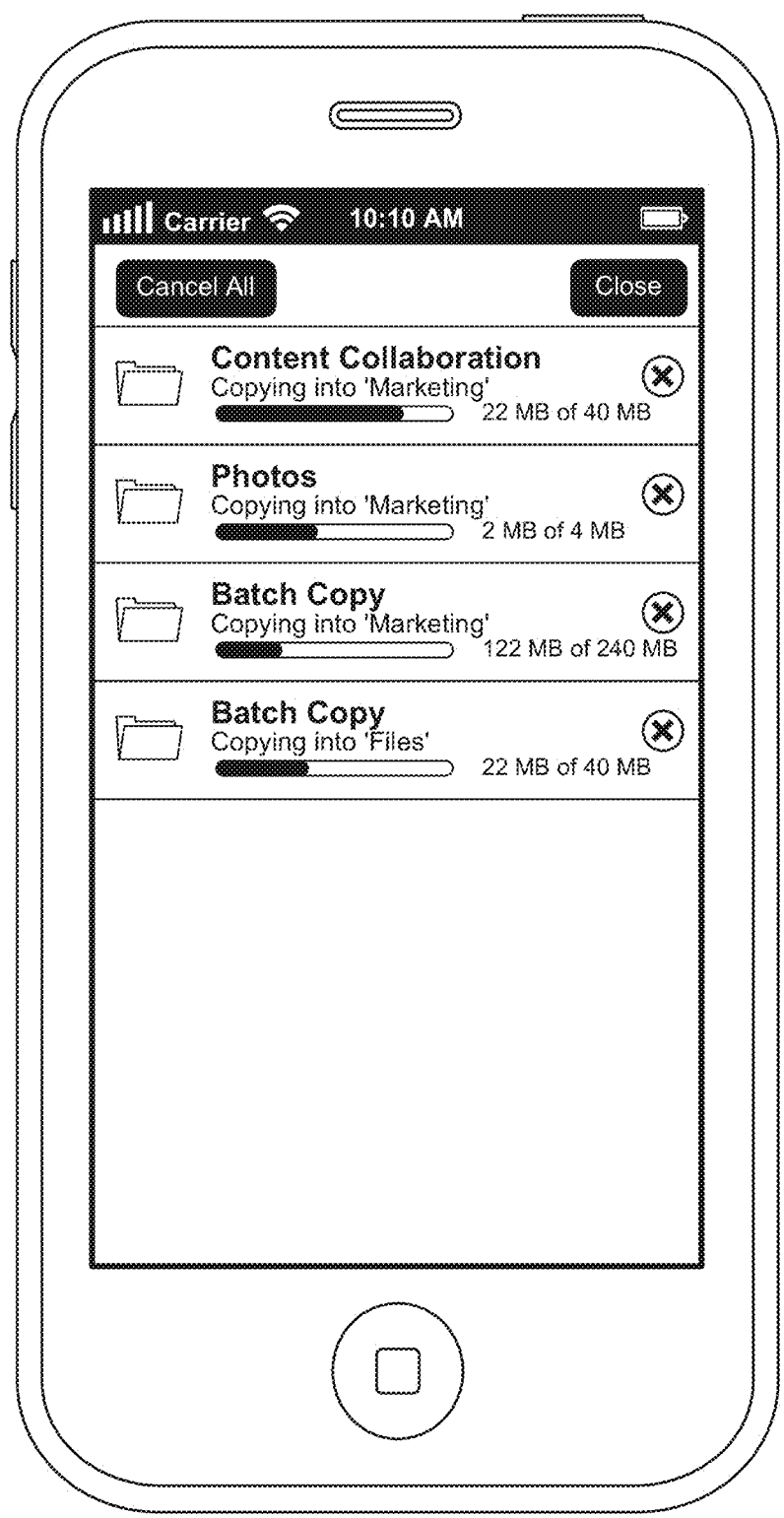
Figure 5L:
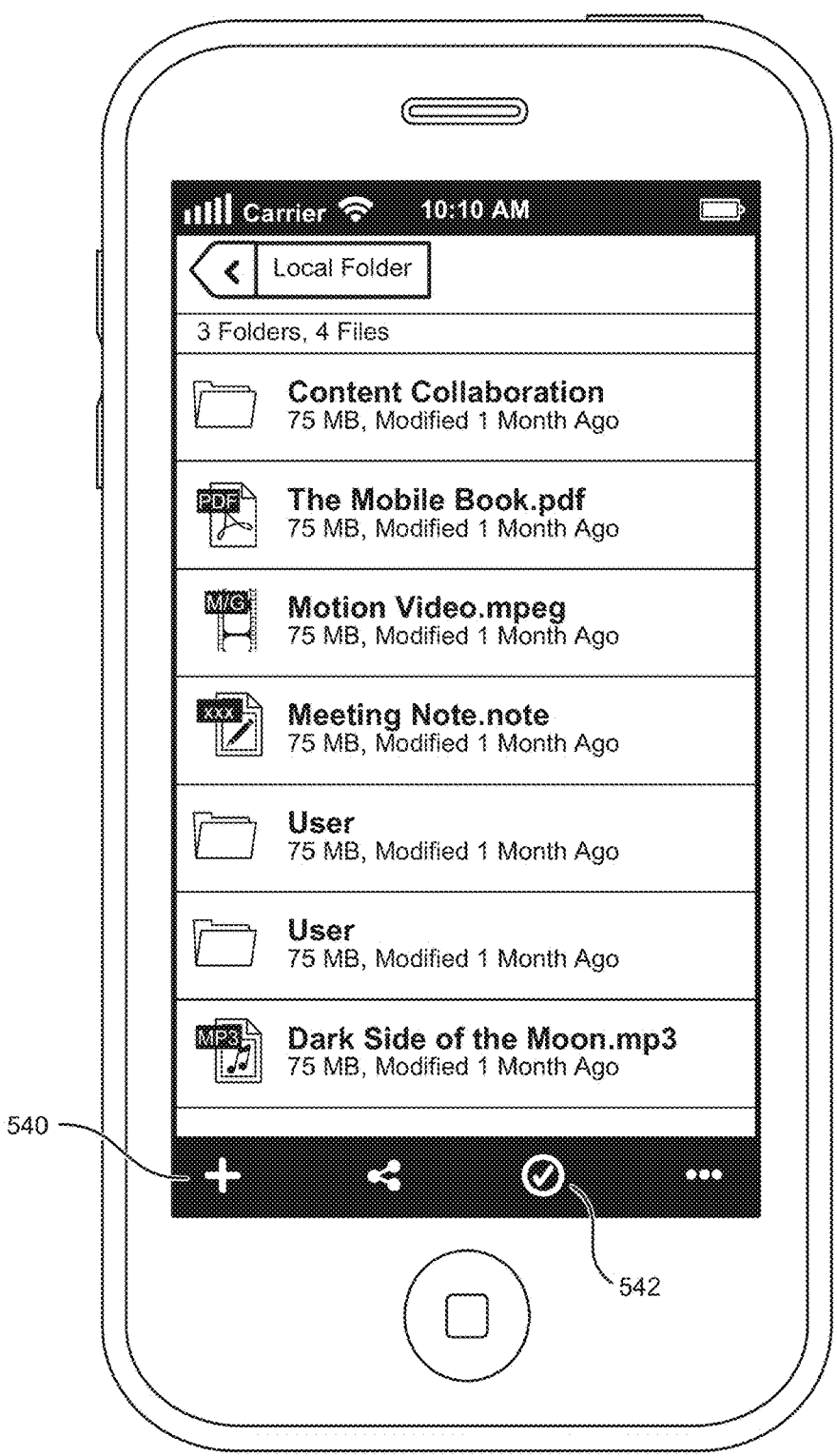
Figure 5M:
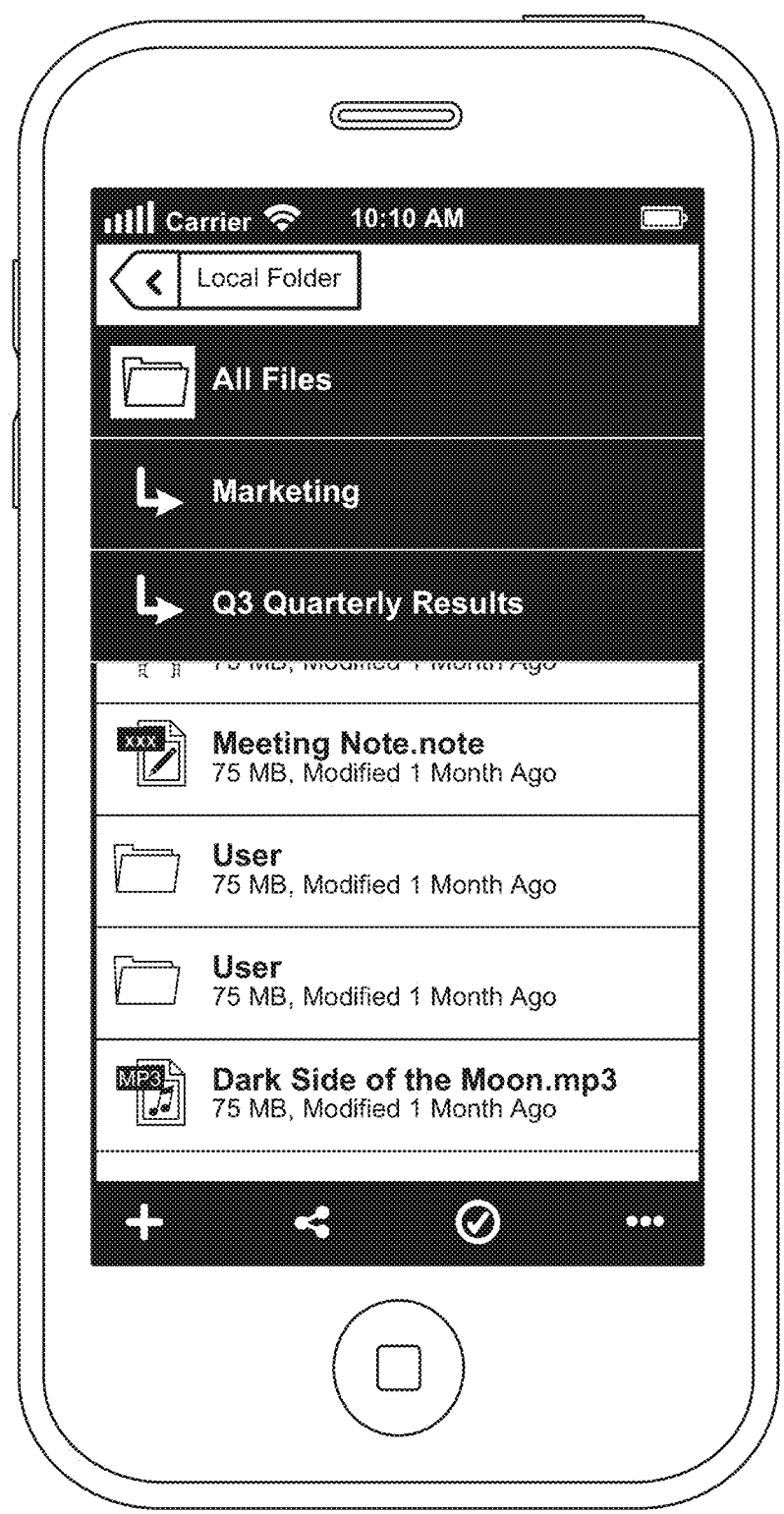
Figure 5N:
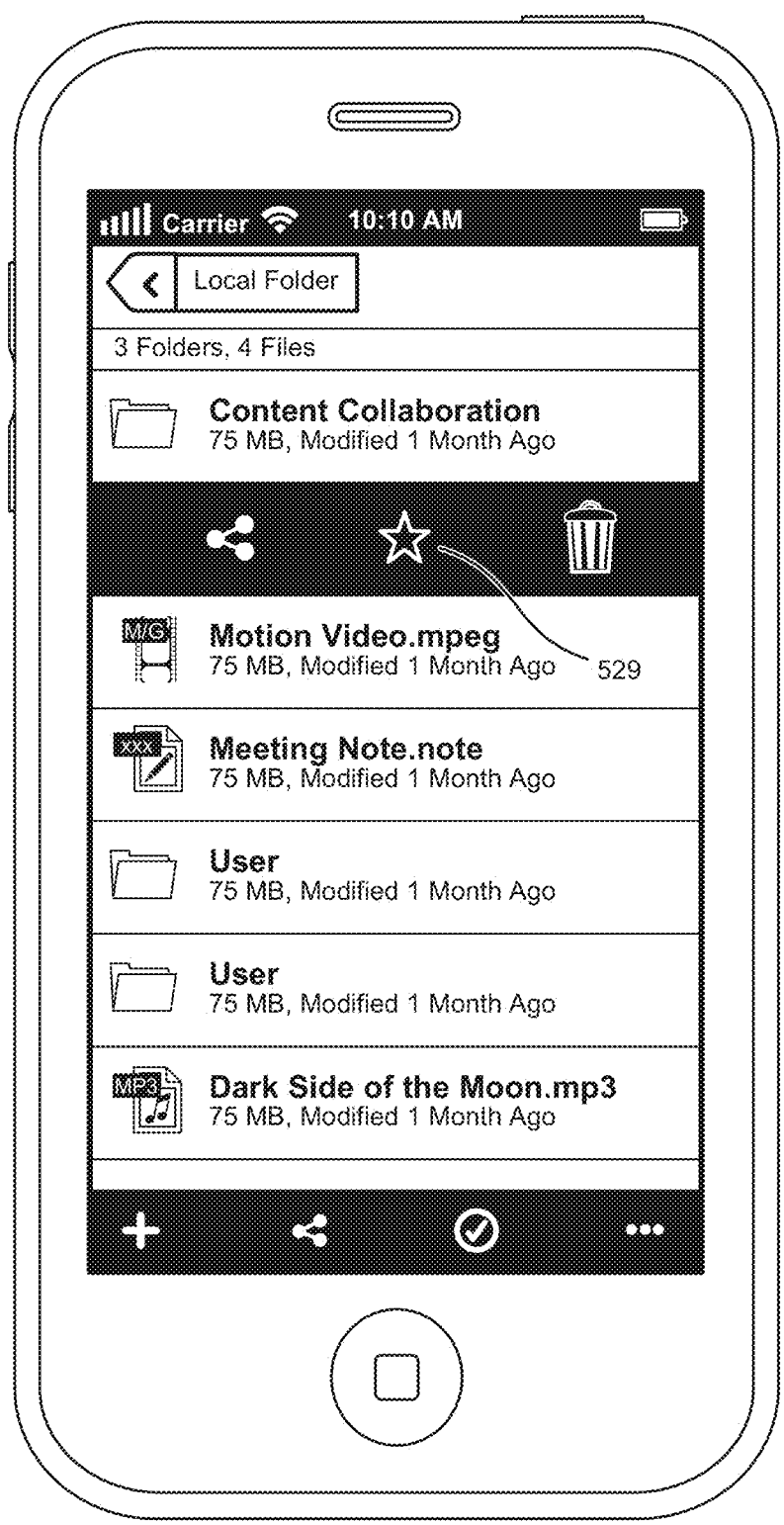
Figure 50:
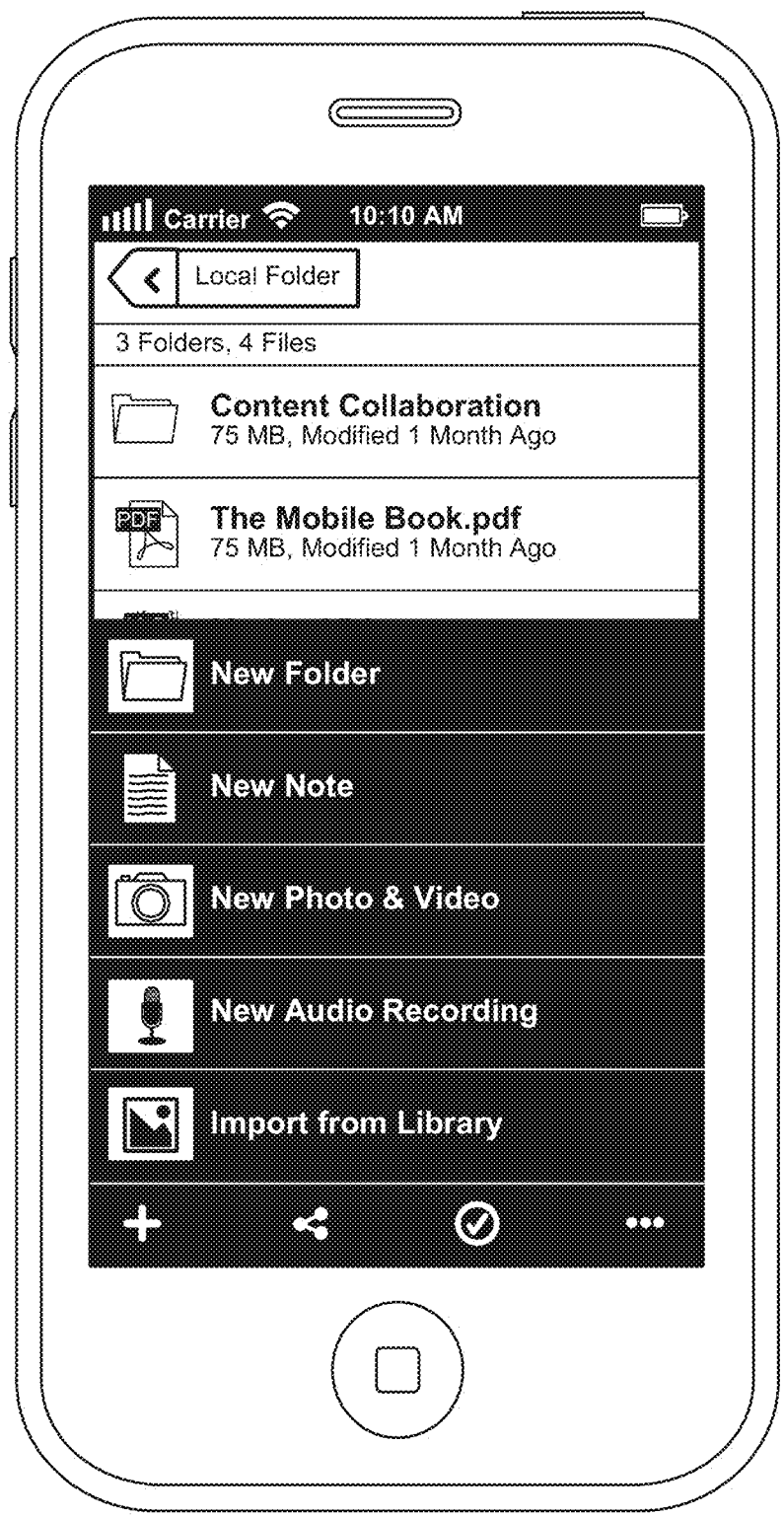
Figure 5P:
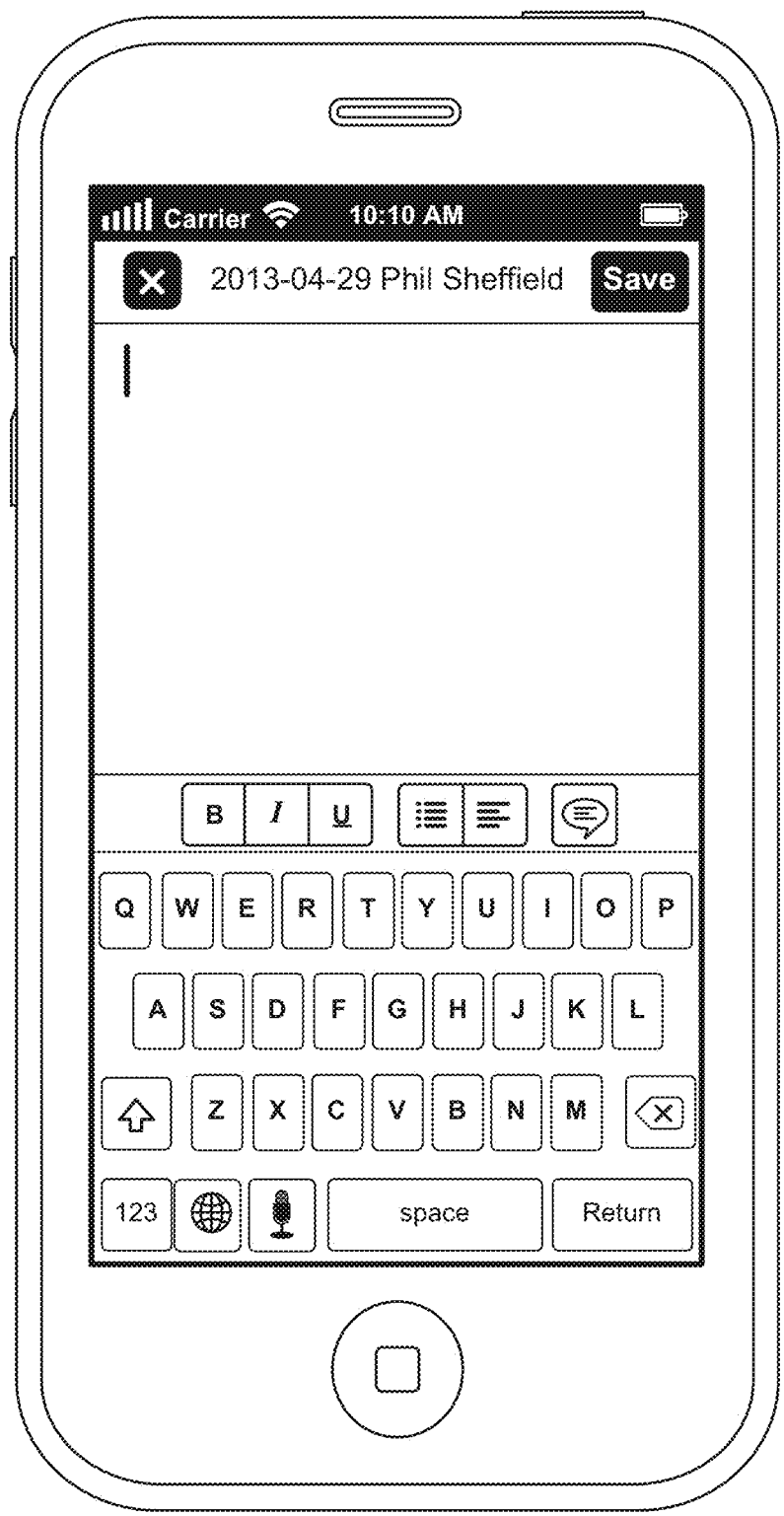
Figure 5Q:
Figure 5R:
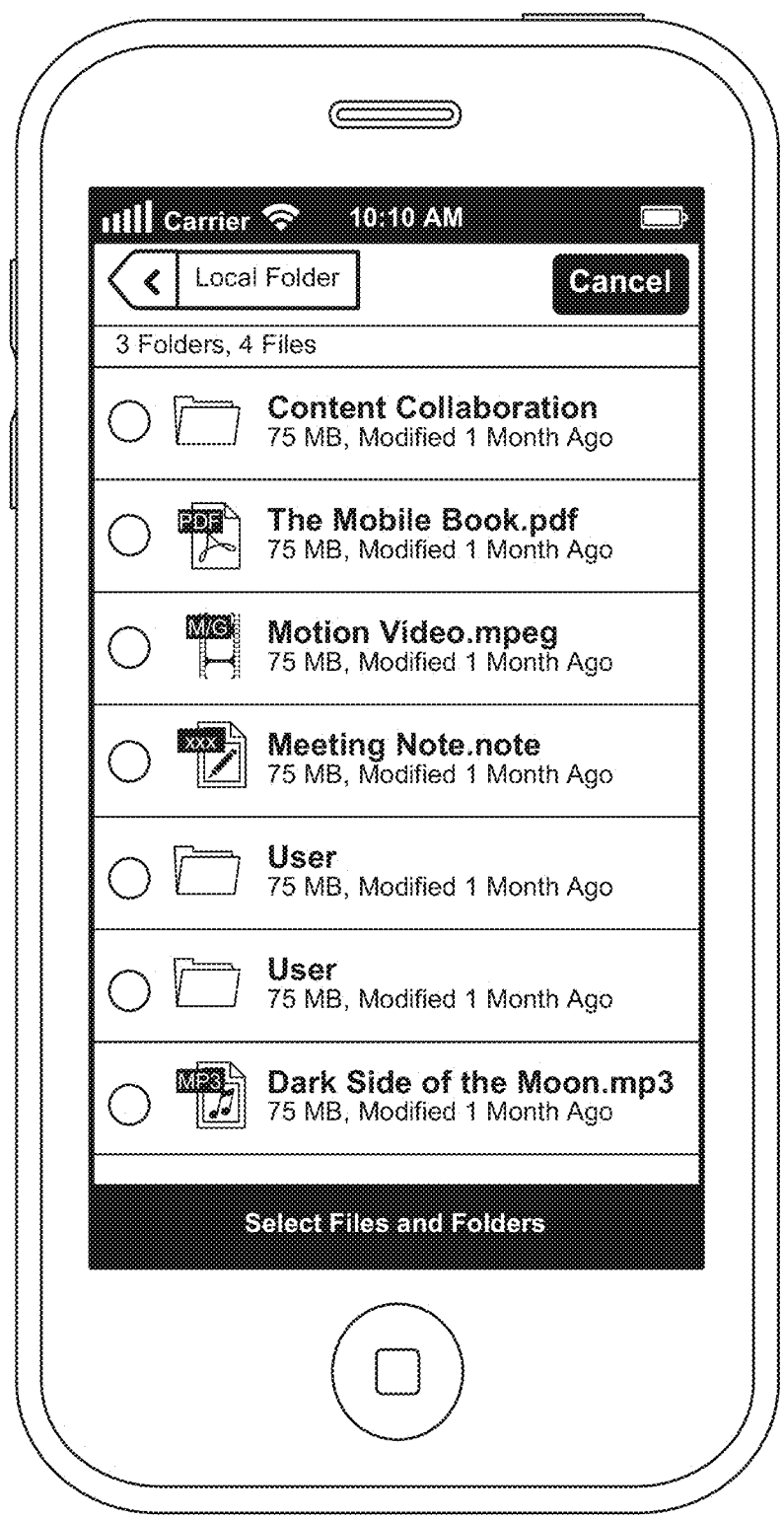
Figure 5S:
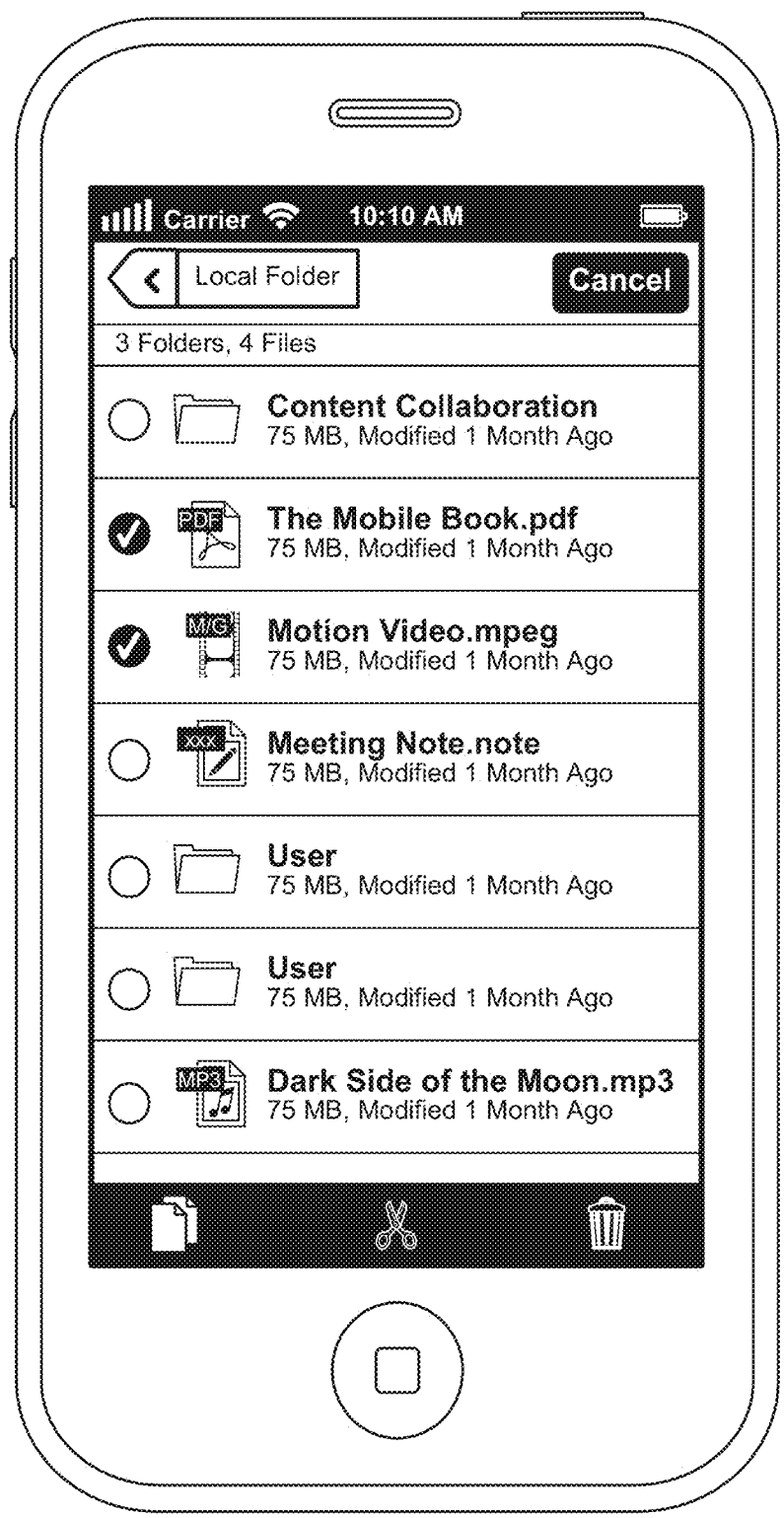
Figure 5T:
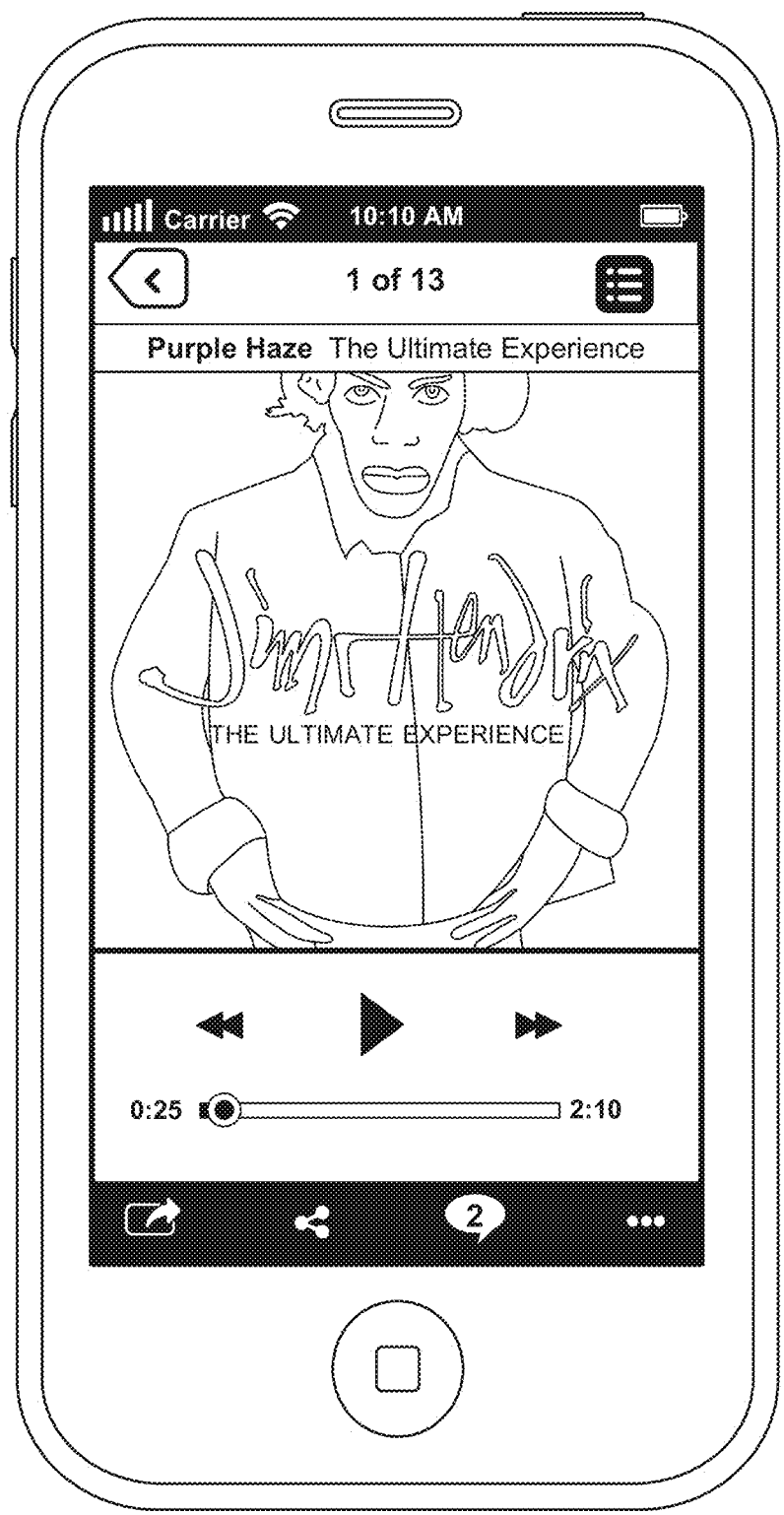
Figure 5U:
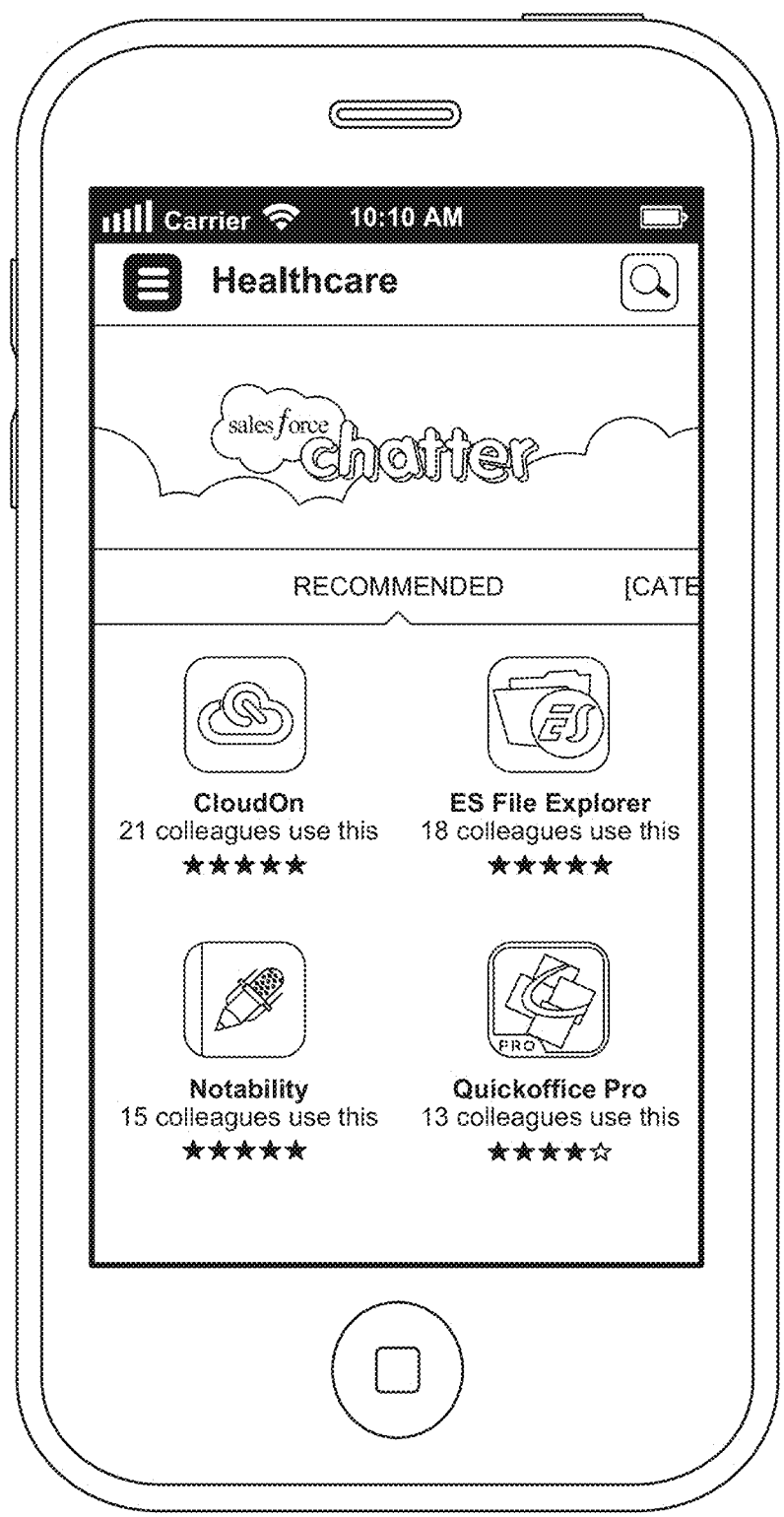
Figure 5V:
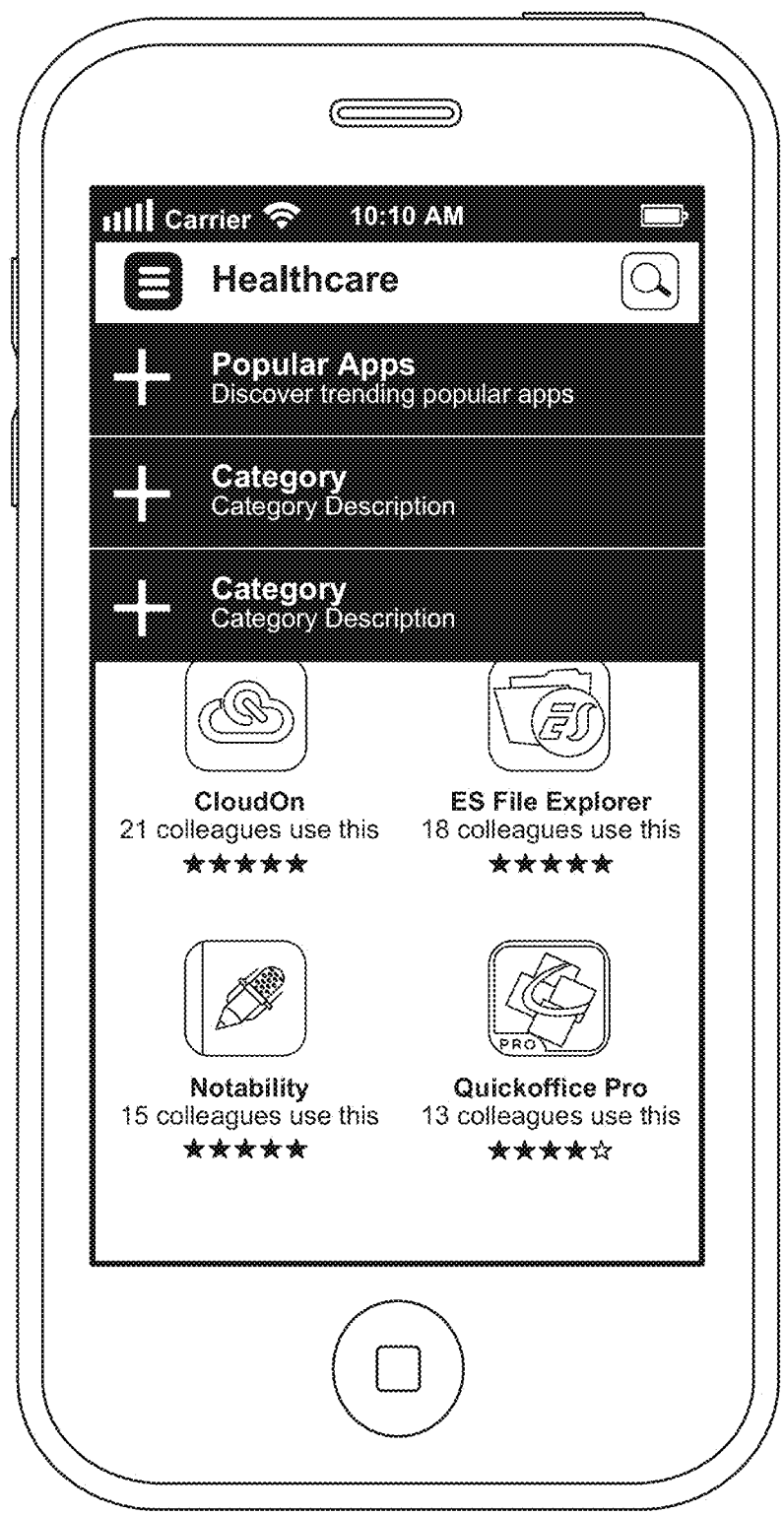
Figure 6A:
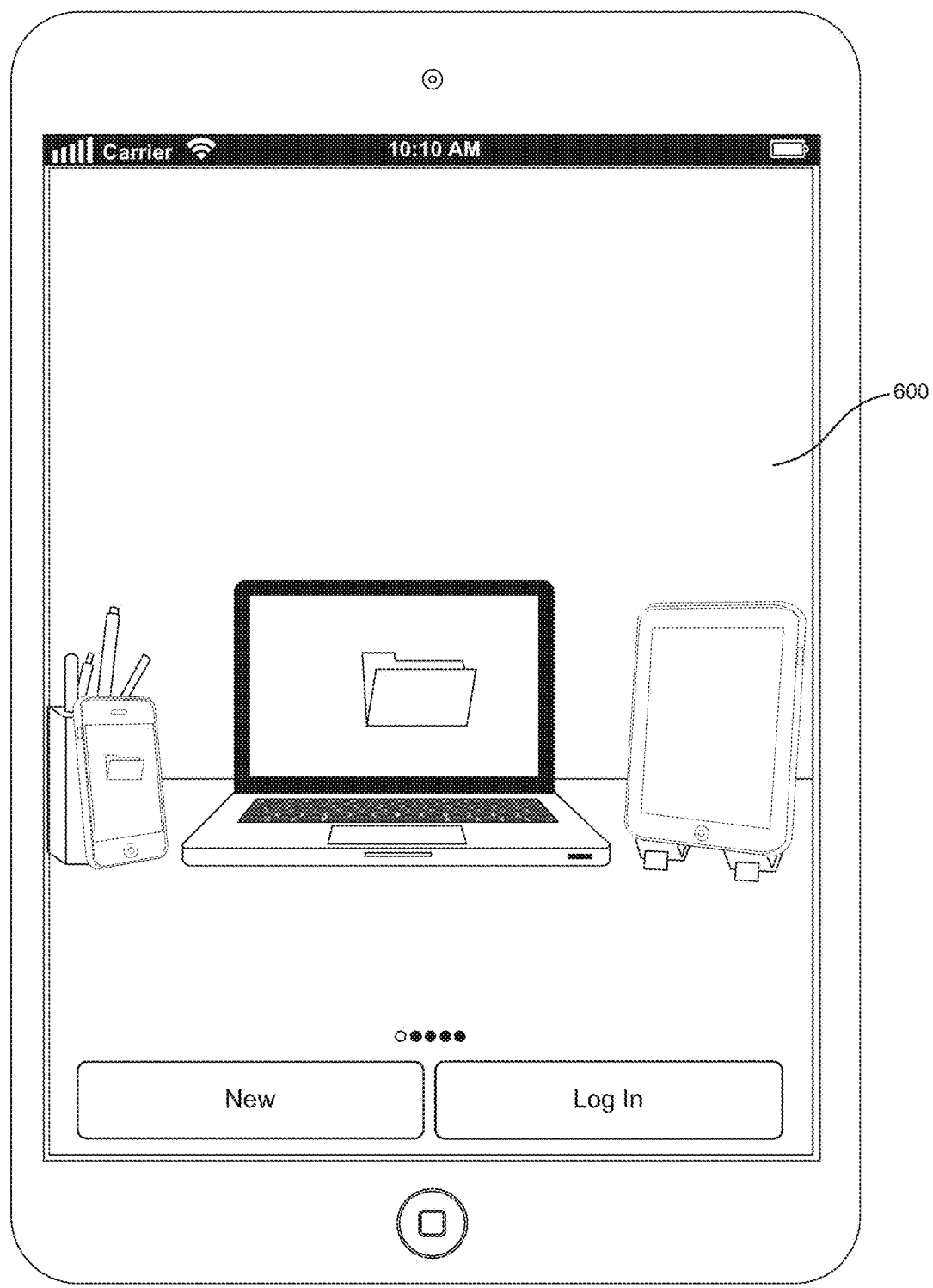
FIGS. 6A-6Q respectively depict screenshots showing example user interfaces embodying one or more techniques disclosed herein for a mobile device of a large form factor.
Figure 6B:
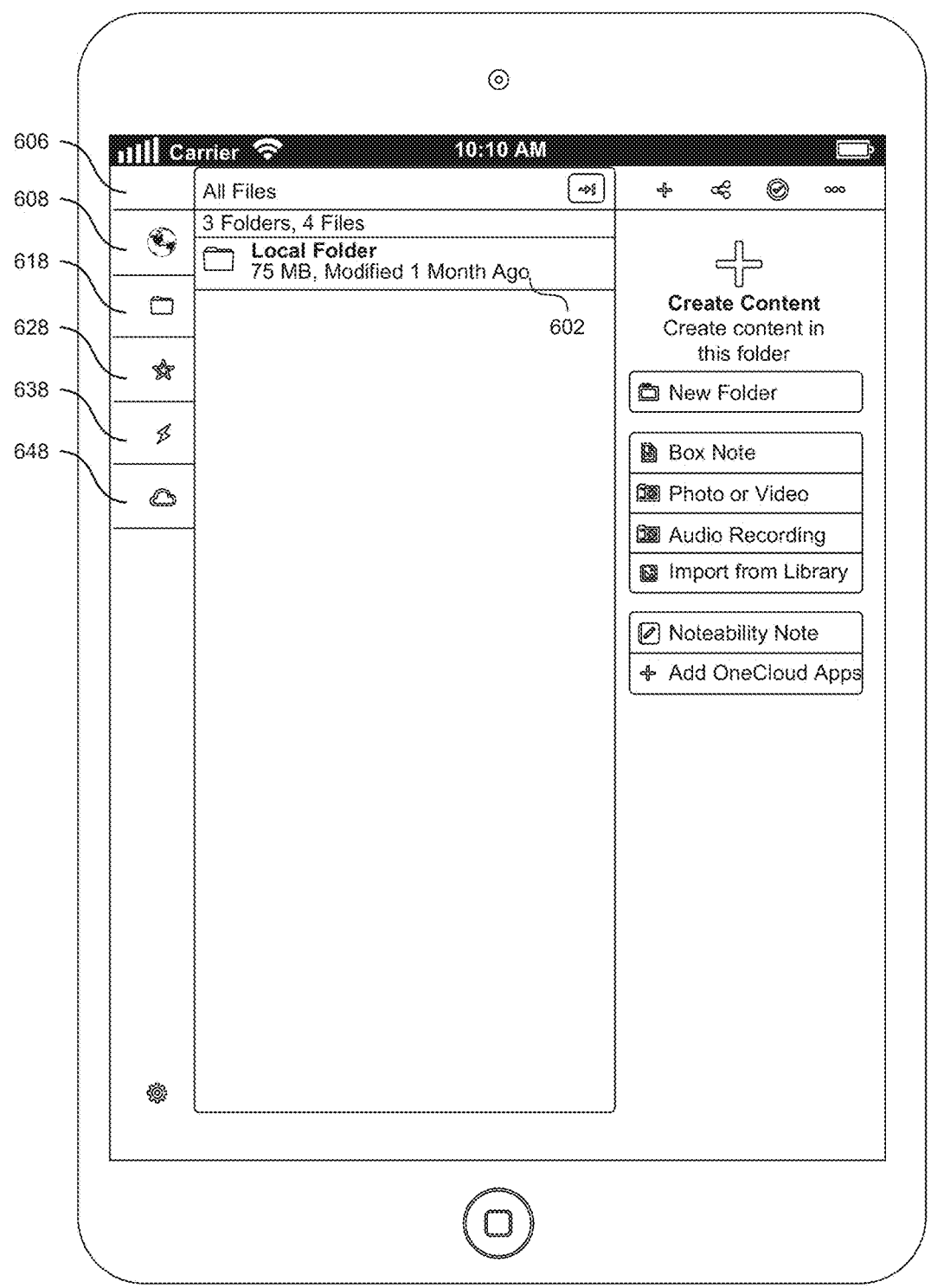

FIGS. 5A-5V respectively depict screenshots showing example user interfaces embodying one or more techniques disclosed herein for a mobile device of a small form factor. FIGS. 6A-6Q respectively depict screenshots showing example user interfaces embodying one or more techniques disclosed herein for a mobile device of a large form factor. With reference to FIGS. 1-3, 5A-5V and 6A-6Q, the multi-functional managing interface within which one or more embodiments disclosed herein can be implemented is described below.

The mobile device 400 can include, for example, a bus 402, and a memory 404 among other components. The memory 404 may include a user interface module 410, an activity monitor 420 and a content access manager 430. The memory 404 can also include a communication module 425 that facilitates communication between the mobile device 400 and the host server 110 using any of the communication protocols supported by the mobile device 400 and the host server 100. The memory 404 may also include other device modules 427 such as a GPS module for determining and providing location information, text input module for accepting and processing inputs provided using different input mechanisms of the mobile device, and the like for handling various functions of the mobile device 400. Additional or less components/modules/engines can be included in the mobile device 400 and each illustrated component.

The bus 402 is a subsystem for transferring data between the components of the mobile device 400. For example, the bus 402 facilitates the transfer of data between the memory 404 and other components of the mobile device such as the processor and/or the input/output components that utilize the data.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. § 101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

As previously described, overall, the mobile device 400 can provide a multi-functional managing interface (e.g., interface 107, such as generated by a client software running on device 400) to its user(s) for accessing contents stored in the cloud-based workspace as well as contents stored locally on the device 400; in addition, the interface includes integrated functions for enhancing user's file access experience, and for facilitating social interactions with one or more collaborators.

In one embodiment, the user interface module 410 can include a user interface rendering engine 410a and a user input detector 410b. The user interface rendering engine 410a includes program codes that accept data in Extensible Markup Language (XML), JavaScript Object Notation (JSON) or other forms and formatting or style information (e.g., Cascading Style Sheets (CSS)) to display the formatted content on the screen of the mobile device. An example of the rendering engine 410a is the webkit layout engine used in the Android platform. The rendering engine 410a may utilize C/C++ libraries such as SQL lite and graphics libraries such as OpenGL ES to render user interface graphics. The user input detector 410b can be coupled to one or more suitable pieces of hardware, for example, an actuatable button, a keyboard, a touchscreen, a gesture capturing device, a camera, a mouse, a microphone, and so forth, to receive user inputs for selecting and performing actions on the contents, whether stored in the cloud-based workspace 302 or locally on the device 400.

As an optional embodiment, the user interface module 410 can include a device form factor detector module 410c for determining a form factor of the device 400 (e.g., a size of a screen on which the interactive user interface 107 can be displayed). As is described in fuller detail below, in some embodiments, the user interface rendering engine 410a can adjust the layout and arrangement of the multi-functional managing interface 107 based on the detected form factor. It is noted, however, that a person having ordinary skill in the art will understand that techniques disclosed herein can be selectively adopted by a client software such that the software can exclusively serve or run on a mobile device of a particular size (e.g., that belongs to a large form factor, or a small form factor). It is also noted that the phrases "small form factor" and "large form factor" are used in a relative sense, although the present disclosure recognizes that, in general, a device with a screen size is less than or equal to 7.25 inches when measured diagonally can be referred to as a small(er) form factor device, and a device with a screen size is greater than 7.25 inches when measured diagonally can be referred to as a large(r) form factor device.

An example screenshot of a login view 500 of such multi-functional managing interface 107 displayed in a small form factor device is illustrated in FIG. 5A. An example screenshot of a login view 600 of such multi-functional managing interface 107 displayed in a large form factor device is illustrated in FIG. 6A. After a user logs in, contents that are stored in the workspace 302, and/or contents that are stored locally on the device 400 (e.g., as shown in FIG. 5B as local folder 502; in FIG. 6B as local folder 602) can be displayed, on the interactive user interface 107. Further, in some embodiments (e.g., of those implemented on small form factor devices) a multi-functional side bar (e.g., side bar 506, FIG. 5C) can be activated upon the user selecting a button 504. In some other embodiments (e.g., of those implemented on large form factor devices), the multi-functional side bar (e.g., side bar 606, FIG. 6B) can be displayed without any user activation.

The activity monitor 420 enables the devices 400 to receive updates regarding activities performed by the user and the one or more collaborators (e.g., collaborators 322) on contents in the workspace 302. The activity monitor 420 can include an activity tracking module 422 and an activity feed generator/aggregator module 424. The activity status tracking module 422 can track the status of an activity by periodically querying (e.g., via the optional activity information requestor module 422$a$) the host server or local storage areas of the mobile device 400 to obtain an update about an activity performed on one or more work items 324 in the workspace 302, such as a transfer of a file (e.g., for upload) to or (e.g., for upload) from the host server 110. For example, if the activity is an upload/download of a work item to or from the host server of the cloud-based platform, then the activity status tracking module 422 tracks the information of the upload/download by determining (e.g., via an activity information processing module 422$b$) parameters of the activity. Examples of these parameters can include activity type (e.g., upload, download, preview, comment, highlight, etc), identity of the performer of the activity, time of the activity's performance, and the file(s) associated with the activity. In the alternative embodiment which does not require the activity information requestor module 422$a$, the activity monitor 420 can receive updates from the host server 110 passively (e.g., via a "push" notice) or via other suitable means (e.g., by a notification server, not depicted for simplicity).

The activity feed generator module 424 can aggregate and process the activity information derived from the activity tracking module 422 and generate lists of information for display on the multi-functional managing interface 107 (e.g., via the user interface module 410) in an intuitive manner. In particular, the device 400 can display, on the interactive user interface (e.g., interface 107), lists of information based on the updates to facilitate interaction from the user with respect to the updates. An example of a list of information can include an activity (e.g., upload, download, preview, comment, etc.) and, if one or more files (e.g., a JPEG photo, an AVI video, or a PDF document) are associated with the activity, thumbnails that represent previews of the one or more files.

Examples of a preview can include a miniature representation of a first page (or a first few pages) of a document file, a miniature and perhaps lower resolution version of a photo file, a cover photo of an album that a music file belongs, a first frame (or even a short animation consisting a few frames) of a video file, or an default icon that represents a type of the file (e.g., an executable software). In this way, the preview in the updates can depict actual content of the files in the updates so as to enable the user to take a quick glance at the actual content of the files without the need for the user to access the file. This can reduce time and effort for the user in reading and responding to the updates when collaborating with his or her collaborators on items shared on the workspace 302.

Figure 6C:
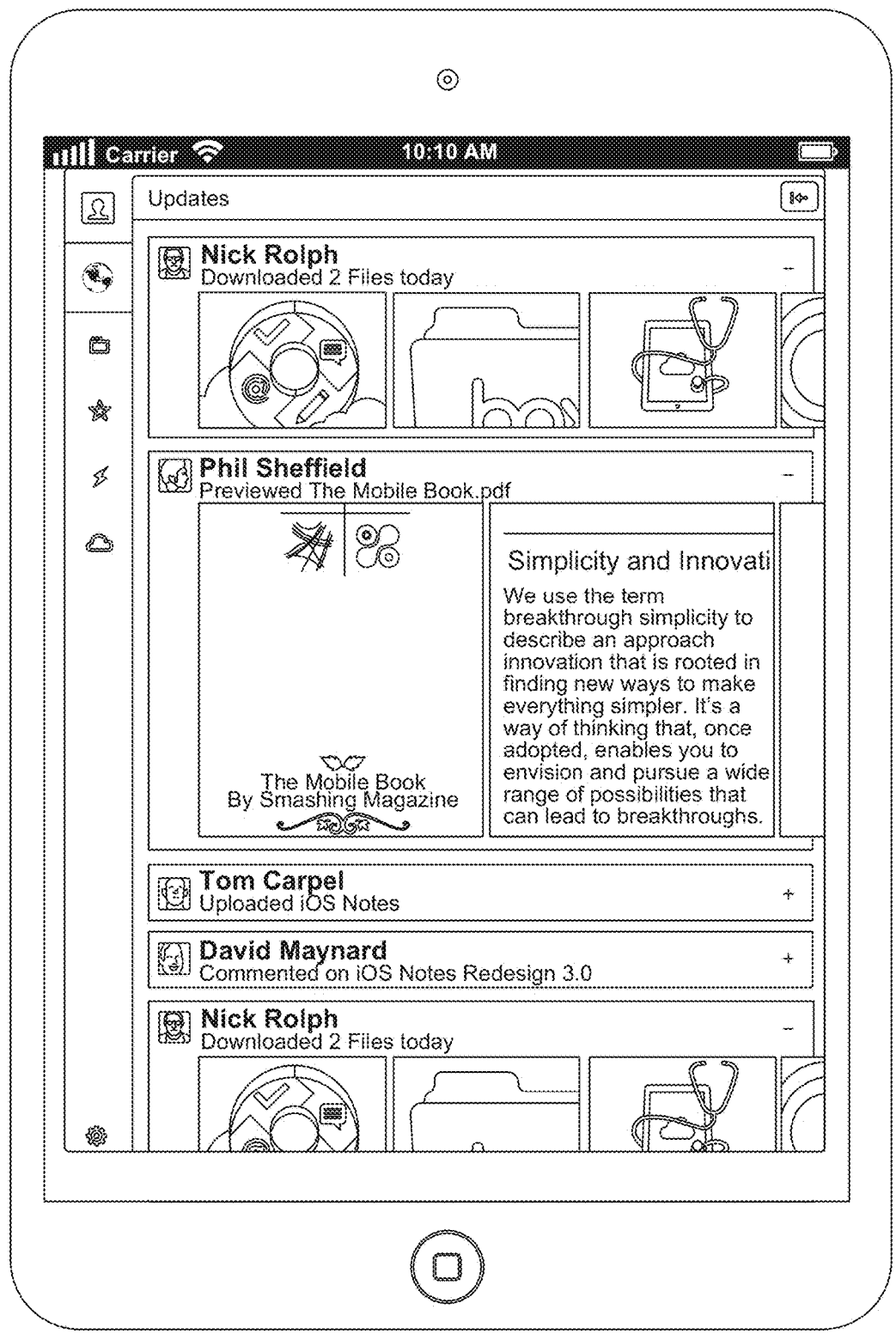
Figure 6D:
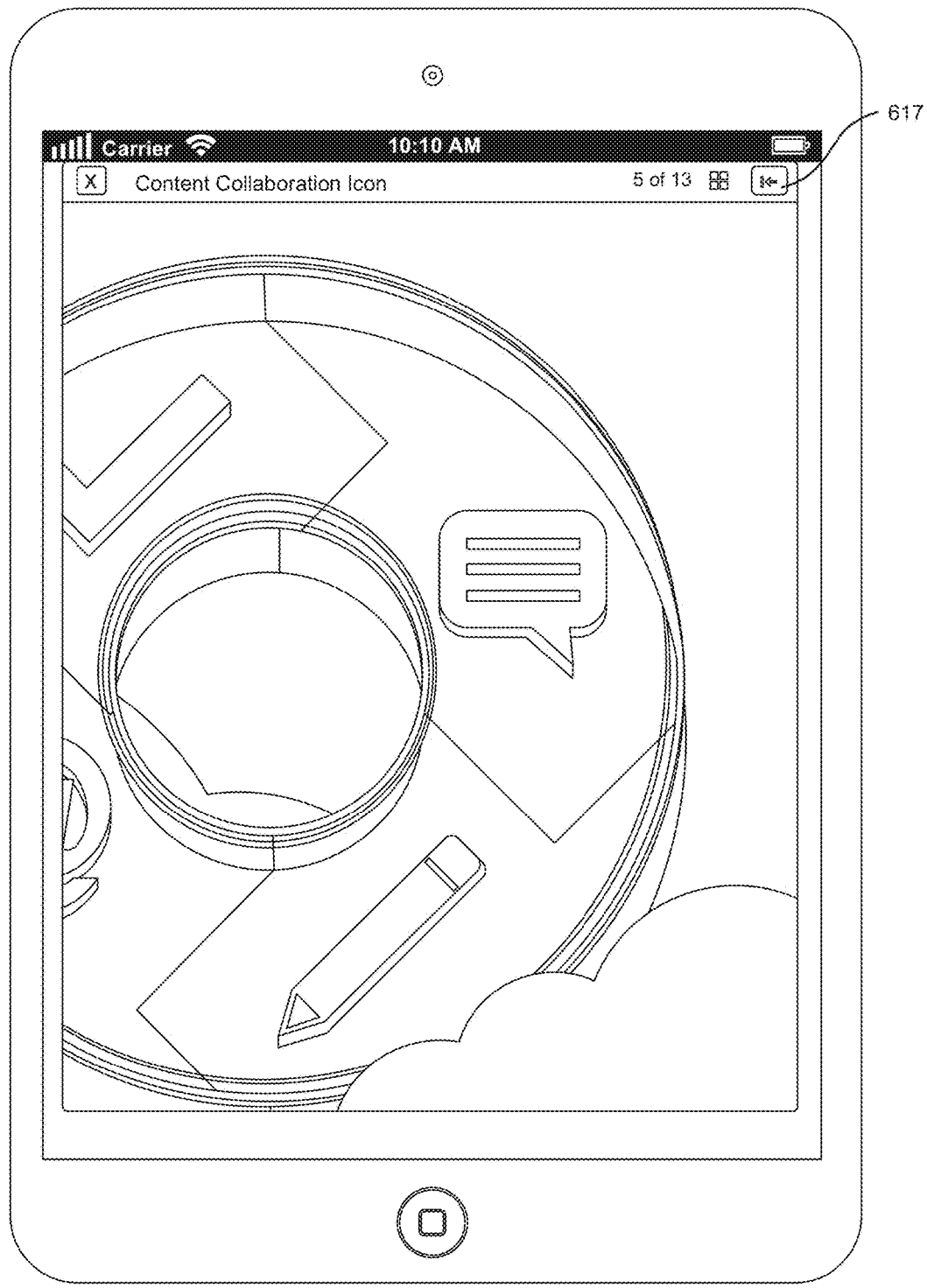
Figure 6E:
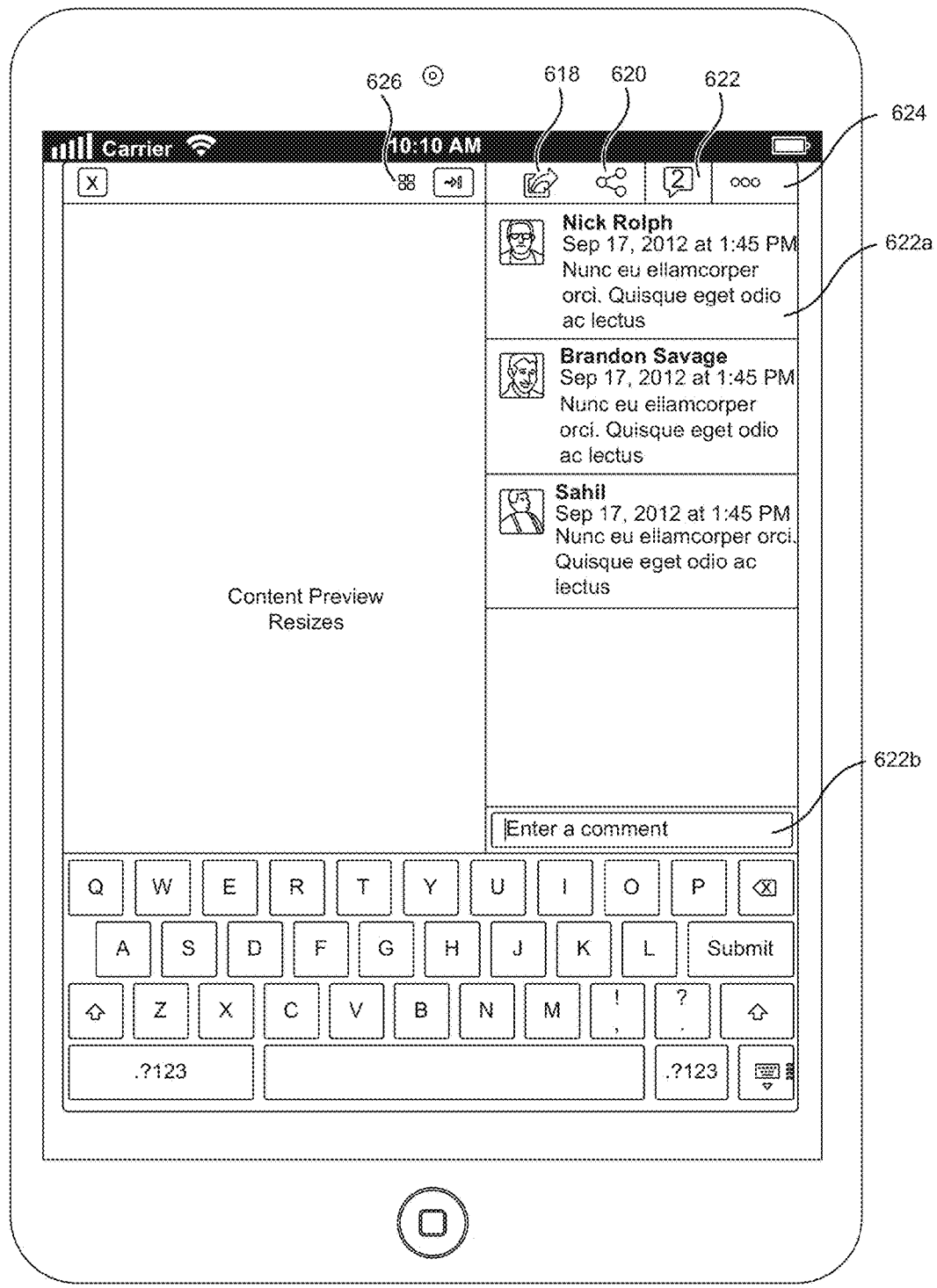

Example screenshots of an update page which displays lists of information based on the received activity updates are shown respectively in FIG. 5D (for a small form factor device) and in FIG. 6C (for a large form factor device). The update page that contains can be activated by selecting an update button (e.g., button 508, FIG. 5C; button 608, FIG. 6B) on the side bar 506, 606.

As illustrated in the embodiment of FIG. 5D, a list of information 512$a$-512$c$ each displays an activity, and if one or more files are associated with the activity, thumbnails 510$a$-510$c$ that represent previews of the one or more files associated with the activity. Furthermore, in some implementations, the lists of information 512$a$-512$c$ can be sorted based on identities of who perform the activities; additionally, the lists of information 512$a$-512$c$ can be further sorted based on timestamps of the activities. For example, list 512$a$ is shown to indicate that a collaborator "Nick Rolph" downloaded 2 files (from the workspace 302) today, and the two files that are downloaded by Nick are shown in thumbnails 510$a$ and 510$b$. A portrait or an icon of Nick Rolph can be shown next to his name on the list 512$a$, in some examples, to enable easier identification of the activity performer. According to some embodiments, the thumbnails can show a preview of the file when such preview is available and/or appropriate. For example, thumbnail 510$a$ displays a miniature version of the photographic file that is downloaded by Nick. In some embodiments, a scroll bar 514 (shown as hidden in FIG. 5D) can be activated (e.g., upon a touch on the screen or a scrolling swipe-up gesture) to show more lists of information (e.g., list 512$c$). Optionally, lists 512$a$-512$c$ can include a contract/expand element 516$a$-516$c$, which can be operable (e.g., via a touchscreen) so as to hide/show the thumbnails 510$a$-510$c$. The scroll bar 514 can also be configured to show itself whenever the lists of information 512$a$-512$c$ occupy over a page.

In some additional embodiments, the devices 400 are configured so that the thumbnails 510$a$-510$c$ are to be displayed in the interactive user interface 107 based on one or more visualization criteria. For example, the client software that runs on the device 400 can detect a size of a screen on which the interactive user interface is displayed. In some embodiments, if the screen's size is what is generally regarded as a small form factor mobile device (e.g., less than or equal to 7.25 inches of screen size when measured diagonally), then a thumbnail is to occupy larger than 20% of a height of the screen; such example is generally illustrated in FIG. 5D. Moreover, if the screen's size is what is generally regarded as a large form factor mobile device (e.g., more than 7.25 inches of screen size when measured diagonally), then a thumbnail is to occupy larger than 10% but less than 20% of a height of the screen; such example is generally illustrated in FIG. 6C.

One or more embodiments provide that the thumbnails can enable the user to interact with the files, such as open, edit, play, highlight, comment, save, and so forth. For example, a user can click on thumbnail 510$a$ to access to the picture, or on thumbnail 510$c$ to access the PDF document. An example screenshot showing such integrated access is shown in FIG. 5E (for small form factor devices) and in FIG. 6D (for large form factor devices).

In some embodiments, a cloud status button can be provided in the interface 107 (e.g., the status button 536 in FIG. 5D) can be provided to the user to allow viewing of the mobile device 400's current upload/download activities to/from the host server 110, as well as other suitable activities like copying or moving contents between the host server 110 and device 400. An example of such status page is shown in the screenshot of FIG. 5K.

Furthermore, according to one or more embodiments, the content access manager 430 together with the communication module 425 can also enter an "always on" mode which enable the mobile device 400 to stay active (e.g., and not enter a stand-by mode) when there are uploading/downloading activities being performed on the mobile device 400 to increase the probability of successful operations, especially when the mobile device 400 is connected to a power outlet. In some embodiments, however, if the mobile device 400 runs on battery and the battery power become too low (e.g., <10%), or if the activity is draining too much battery power (e.g., 20%), then the device 400 can still go into the stand-by mode to conserver power.

In accordance with one or more embodiments, the multi-functional managing interface 107 can provide integrated access to contents stored in the workspace 302 and/or on the mobile device 400 in a way that is intuitive, efficient and collaboration-promoting. The present embodiments provide, through the managing interface 107, several ways to access the contents. As discussed above, a user can gain access to the contents via interacting with the lists of information 512a-512c that contain activity updates. Another way is to select to access content from a file managing page of the interface 107, which is accessible via selecting a file managing button 518 on the side bar 506 (or button 618 on the side bar 606). Example screenshots of the file managing page are shown in FIG. 5L (for small form factor devices) and FIG. 6J (for large form factor devices), respectively.

The content access manager 430 which can respond to the content access requests can include a file type detector 432, a social interaction module 436, and optimized software modules 434 including, for example, a photo module 434a, a music module 434b, a video module 434c, and a document module 434d.

In some embodiments, upon receiving a request from the user of a file in the contents for access, the file type detector 432 can detect a type of the file, and the content access manager 430 can determine whether the file's type is compatible with the mobile device 400. If the file's type is incompatible (e.g., if the file is not compiled for execution on the device 400, or if device 400 lacks proper tools to access such file), then the content access manager 430 can display an alert to the user before downloading the file for access. Additionally, the manager 430 can prompt the user with options, such as canceling the access, or downloading appropriate tool applications. If it is the case that the device 400 lacks proper tools to access such files, then the manager 430 can direct the user to a preferred application page (e.g., as shown in FIG. 5U and FIG. 6P, also respectively accessible via button 548, 648). In one or more embodiments, after a preferred application is downloaded and installed, it can be initiated within, or in conjunction with, the interface 107 (e.g., via an "open-in" function, described below) in accessing the file.

The social interaction module 436 can enable the user to interact with the collaborators during the integrated access to promote collaboration experience. According to some embodiments, when the user interacts with the list of information 512a by selecting the thumbnail 510a, or when the user selects to access a file from the file managing page and thereby entering an access page (as shown in FIG. 5E and FIG. 6D) for the file, the mobile device 400 can provide multiple social (e.g., via module 436) as well as content access functions (e.g., via manager 430) to the user. In some embodiments, functions provided in the example access page can be hidden or shown by toggling a function button (e.g., button 617 in FIG. 6D).

More specifically, the example access page as shown in FIG. 5E includes an open-in button 518, a share button 520, a comment button 522, and a "more function" button 524. Some embodiments of the mobile device 400 also includes a thumbnail browse button 526. Similarly, the function page as shown in FIG. 6E (which can be accessed via button 617 of FIG. 6D) includes an open-in button 618, a share button 620, a comment button 622, and a "more function" button 624. These functional buttons have similar functionalities regardless of the form factor of device 400; however, various screenshots are provided herein to provide a comparison of how the layout differences between a small form factor device (e.g., as shown in FIGS. 5A-5V) and a large form factor device (e.g., as shown FIGS. 6A-6Q) can be.

The open-in button 518, 618 can initiate access functionalities, within the multi-functional managing interface 107, including viewing, editing, or other suitable functions on, the selected content using one or more third-party applications that are installed in the mobile device 400. An example screenshot that allows a user to access the selected content using a third-party application is shown in FIG. 6G. An option can also be prompted to the user to add/download an application that is not currently installed on the mobile device 400, such as an "add apps" options illustrated in the screenshot of FIG. 6G. Although such functional page is not shown for a small form factor device, the open-in button 518 has similar functionalities as the open-in button 618.

The share button 520, 620 can initiate sharing functionalities, within the multi-functional managing interface 107, including attaching to email, emailing link, short-messaging link, copying link to clipboard, or other suitable functions, for the selected content. The links can be a public link or semi-public link (e.g., available for limited users within a certain domain only) that is provided form the workspace 302. An example screenshot that allows a user to share the selected content either via email attachment or via sharing a link provided by a cloud-based platform provider is shown in FIG. 6H.

The comment button 522, 622 can bring the user to a comment page, such as screenshots shown in FIGS. 5F and 6E. The comment page includes comments 522a, 622a recorded from other collaborators of the user on a particular content (e.g., a file, a folder, an assigned task, an activity, etc.). A user can also be prompted on the comment page to enter (e.g., via comment line 522b, 622b) his or her own comment so that other collaborators may see.

Figure 6F:
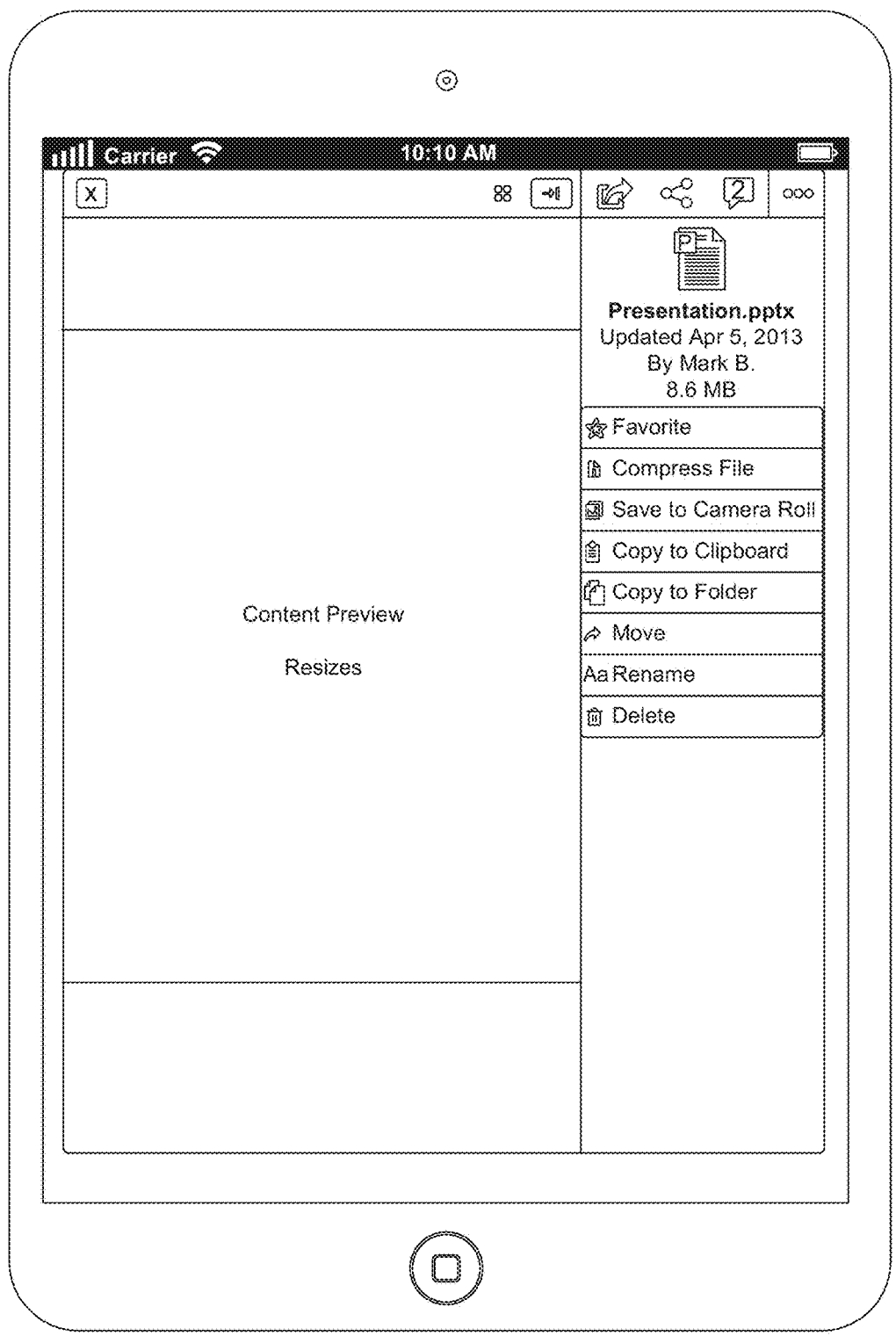
Figure 6G:
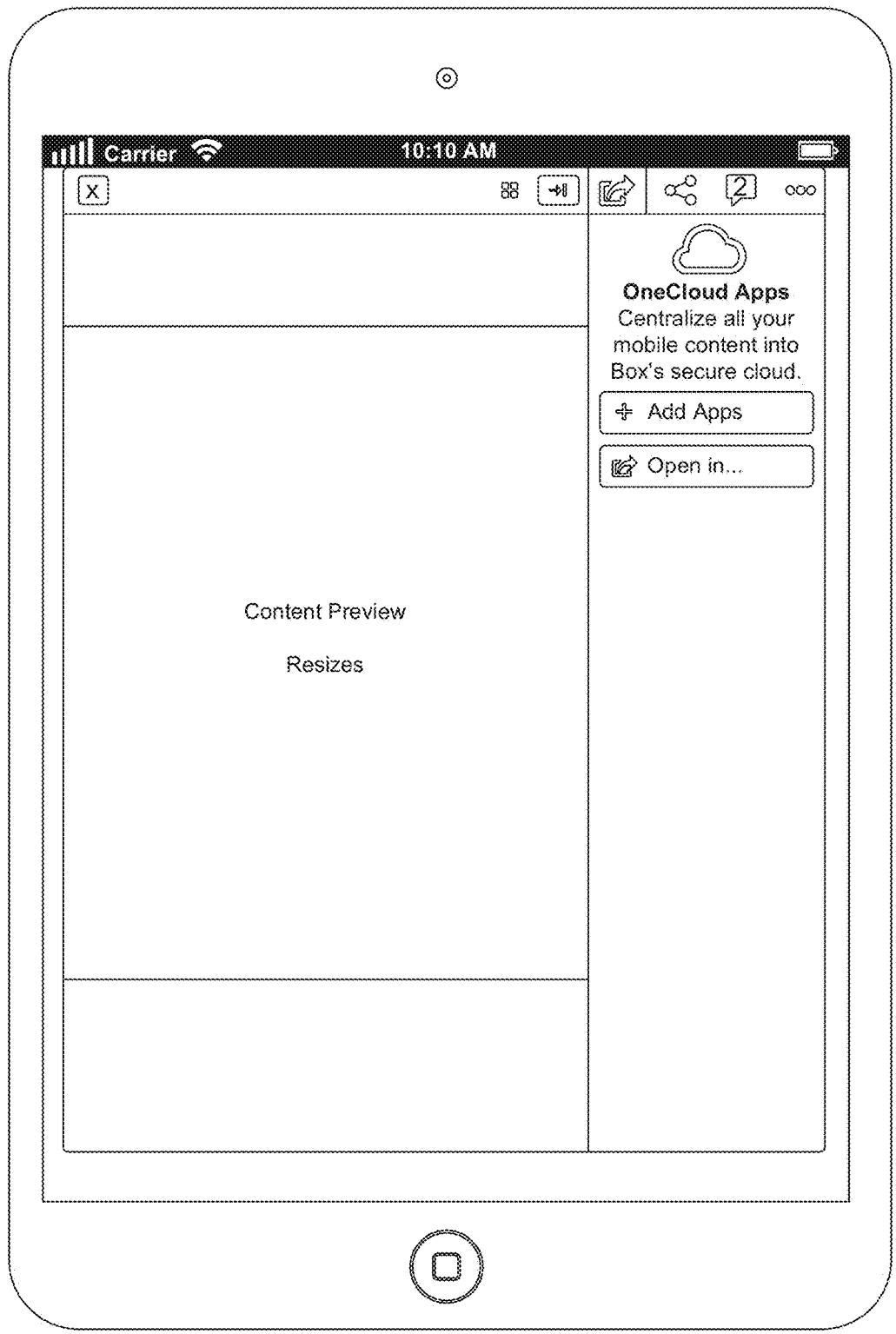
Figure 6H:
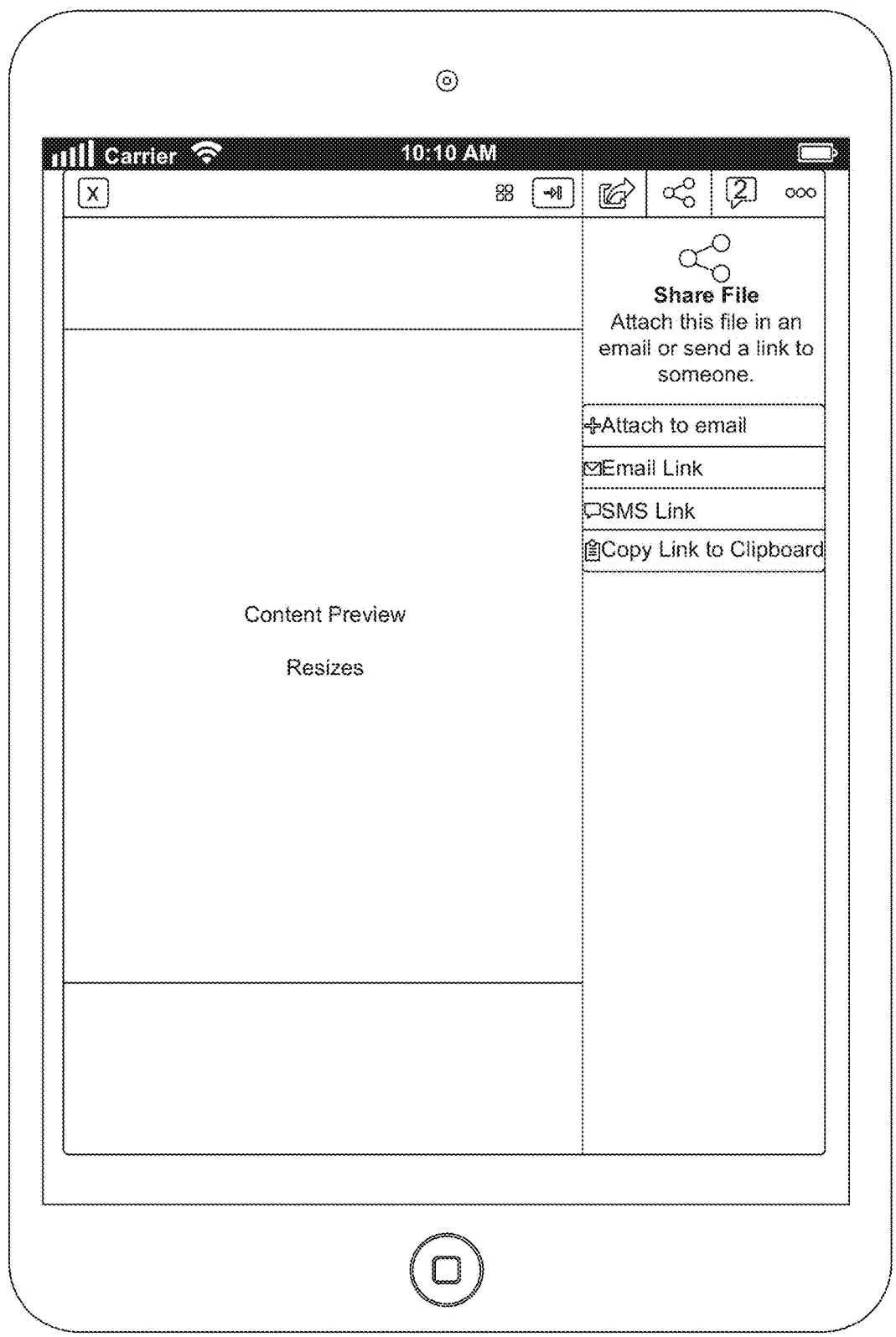

The more function button 524, 624 can bring the user to a "more function" page, such as screenshots shown in FIG. 5G and FIG. 6F. The more function page includes a list of actions that are available to the user to perform on a file. The identity of as well as other relevant information regarding the file can be displayed (e.g., on the top of FIG. 5G, or on the right-top corner of FIG. 6F) on the more function page. Examples of actions include "open-in," "share," "comment," "favorite," as well as file managing functions such as save, copy to clipboard, copy to folder, move, rename, delete, and so forth. It is noted that the actions available on the more function page may include those functions having quick buttons on the access page, such as "comment," or "open-in."

The thumbnail browse button 526, 626 can bring the user to a thumbnail browse page, such as screenshots shown in FIG. 5H. The thumbnail browse page can allow the user to browse the contents accessible through the multi-functional managing interface 107 in a visual and more intuitive manner. In some embodiments, the thumbnail browsing can be selected to be limited to browsing of photos and/or videos. The thumbnails can include preview of the first page or a few selected pages, pages, or other suitable visual miniature representation of the contents being viewed, such as an album cover of a music file.

In addition, the optimized software modules 434 can enable, accelerate and/or enhance the user experience of various types of access with the multi-functional managing interface 107.

In some embodiments, if the file that the user attempts to access is pictorial (e.g., a BMP file, a JPG file, or the like), the photo module 434a can start displaying the file before the file is downloaded completely by displaying a lower resolution version of the file first, and then the photo module 434a can gradually transition from the lower resolution version of the file to a full resolution of the file as the downloading of the file completes. In some embodiments, the photo module 434a can transition from the lower resolution version to the full resolution version when the downloading of the file is completed. Some embodiments provides that the transition can gradually takes place without the user's notice. More specifically, it is recognized in one or more embodiments of the photo module 434a that there is a rate limit for human eyes to adapt and see the details of a photo even when a full resolution photo is presented. Therefore, the photo module 434a can accelerate the display of photographic or pictorial files by displaying the lower resolution. In a preferred embodiment, the lower resolution version of the file still includes enough amount of details so that most humans cannot tell the difference between the lower and full resolution versions, especially when they are displayed in a thumbnail such as thumbnails 510a-510c.

In some embodiments, if the file that the user attempts to access is music or audio (e.g., an MP3 file, a WMA file, or the like), the music module 434b can start fetching metadata (e.g., ID3 tags) of the file as soon as the file starts to load, and then the music module 434b can display information related to the file based on the fetched metadata. In this way, the user can access information before the file finishes loading, such as seeing the album's cover art (e.g., downloaded from online database), or emailing/sharing the cover art with another. Examples of a music playback access page enabled by the music module 434b are shown in FIG. 5T and FIG. 6O.

In some embodiments, if the file that the user attempts to access is video or audiovisual (e.g., an AVI file, a VOB file, or the like), the video module 434b can pre-fetch a first frame, a first few frames, or a selected few frames from different segments, of the file so that a short preview can be shown to the user before a user attempts to access it. Also, similar to the music module 434b, the video module 434c can start fetching metadata of the video files as soon as the file starts to load. An example of a video playback access page enabled by the video module 434c is shown in FIG. 5I.

Figure 6I:
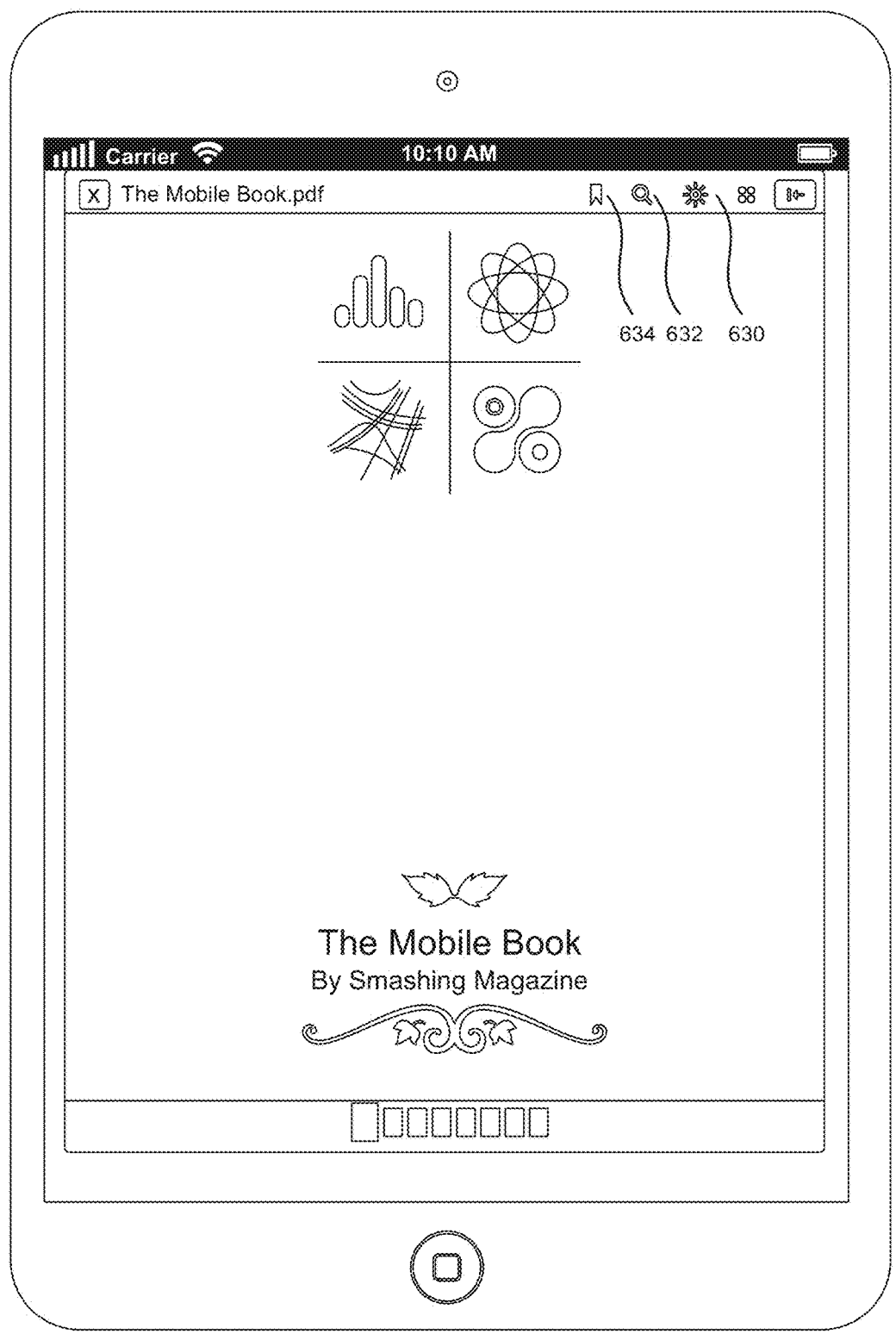
Figure 6J:
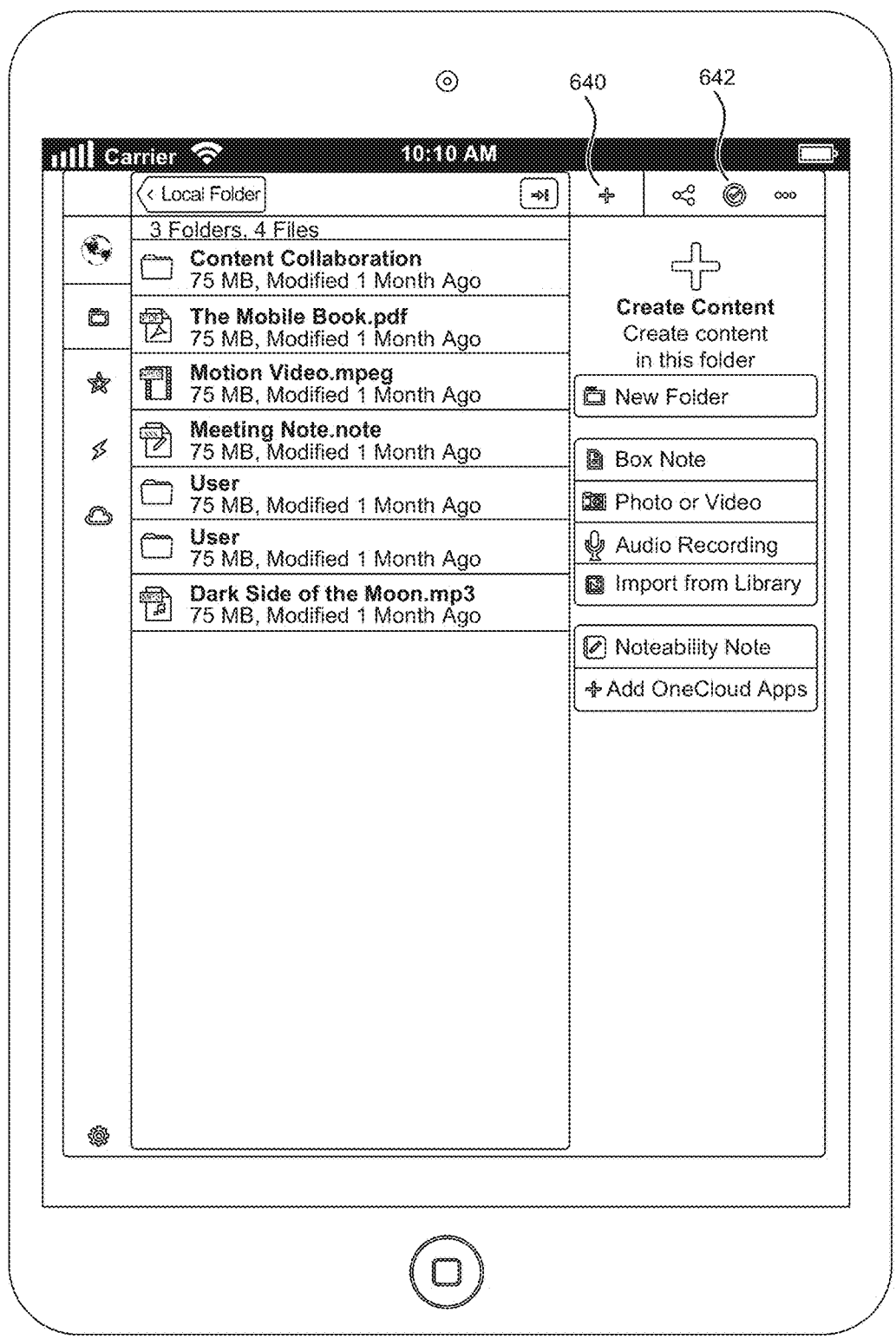

In some embodiments, if the file that the user attempts to access is of a portable document format (PDF), the document module 434d can provide, via the user interface 107 (e.g., in an PDF access page), a brightness button to adjust the brightness for displaying the PDF file. In some embodiments, the mobile device 400 can memorize a brightness profile or history on a per-user or a per-file basis. Examples of the brightness button are illustrated in FIG. 5J and FIG. 6I as button 530 and button 630, respectively. The document module 434d can also provide a search function to search the content of the PDF file. The search function button is illustrated in FIG. 5J as button 532, and in FIG. 6I as button 632. In addition, the document module 434d can allow the user to bookmark pages of the PDF file for easier later access. The bookmark function button is illustrated in FIG. 5J as button 534, and in FIG. 6I as button 634.

In some embodiments, the document module 434d can enable a thumbnail preview of the PDF file as previously described (e.g., showing the first page or a first few pages as one or several thumbnails representing the PDF file in situations that the file is associated, such as in an activity update). Some embodiments of the document module 434d can also provide note writing functions on the PDF file.

As an additional or alternative embodiment, the document module 434d can also recognize whether a file is a source code (e.g., from a file extension such as ".c", ".cxx", ".java", etc.), and if the file is a source code, the document module 434d can color the source code based on one or more syntax highlighting rules. Other examples of source code types can include Javascript, Ruby, PHP, HTML, CSS, and so forth. The user can also customize the rules and/or install his or her own rules for syntax highlighting.

As previously mentioned, the multi-functional managing interface 107 can provide integrated access to contents stored in the workspace 302 and/or on the mobile device 400 in a way that is intuitive, efficient and collaboration-promoting. Accordingly, the file managing page of the interface 107 (see FIGS. 5L and 6J), which is accessible via selecting a file managing button 518 on the side bar 506 (or button 618 on the side bar 606), can provide various functionalities that improves the user experience.

Figure 6K:
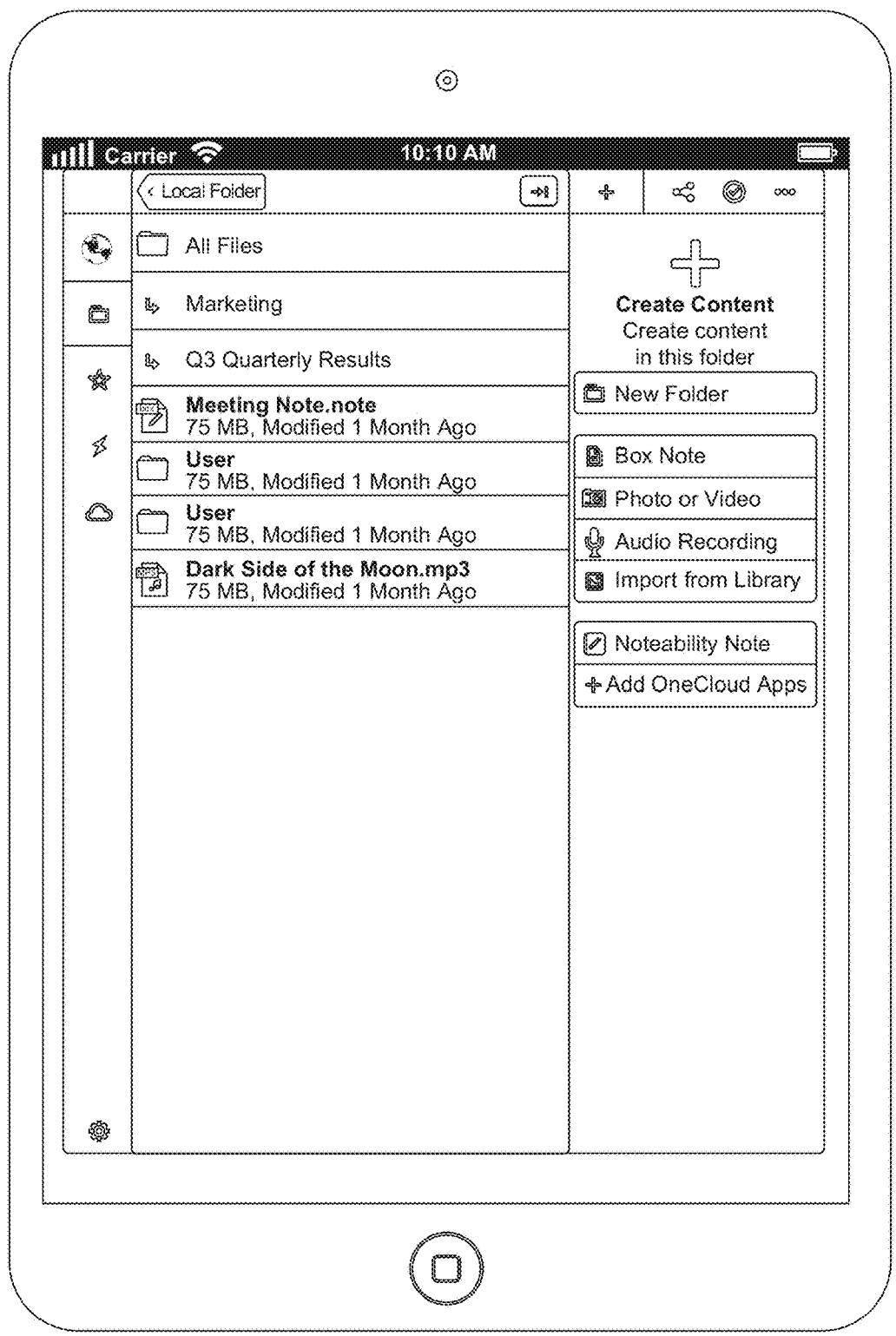

For example, the user can easily switch among different folders by clicking or tapping on the button which shows the current folder, such as illustrated in the screenshots of FIG. 5M and FIG. 6K. Additionally, the user can perform a selected number of primary actions simply by tapping or selecting each file, such as illustrated in the screenshot of FIG. 5N. More specifically, in some embodiments, after tapping on a file, besides sharing (which is described above) and deleting, the user can add the selected file into the user's "favorite list." The "add to favorite" button is shown, as examples, in FIG. 5N as button 529. The user's favorite list can be accessed through the favorite page, which can be entered by button 528 on the side bar 506 (FIG. 5C), or by button 628 on the side bar 606 (FIG. 6B).

Figure 6L:
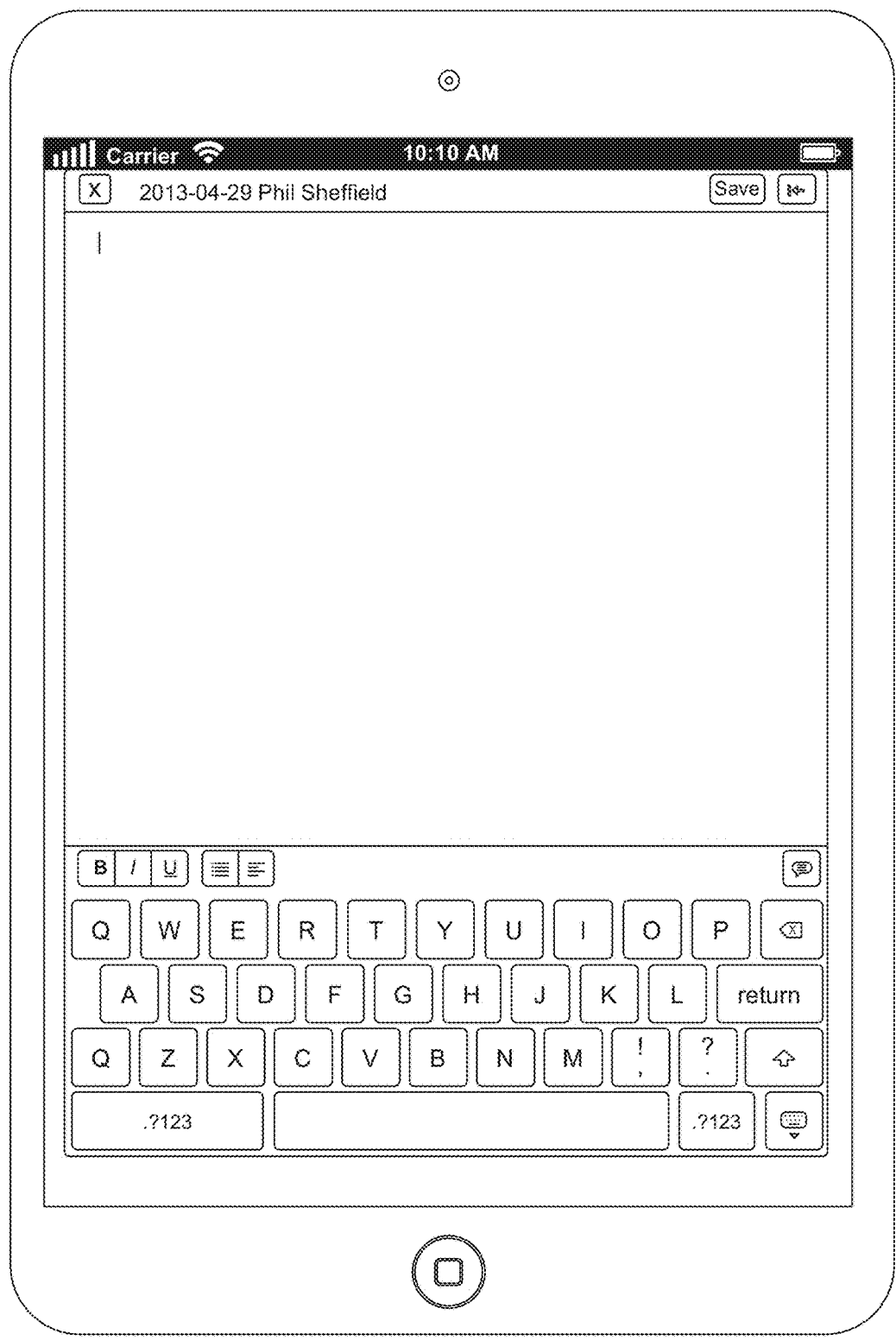
Figure 6M:
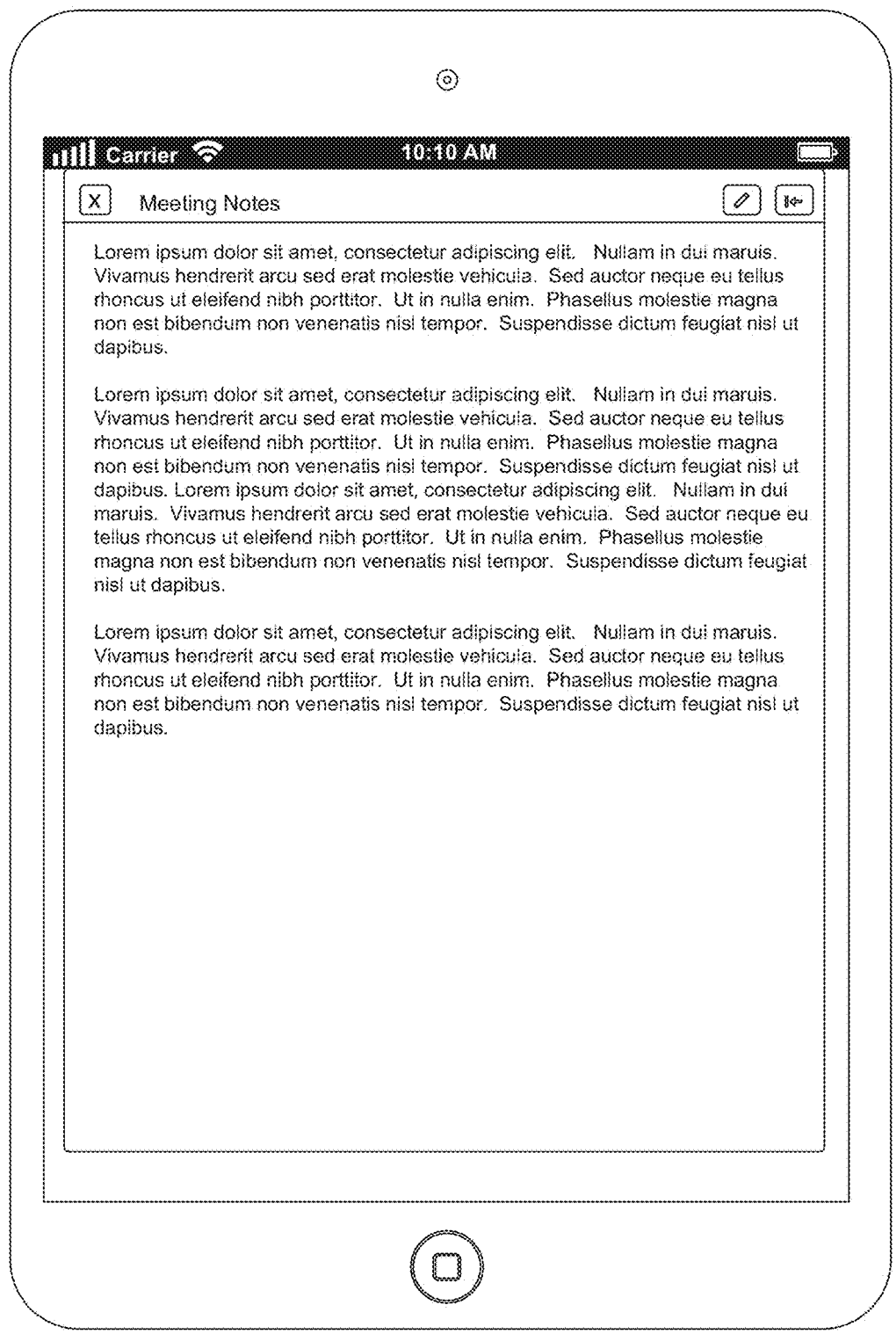

Further, the file managing page can include an "add new" button (e.g., button 540, FIG. 5L; button 640, FIG. 6J), which can provide the user with action options such as add new folder, add new note, add new photo & video, add new audio recording, or import from library. Example screenshots depicting the add new page which can be triggered by the buttons 540, 640 are shown in FIGS. 5O and 6K, respectively. Example screenshots of a "new note" page, which can be activated via the add new note option, are shown in FIGS. 5P And 6L. The notes can be either saved locally on the mobile device 400 or in the workspace 302. Example screenshots of a finished note are shown in FIGS. 5Q and 6M.

Figure 6N:
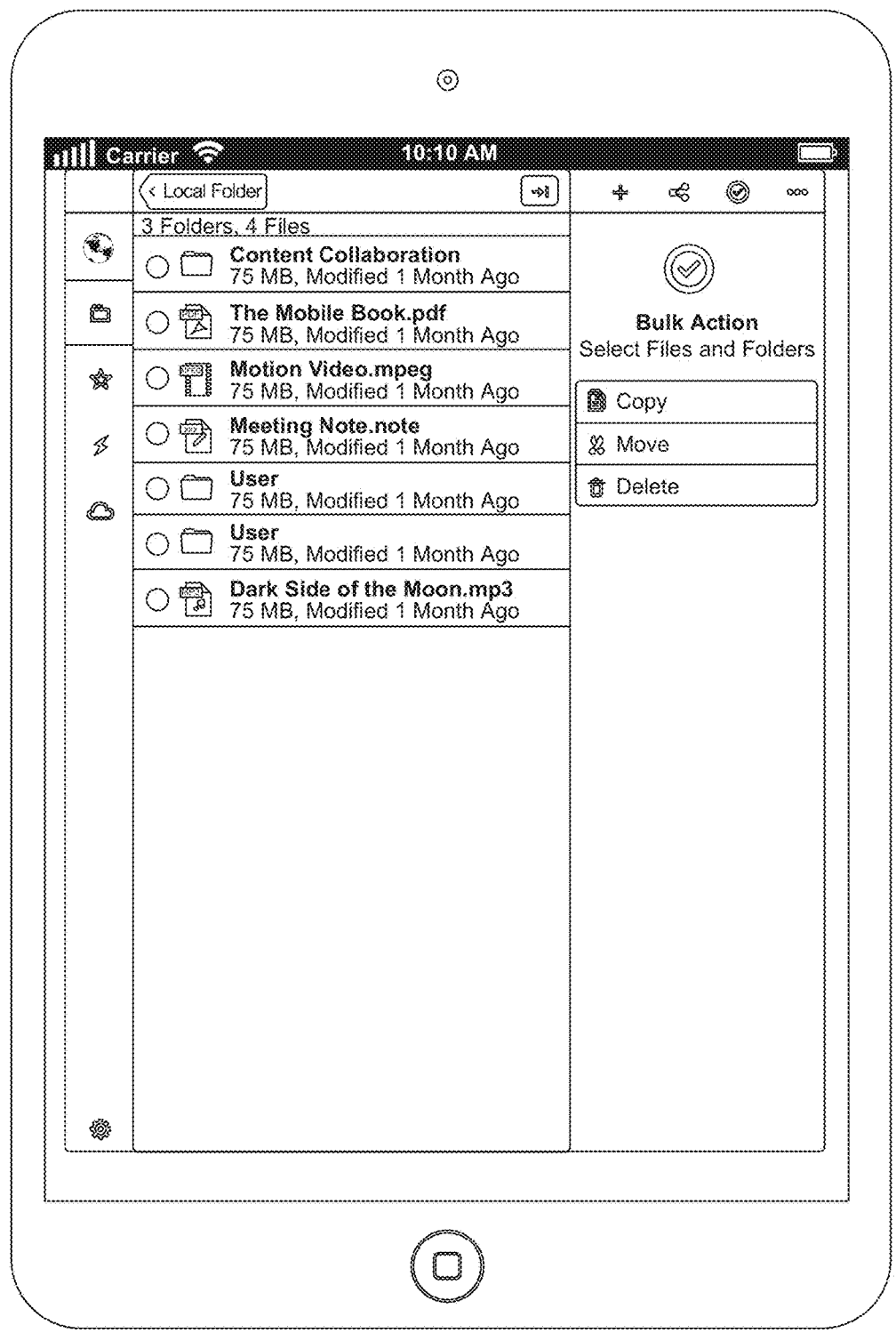
Figure 60:
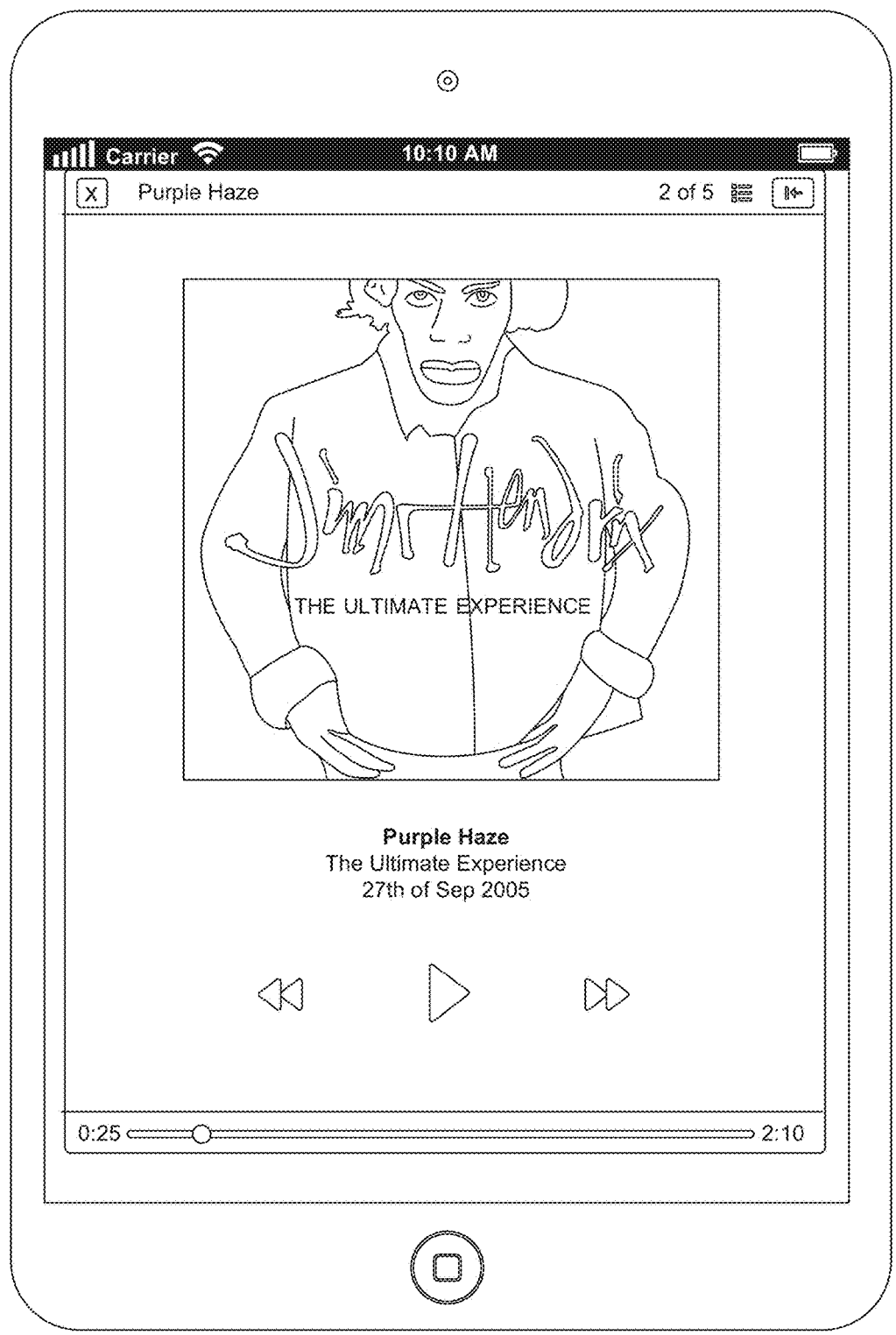
Figure 6P:
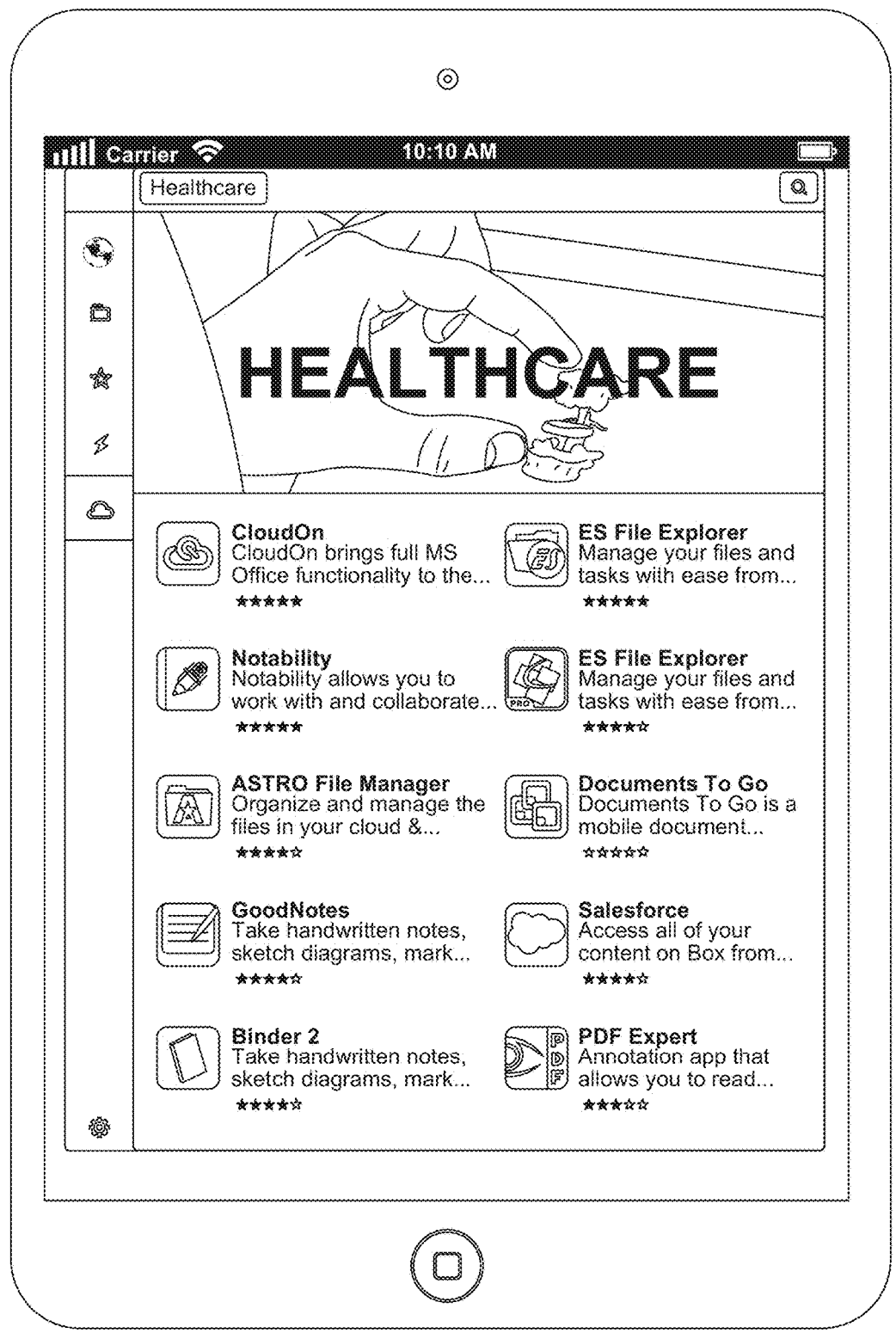
Figure 6Q:
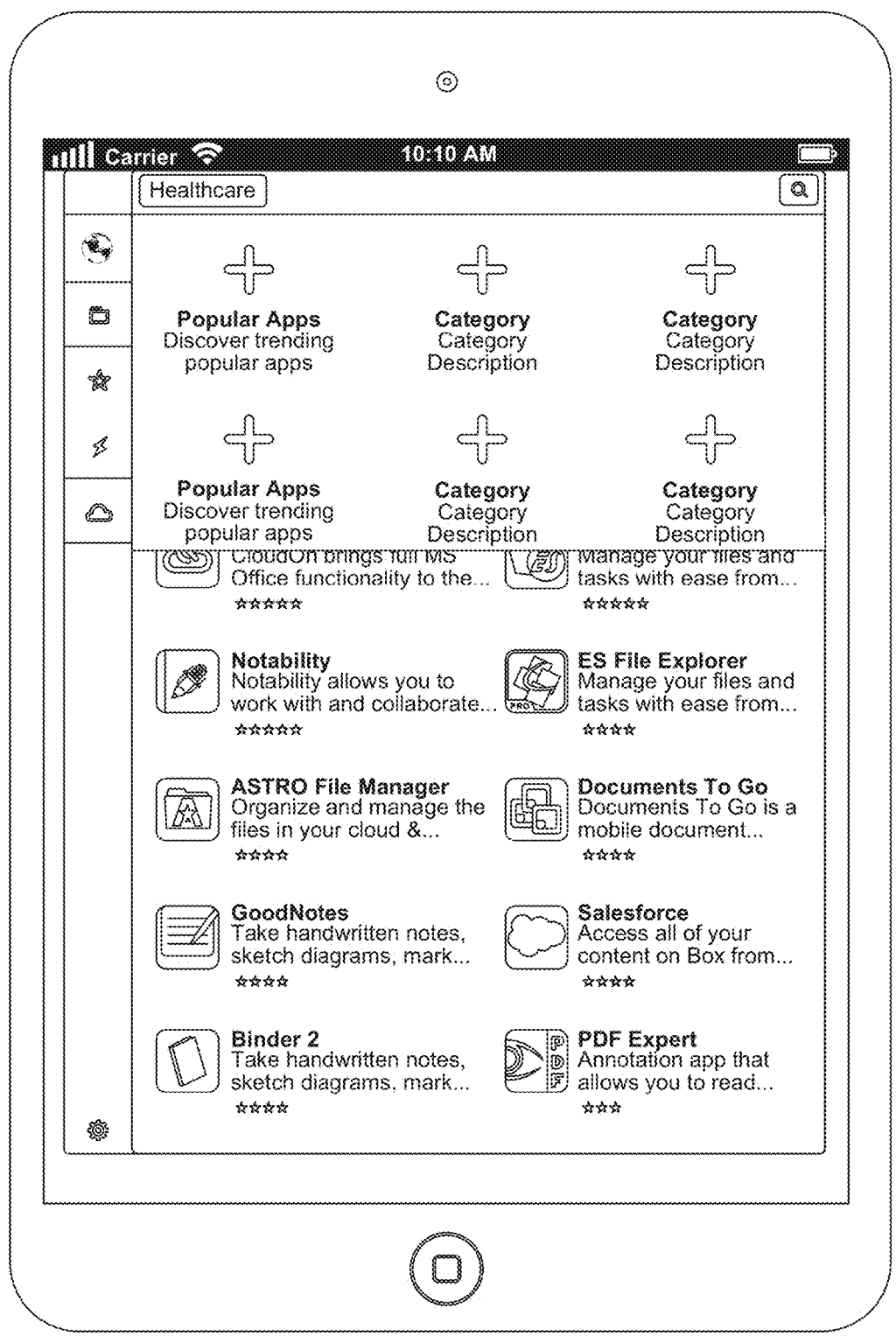

The file managing page can also include a "bulk action" button (e.g., button 542, FIG. 5L; button 642, FIG. 6J), which can provide the user with action options that can be performed on multiple selected files, such as copy, cut, paste, move, or delete. Example screenshots depicting the bulk action page which can be triggered by the buttons 542, 642 are shown in FIG. 5R (for small form factor devices) and FIG. 6N (for large form factor devices). In some embodiments, for small for factor devices, the action options for bulk action can be displayed only after at least one file is selected, such as shown in FIG. 5S.

Further enhancing convenience and user experience, the user can select one or more files to be available for editing or viewing in an offline mode. Specifically, the content access manager 430 can coordinate with the communication module 425 to download the selected files onto the device 400 so as to prepare the selected files for the offline mode access. An offline access page, which can be entered via button 538 on the side bar 506 (FIG. 5C), or via button 638 on the side bar 606 (FIG. 6B), can display these offline accessible files for the user to access during an offline period, so that although workspace 302 may be temporarily unreachable, the user can still enjoy the various functionalities provided by the multi-functional managing interface 107. In some embodiments, after the device 400 becomes back online, the device 400 can automatically synchronize with the host server 110 and performs updates, including the aforementioned activity updates, to contents in the workspace 302.

In some embodiments, the preferred application page can include an option to allow the user to create his or her own categories. Examples of this function are shown in FIG. 5V and FIG. 6Q.

In some embodiments, the content access manager 430 can allow the user to compress (e.g., using a ZIP algorithm, an RAR algorithm, or other suitable file compression algorithms) select file or files, whether stored locally or in the workspace 302.

Figure 7:
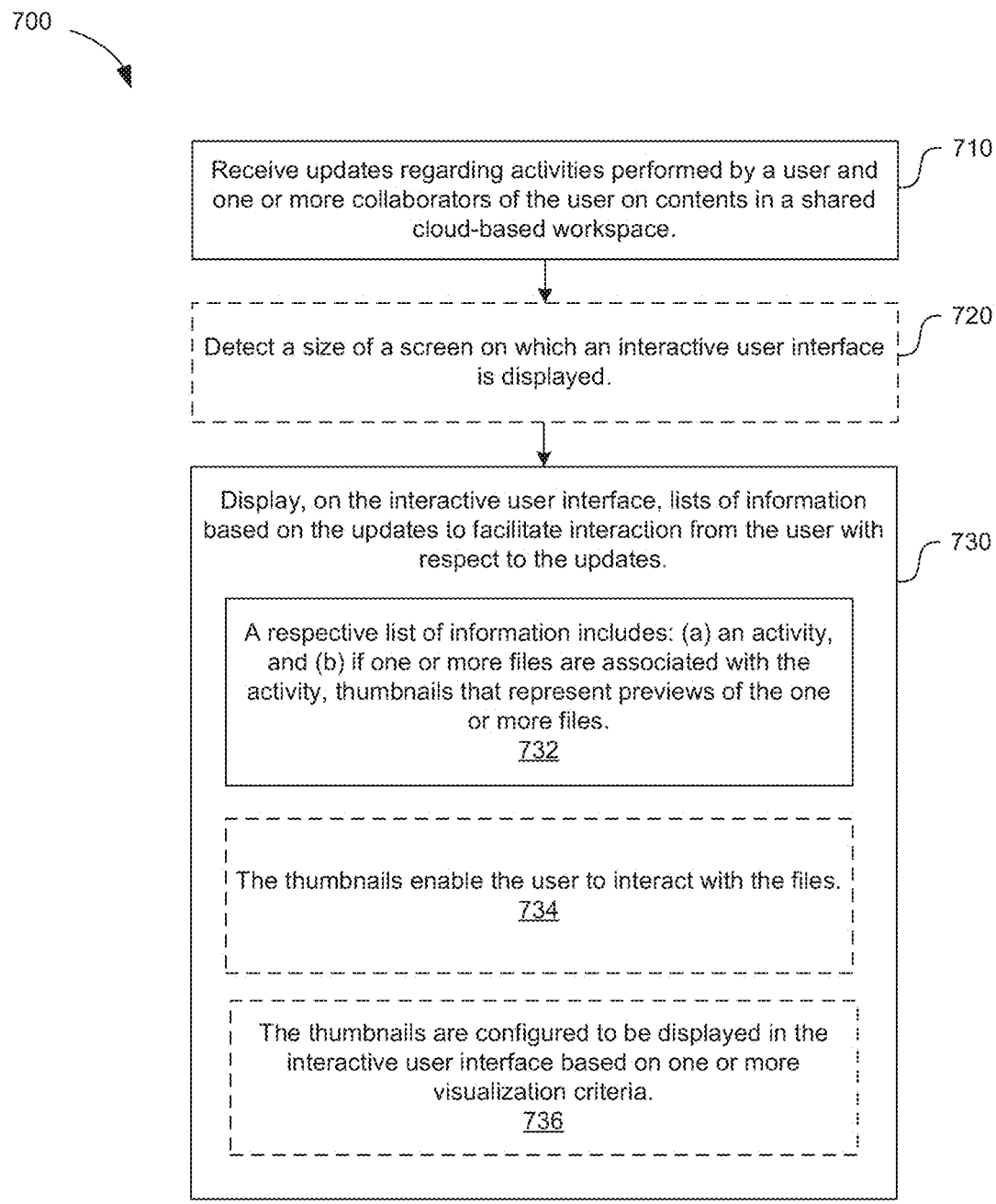
FIG. 7 depicts a flowchart illustrating an example process for a mobile device in implementing the techniques disclosed herein for facilitating collaboration among users as well as enabling utilization of content in the workspace in an intuitive, effective manner.

FIG. 7 depicts a flowchart illustrating an example process 700 for a mobile device (e.g., devices 102, FIG. 1; mobile device 400, FIG. 4) in implementing the techniques disclosed herein for facilitating collaboration among users as well as enabling utilization of content in the workspace (e.g., workspace 302, FIG. 3) in an intuitive, effective manner. The process 700 is performed, for example, by a processor that is included on the mobile device 102, 400. Workspace 302 (e.g., workspaces A 205, B 225, or N 245, FIG. 2) is shared among a user of the client devices 102, 400 and one or more collaborators (e.g., collaborators 108, FIG. 1; collaborators 322, FIG. 3) of the user. The host server 110 is a server that hosts the cloud-based environment which includes workspace 302.

In accordance with some embodiments, the devices 102, 400 are configured to provide a multi-functional managing user interface (e.g., interface 107, FIG. 1) to access the workspace 302 and/or local files on device 102, 400. In particular, some embodiments of the devices 102, 400 can receive (710) updates regarding activities performed by the user and the one or more collaborators on contents in the workspace 302 (e.g., via an activity monitor 420, FIG. 4).

Optionally, the device 102, 400 can detect (720) a size of a screen on which the interface 107 is displayed (e.g., via the device form factor detector module 410*c*, FIG. 4).

Further, the device 102, 400 can display (730) (e.g., via an UI module 410, FIG. 4), on the interactive user interface 107, lists of information (e.g., lists 512*a*-512*c*, FIG. 5D) based on the updates to facilitate interaction (such as various aforementioned functionalities provided by the content access manager 430, FIG. 4) from the user with respect to the updates.

A list of information (e.g., list 512*a*) can include (732) an activity (e.g., upload, download, preview, comment, etc.) and, if one or more files (e.g., a JPEG photo, an AVI video, or a PDF document) are associated with the activity, thumbnails (e.g., 510*a*-510*c*, FIG. 5D) that represent previews of the one or more files. One or more embodiments provide that the thumbnails 510*a*-510*c* can enable (734) the user to interact with the files, such as open, edit, play, highlight, comment, save, and so forth.

In some additional embodiments, the devices 102, 400 are configured (736) so that the thumbnails 510*a*-510*c* are to be displayed in the interactive user interface 107 based on one or more visualization criteria.

For example, in some embodiments, if the screen's size is what is generally regarded as a small form factor mobile device (e.g., less than or equal to 7.25 inches of screen size when measured diagonally), then a thumbnail (e.g., 510*a*) is to occupy larger than 20% of a height of the screen, such as shown in FIG. 5D. Moreover, if the screen's size is what is generally regarded as a large form factor mobile device (e.g., more than 7.25 inches of screen size when measured diagonally), then a thumbnail is to occupy larger than 10% but less than 20% of a height of the screen, such as shown in FIG. 6C.

Overall, among other advantages, embodiments disclosed herein provide the ability, for each person of a user and his or her collaborators, to receive real-time updates about the collaborative workspace which is shared among them in a way that provides easy-to-understand information, enables intuitive utilization of files, and promotes social interactions with respect to the real-time updates, all of which can enhance the users' collaboration experience.

Figure 8:
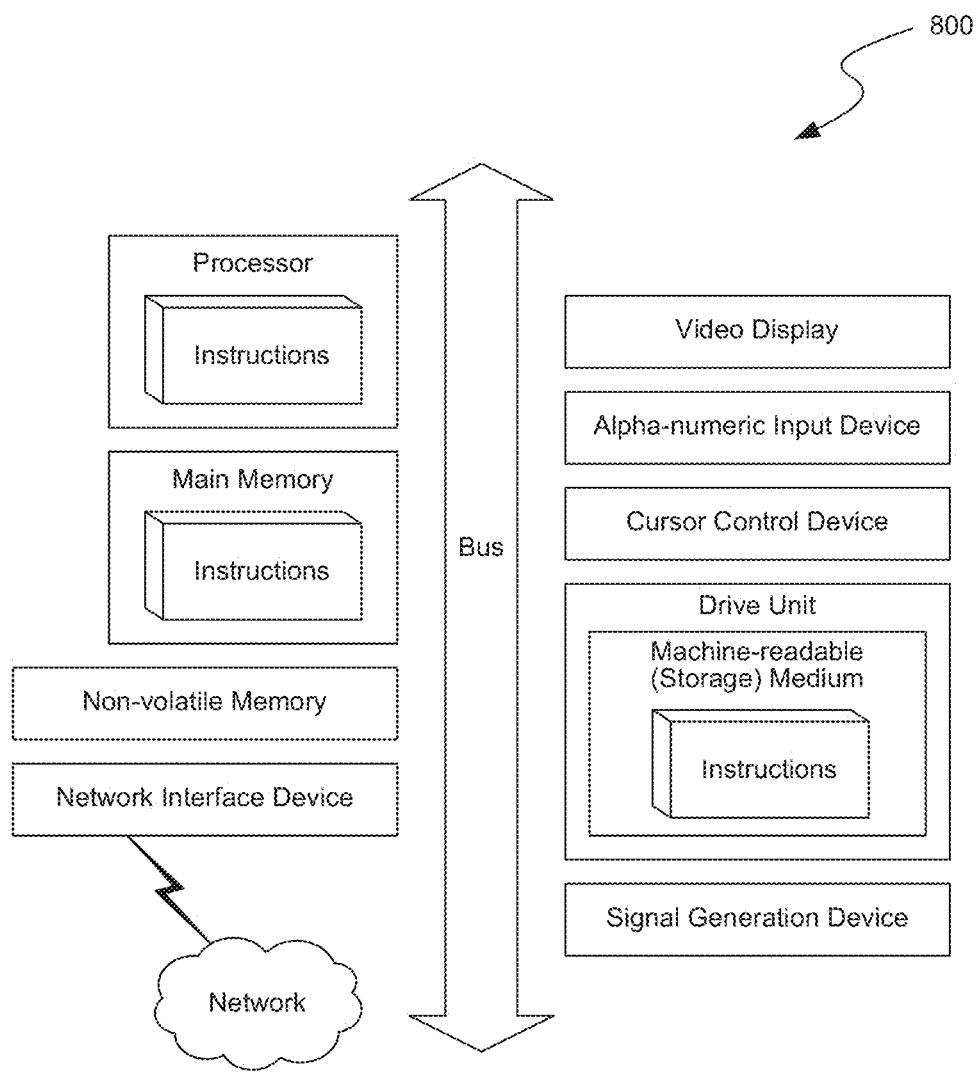
FIG. 8 depicts a diagrammatic representation of a machine in the example form of a computer system within which a set of instructions, for causing the machine to perform any one or more of the methodologies discussed herein, can be executed.

FIG. 8 shows a diagrammatic representation 800 of a machine in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a user device, a tablet, a phablet, a laptop computer, a set-top box (STB), a personal digital assistant (PDA), a thin-client device, a cellular telephone, an iPhone, an iPad, aBlackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶ 6, other aspects can likewise be embodied as a means-plus-function claim, or in other forms, such as being embodied in a computer-readable medium. (Any claim intended to be treated under 35 U.S.C. § 112, ¶ 6 begins with the words "means for".) Accordingly, the applicant reserves the right to add additional claims after filing the application to pursue such additional claim forms for other aspects of the disclosure.

What is claimed is:

1. A method comprising:
presenting, by a mobile device, an interactive user interface to a cloud-based collaboration platform including a plurality of workspaces;
receiving, by the mobile device, updates regarding activities performed on a plurality of work items stored in a particular workspace of the plurality of workspaces by collaborators affiliated with the particular workspace;
selecting, by the mobile device, updates from the received updates that are relevant to a user of the mobile device, the relevancy based on activity of the user in the cloud-based collaboration platform;
displaying, by the mobile device, in the interactive user interface, a visual feed stream of a plurality of interactive graphical elements based on the selected updates,
wherein each of the plurality of graphical elements in the visual feed stream include:
a description of an activity performed on a work item in the particular work space;
an identification of a collaborator that performed the activity on the work item; and
a thumbnail preview of the work item, wherein the thumbnail preview depicts actual content of the work item; and
wherein each of the plurality of graphical elements are displayed sequentially in the visual feed stream as the selected updates are received;
detecting, by the mobile device, a user interaction, via a particular interactive graphical element of the plurality of interactive graphical elements in the visual feed stream, with a thumbnail preview of a particular work item in the particular workspace; and
enabling, by the mobile device, a user to perform a plurality of actions on the particular work item, via the interactive user interface, responsive to detecting the user interaction with the thumbnail preview of the particular work item.

2. The method of claim 1, wherein the thumbnail preview enables the user at the mobile device to interact with the work item.

3. The method of claim 1, wherein the thumbnail preview is configured to be displayed in the interactive user interface of the mobile device based on a plurality of visualization criteria.

4. The method of claim 3, further comprising:
detecting, by the mobile device, a size of a screen on which the interactive user interface is displayed.

5. The method of claim 4, wherein the thumbnail preview is to occupy larger than 20% of a height of the screen if the screen's size is less than or equal to 7.25 inches when measured diagonally.

6. The method of claim 4, wherein the thumbnail preview is to occupy larger than 10% but less than 20% of a height of the screen if the screen's size is more than 7.25 inches when measured diagonally.

7. The method of claim 1, wherein the graphical elements are sorted based on the collaborator who performed the activity on the work item.

8. The method of claim 7, wherein the graphical elements are further sorted based on a timestamp of the activity.

9. The method of claim 1, further comprising:
displaying, by the mobile device, in the interactive user interface, the particular work item stored in the particular workspace; and
upon receiving a request for access to the particular work item, detecting, by the mobile device, a type of the particular work item before downloading the particular work item to the mobile device for access.

10. The method of claim 9, further comprising:
determining, by the mobile device, whether the particular work item is compatible with the mobile device; and
if the particular work item is incompatible, displaying, by the mobile device, an alert to the user before the downloading.

11. The method of claim 9, further comprising:
if the type of the particular work item is pictorial:
starting displaying, by the mobile device, the particular work item before downloading of the particular work item completes by displaying a lower resolution version of the particular work item first; and
gradually transitioning from the lower resolution version of the particular work item to a full resolution version of the particular work item as the downloading of the particular work item completes.

12. The method of claim 9, further comprising:
if the type of the particular work item is audio:
starting fetching, by the mobile device, metadata of the particular work item as soon as loading of the particular work item starts; and
displaying, by the mobile device, information related to the particular work item based on the metadata.

13. The method of claim 9, further comprising:
if the type of the particular work item is textual:
identifying, by the mobile device, whether the particular work item is a source code; and
coloring, by the mobile device, the source code based on a plurality of syntax highlighting rules.

14. The method of claim 9, further comprising:
if the type of the particular work item is a portable document format (PDF):
providing, by the mobile device, via the interactive user interface, a selectable element to adjust a brightness for the PDF file.

15. The method of claim 1, wherein enabling the user to perform the plurality of actions on the particular work item includes:
displaying a prompt to perform the plurality of actions on the particular work item.

16. The method of claim 15, wherein the prompt includes an option to select more than one of the plurality of work items.

17. The method of claim 1, wherein the plurality of actions include obtaining a link to the particular workspace for public access to the selected particular work item.

18. The method of claim 1, wherein the plurality of actions include preparing the selected particular work item for an offline mode access.

19. The method of claim 1, wherein the plurality of actions include at least one of: (a) writing a note for the selected particular work item, wherein the note is to be stored in the particular workspace; (b) uploading the particular work item to the particular workspace, if the selected particular work item is stored locally; (c) downloading the particular work item from the particular workspace, if the selected particular work item is stored in the particular workspace; and (d) sharing the selected particular work item via email to the collaborators.

20. The method of claim 1, further comprising:
providing, by the mobile device, an option to add the particular work item into a favorite list.

21. A mobile device comprising:
a processor; and
a memory unit having instructions stored thereon which when executed by the processor, causes the mobile device to:
  present an interactive user interface to a cloud-based collaboration platform including a plurality of workspaces;
  receive updates regarding activities performed on a plurality of work items stored in a particular workspace of the plurality of workspaces by collaborators affiliated with the particular workspace;
  select updates from the received updates that are relevant to a user of the mobile device, the relevancy based on activity of the user in the cloud-based collaboration platform;
  display, in the interactive user interface, a visual feed stream of a plurality of interactive graphical elements based on the selected updates,
  wherein each of the plurality of graphical elements include:
    a description of an activity performed on a work item in the particular workspace;
    an identification of a collaborator that performed the activity on the work item; and
    a thumbnail preview of the work item, wherein the thumbnail preview depicts actual content of the work item; and
  wherein each of the plurality of graphical elements are displayed sequentially in the visual feed stream as the selected updates are received;
  detect a user interaction, via a particular interactive graphical element of the plurality of interactive graphical elements in the visual feed stream, with a thumbnail preview of a particular work item in the particular workspace; and
  enable a user to perform a plurality of actions on the particular work item, via the interactive user interface, responsive to detecting the user interaction with the thumbnail preview of the particular work item.

22. The mobile device of claim 21, wherein the thumbnail preview enables the user at the mobile device to interact with the work item.

23. The mobile device of claim 21, wherein the thumbnail preview is configured to be displayed in the interactive user interface of the mobile device based on a plurality of visualization criteria.

24. The mobile device of claim 23, wherein the processor is further configured to:
  detect a size of a screen on which the interactive user interface of the mobile device is displayed.

25. The mobile device of claim 24, wherein the thumbnail preview is to occupy larger than 20% of a height of the screen if the screen's size is less than or equal to 7.25 inches when measured diagonally.

26. The mobile device of claim 24, wherein the thumbnail preview is to occupy larger than 10% but less than 20% of a height of the screen if the screen's size is more than 7.25 inches when measured diagonally.

27. The mobile device of claim 21, wherein the processor is further configured to:
  display, in the interactive user interface of the mobile device, the particular work item stored in the particular workspace; and
  upon receiving a request for access to the particular work item, detect a type of the particular work item before downloading the particular work item to the mobile device.

* * * * *